United States Patent
Wippermann et al.

(10) Patent No.: US 10,429,607 B2
(45) Date of Patent: Oct. 1, 2019

(54) OPTICAL STRUCTURE WITH RIDGES ARRANGED AT THE SAME AND METHOD FOR PRODUCING THE SAME

(71) Applicant: Fraunhofer-Gesellschaft zur Foerderung der angewandten Forschung e.V., Munich (DE)

(72) Inventors: Frank Wippermann, Meiningen (DE); Andreas Reimann, Apolda (DE); Nicolas Lange, Jena (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 830 days.

(21) Appl. No.: 14/952,558

(22) Filed: Nov. 25, 2015

(65) Prior Publication Data
US 2016/0154202 A1    Jun. 2, 2016

Related U.S. Application Data

(63) Continuation of application No. PCT/EP2014/060726, filed on May 23, 2014.

(30) Foreign Application Priority Data

May 27, 2013 (DE) .................. 10 2013 209 829

(51) Int. Cl.
G02B 7/02 (2006.01)
G02B 26/08 (2006.01)
G02B 7/00 (2006.01)
G02B 7/18 (2006.01)

(52) U.S. Cl.
CPC ............ *G02B 7/028* (2013.01); *G02B 7/008* (2013.01); *G02B 7/025* (2013.01); *G02B 7/181* (2013.01); *G02B 26/0841* (2013.01)

(58) Field of Classification Search
CPC .... G02B 26/00; G02B 26/08; G02B 26/0816; G02B 26/0825; G02B 26/0833; G02B 26/0841
USPC ......... 359/196.1, 198.1, 200.6, 209.1, 210.1, 359/260, 261, 221.2, 223.1, 224.1
See application file for complete search history.

(56) References Cited

U.S. PATENT DOCUMENTS

| | | | |
|---|---|---|---|
| 5,969,465 A * | 10/1999 | Neukermans | B81B 3/0078 310/333 |
| 7,078,778 B2 | 7/2006 | Schenk | |
| 2002/0027487 A1 | 3/2002 | Suzuki | |
| 2002/0033048 A1* | 3/2002 | McIntosh | G01D 5/2417 73/514.32 |
| 2002/0060863 A1 | 5/2002 | Ohtaka et al. | |

(Continued)

FOREIGN PATENT DOCUMENTS

| | | |
|---|---|---|
| CN | 101515065 A | 8/2009 |
| CN | 102981272 A | 3/2013 |

(Continued)

*Primary Examiner* — Robert E. Tallman
(74) *Attorney, Agent, or Firm* — Perkins Coie; Michael A. Glenn

(57) ABSTRACT

An apparatus having an optical structure, ridges and an electrostatic actuator with a cantilever electrode is described, wherein the ridges connect the optical structure to a supporting structure and the electrostatic drive is implemented to deflect the optical structure.

39 Claims, 94 Drawing Sheets

(56) References Cited

U.S. PATENT DOCUMENTS

| | | |
|---|---|---|
| 2007/0064299 A1 | 3/2007 | Dewa |
| 2008/0100899 A1* | 5/2008 | Shimokawa ............ B81B 3/004 359/225.1 |
| 2010/0014142 A1 | 1/2010 | Akedo et al. |
| 2011/0096419 A1 | 4/2011 | Matsuo et al. |
| 2012/0175796 A1 | 7/2012 | Wippermann et al. |

FOREIGN PATENT DOCUMENTS

| | | |
|---|---|---|
| DE | 102009055080 A1 | 6/2011 |
| JP | 09009649 A | 1/1997 |
| JP | 2002162506 A | 6/2002 |
| JP | 2002162663 A | 6/2002 |
| JP | 2002342960 A | 11/2002 |
| JP | 2007312553 A | 11/2007 |
| JP | 2009169025 A | 7/2009 |
| JP | 2010250039 A | 11/2010 |
| JP | 2011039446 A | 2/2011 |
| JP | 2012533775 A | 12/2012 |
| KR | 1020120023774 A | 3/2012 |
| WO | 0189986 A1 | 11/2001 |
| WO | 2009154090 A1 | 12/2009 |
| WO | 2011062209 A1 | 5/2011 |
| WO | 2011076634 A1 | 6/2011 |
| WO | 2012/095185 A1 | 7/2012 |
| WO | 2012/155276 A1 | 11/2012 |

\* cited by examiner

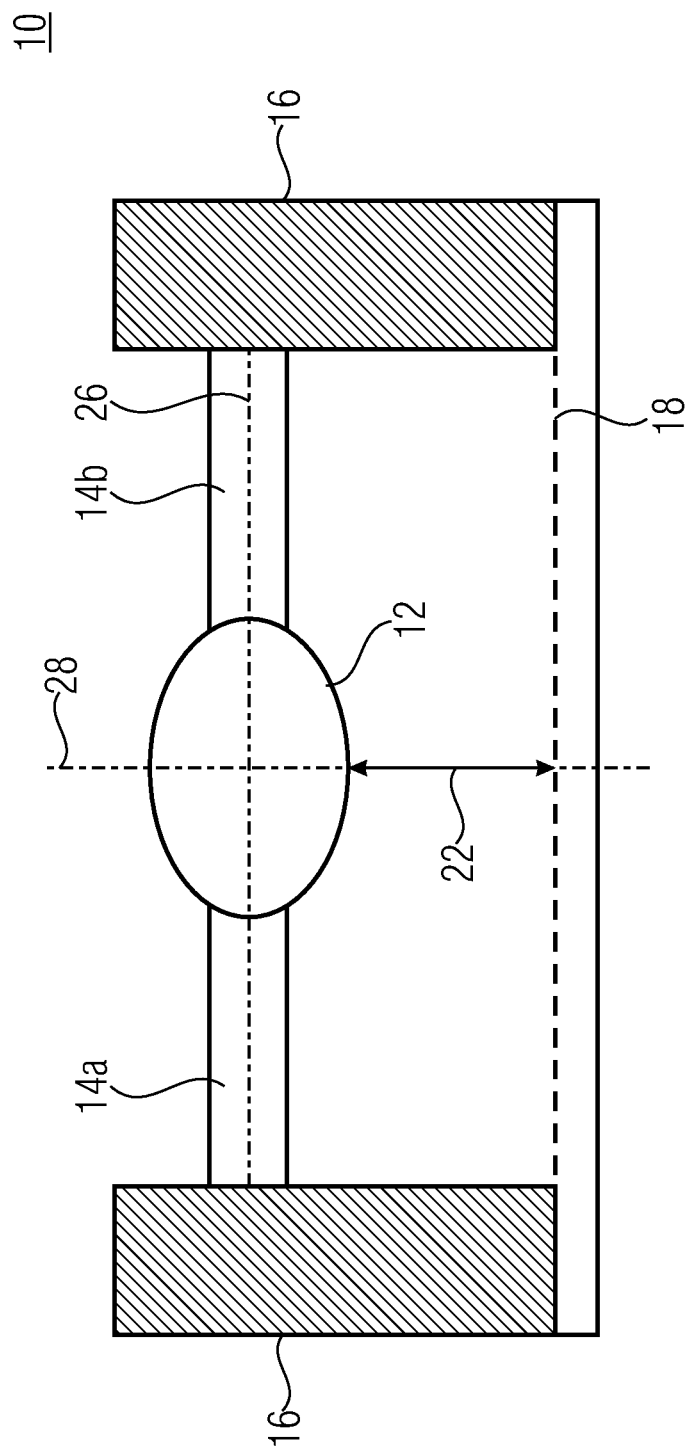

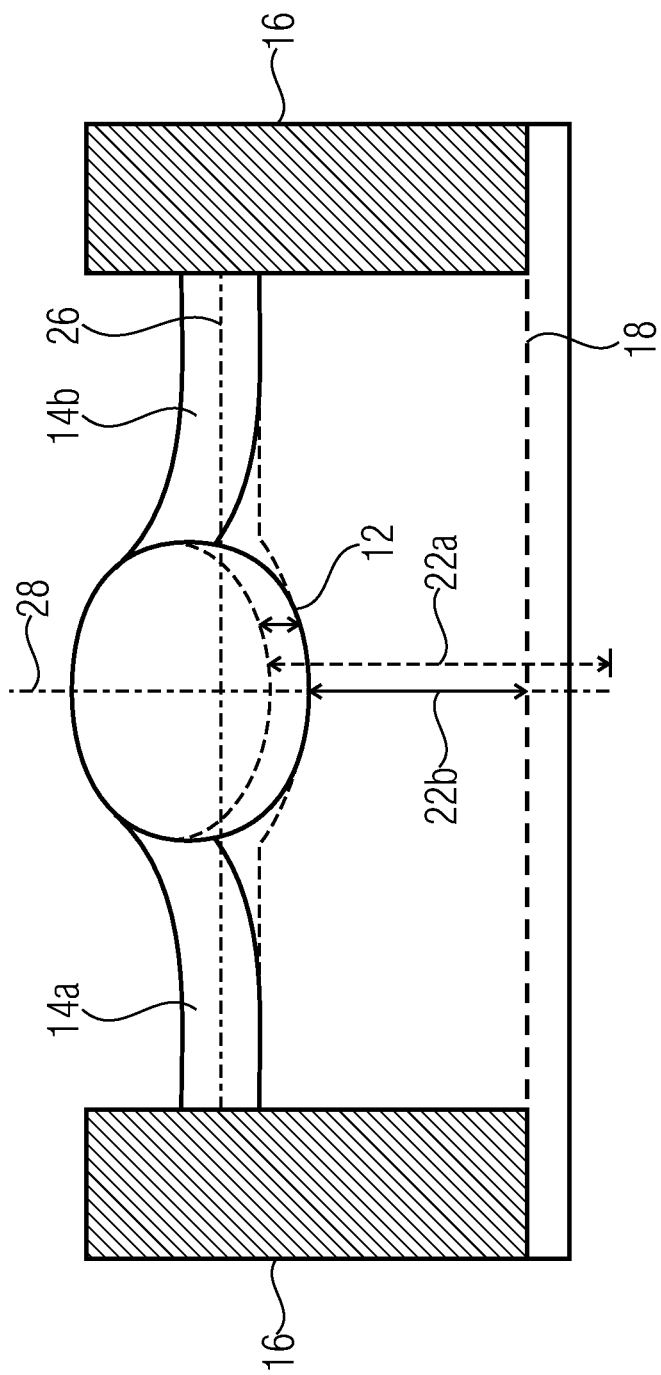

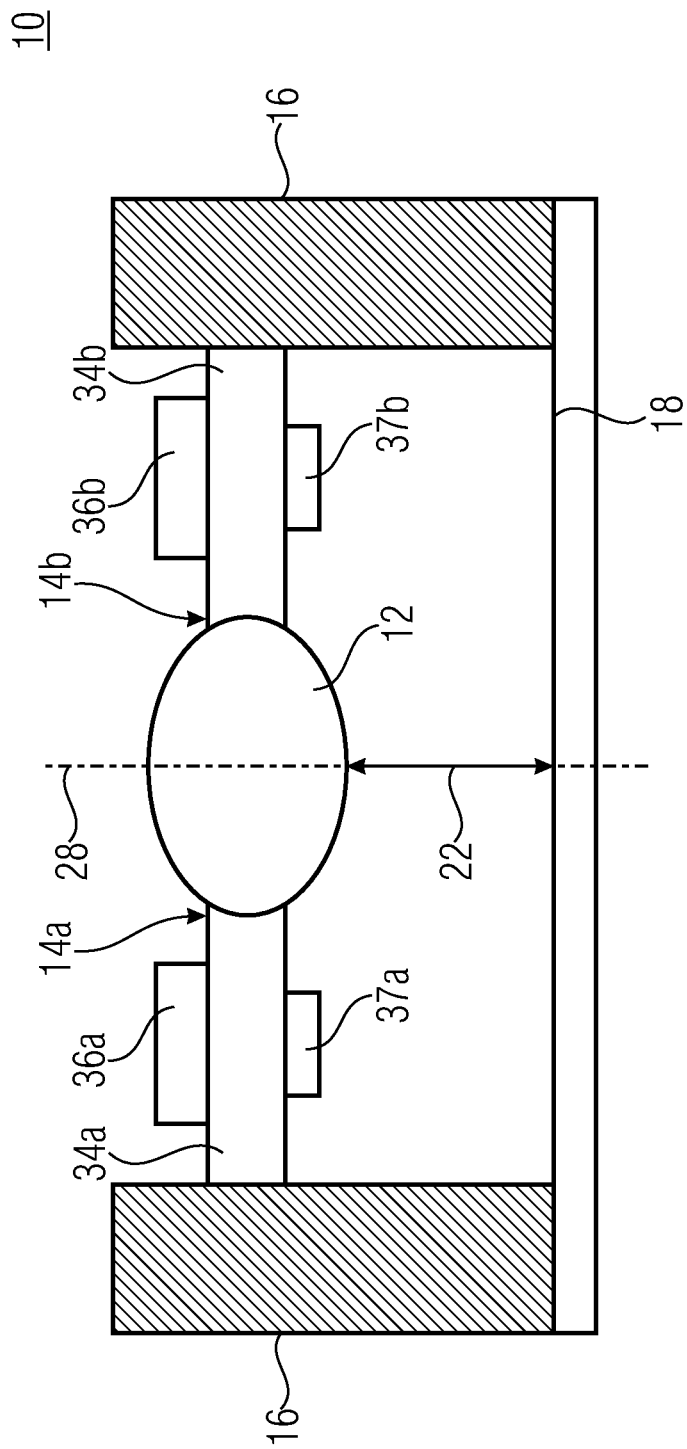

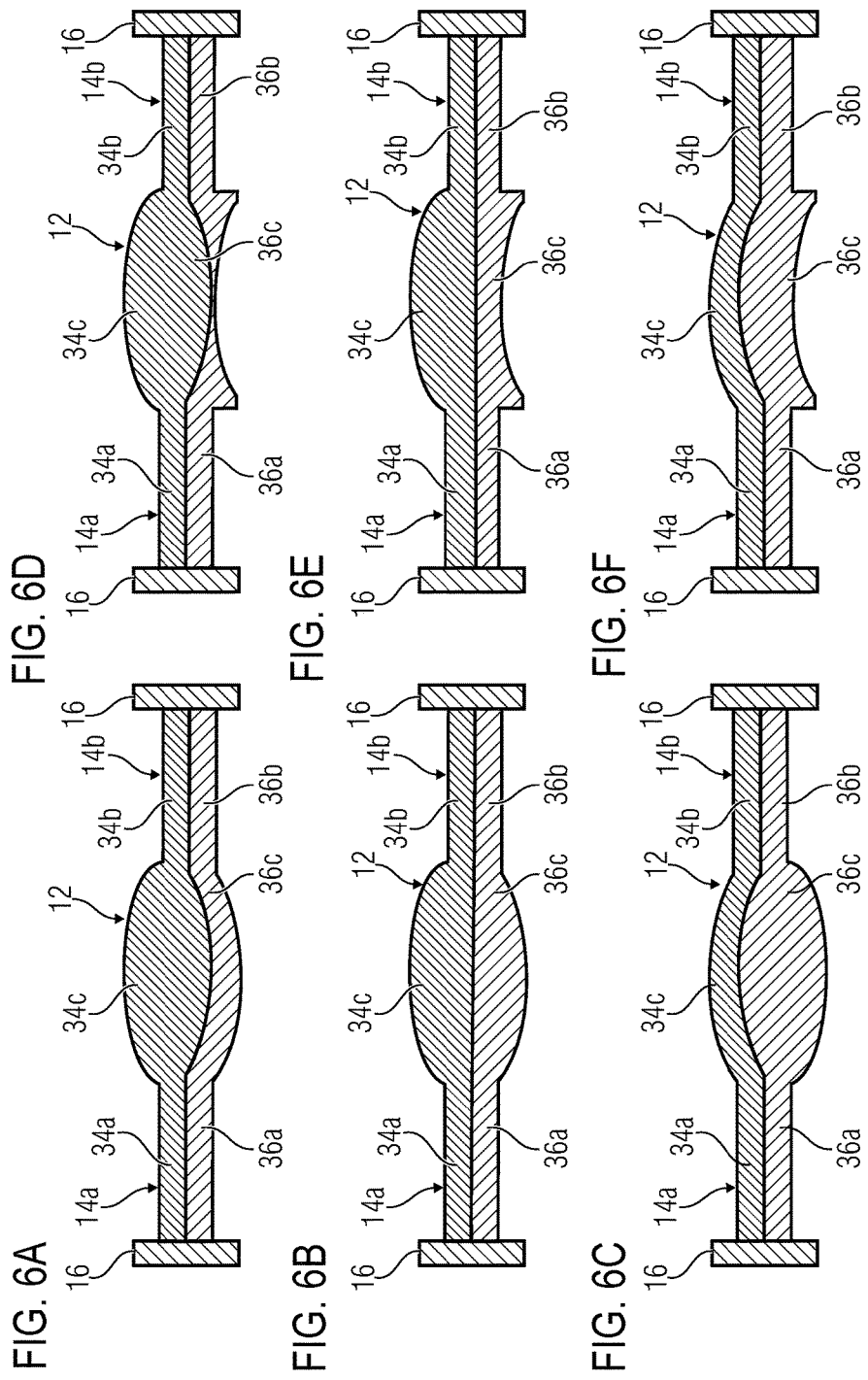

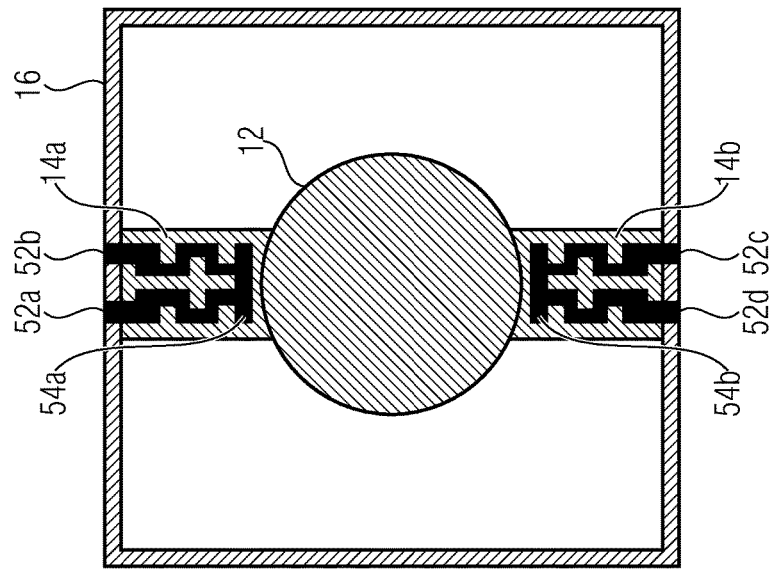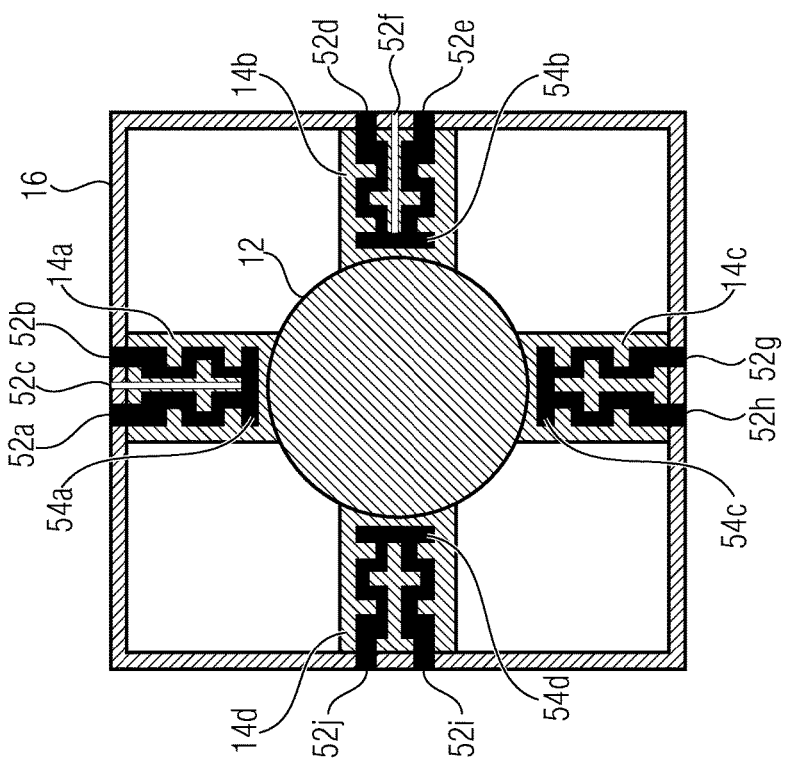

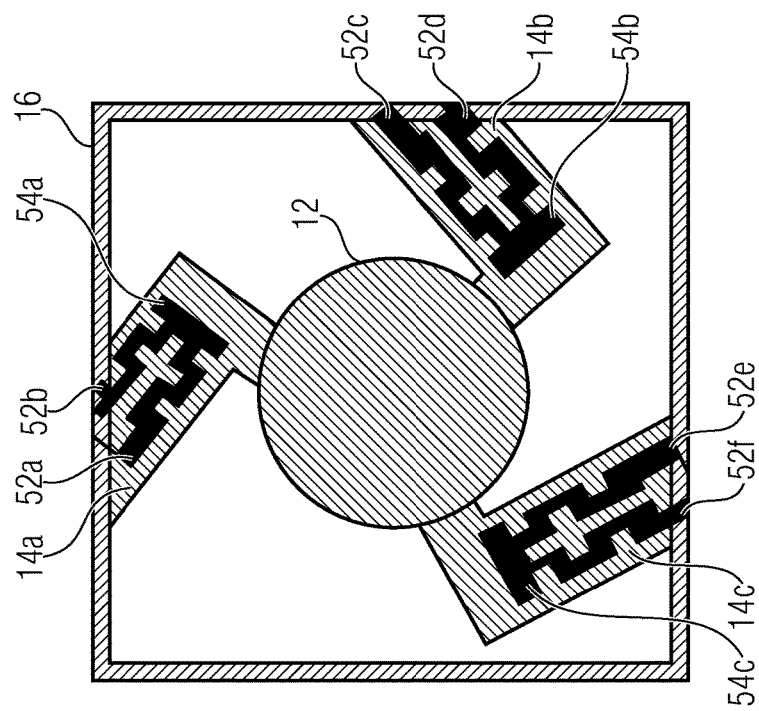
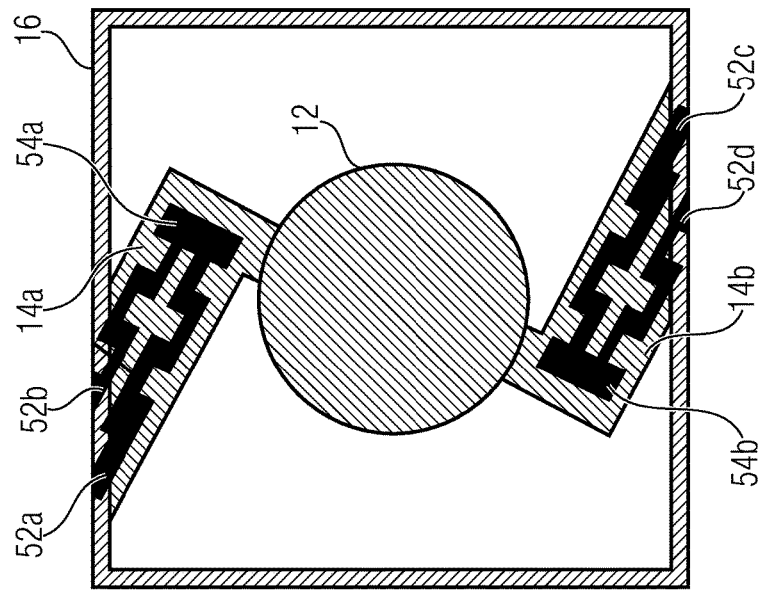
FIG 18
FIG 17

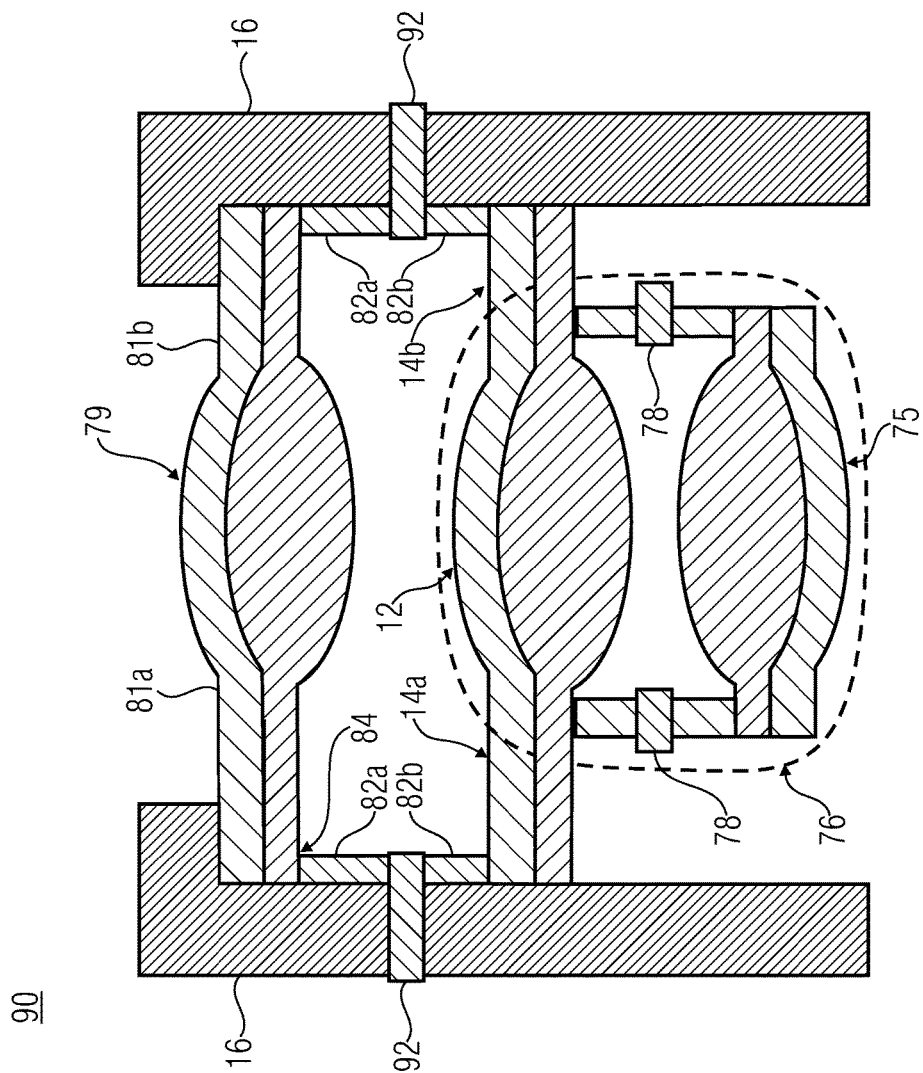

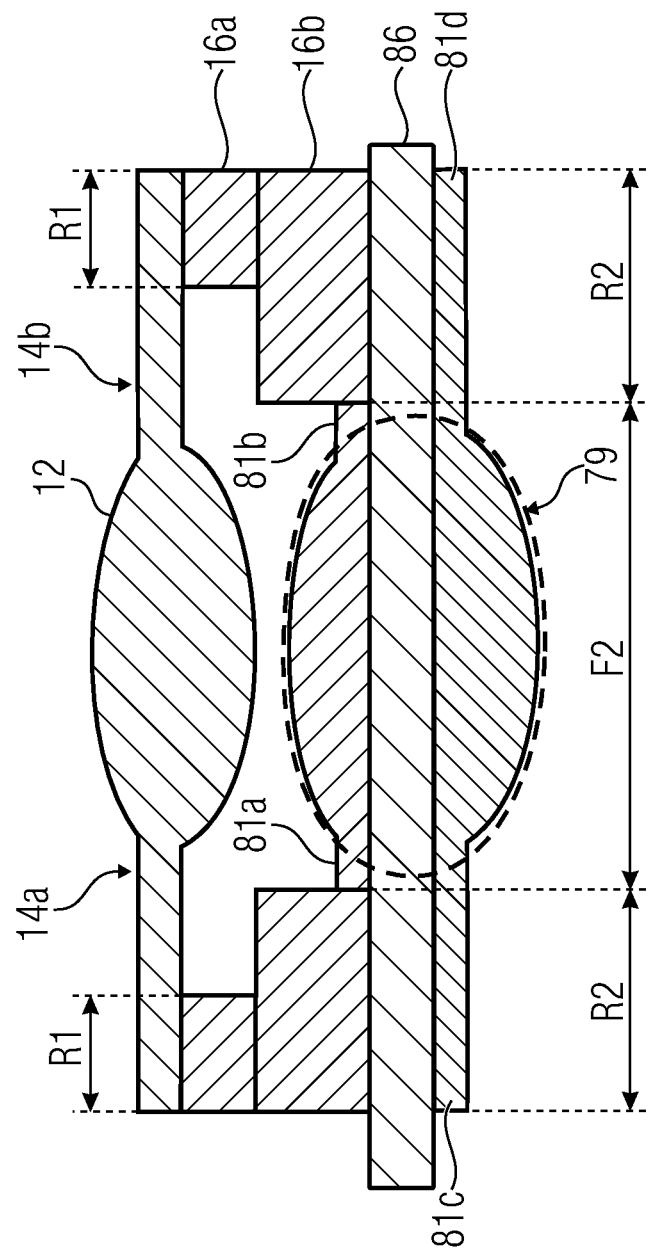

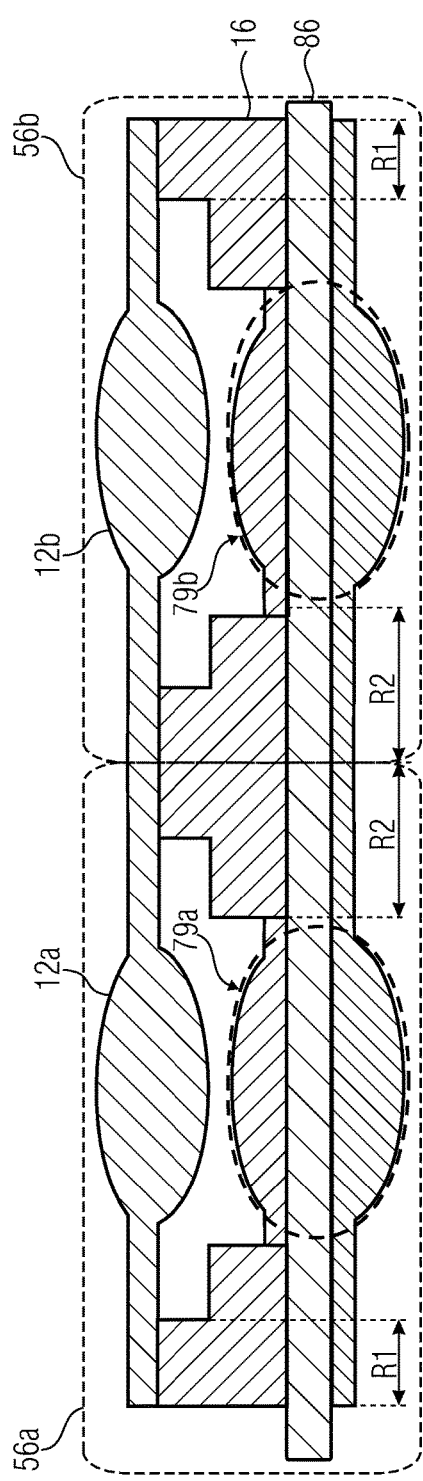
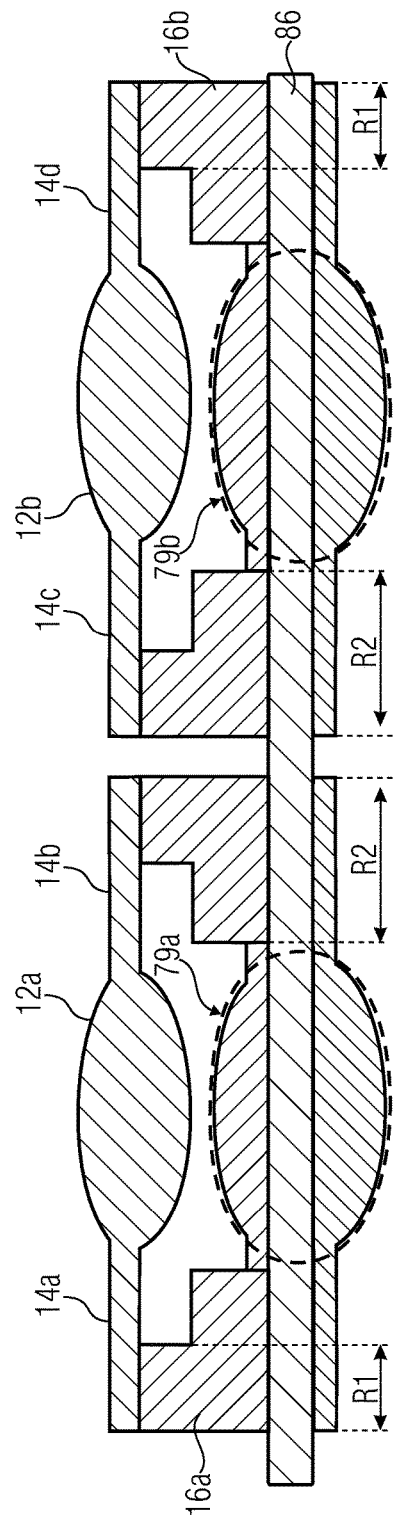
FIG 54B
FIG 54C

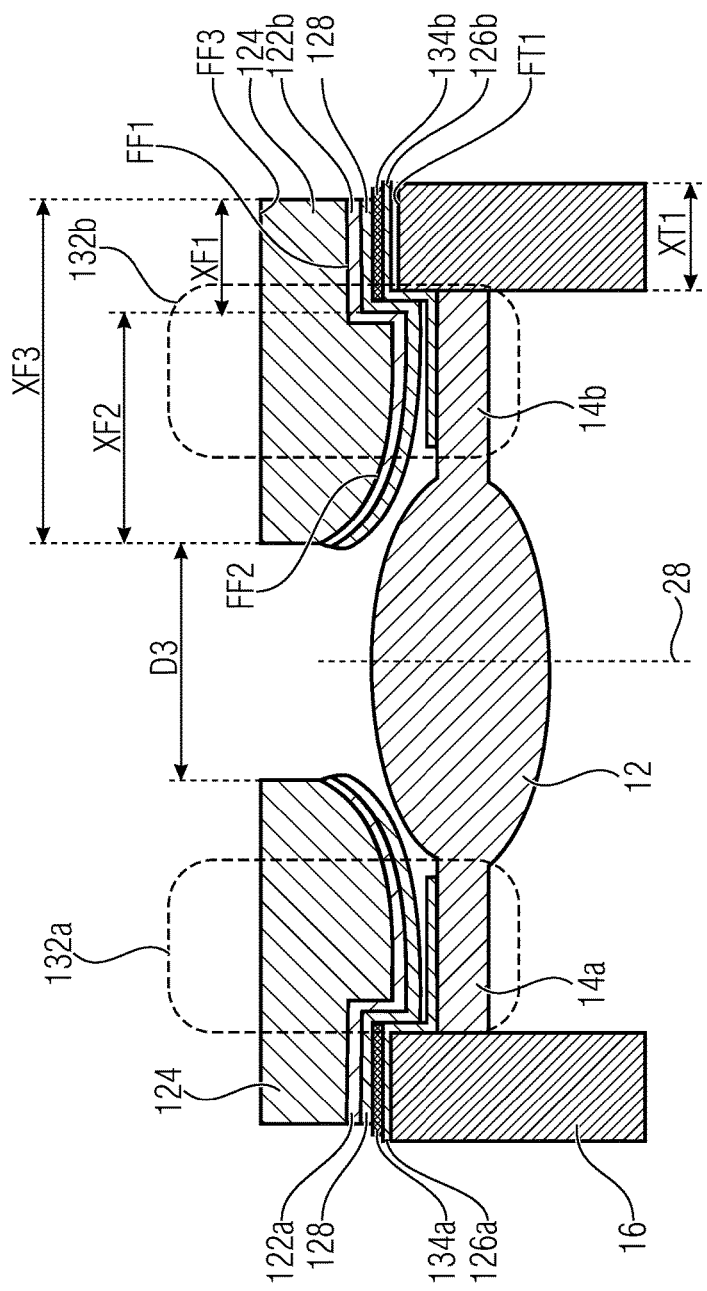

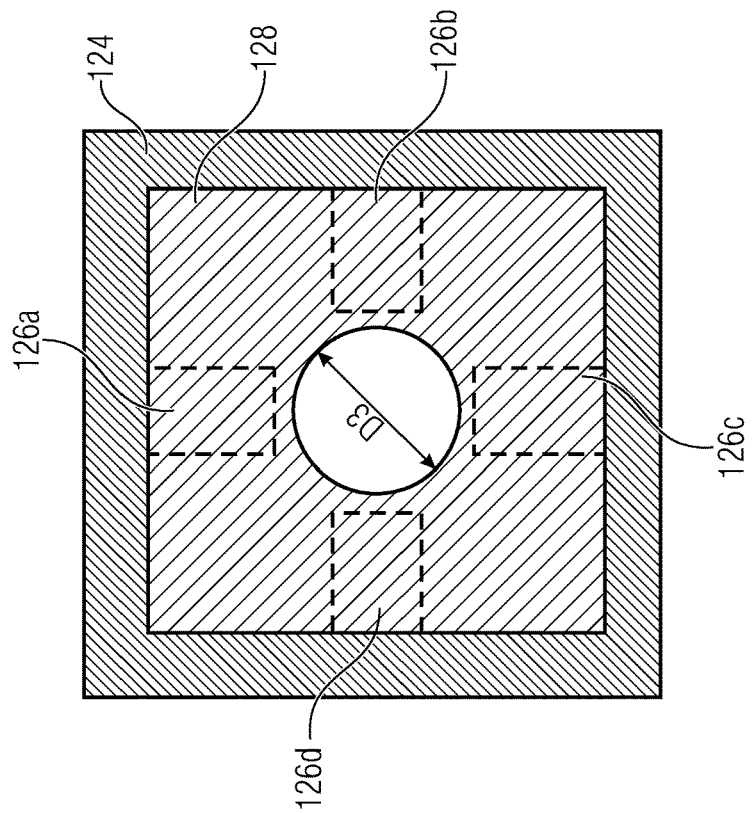
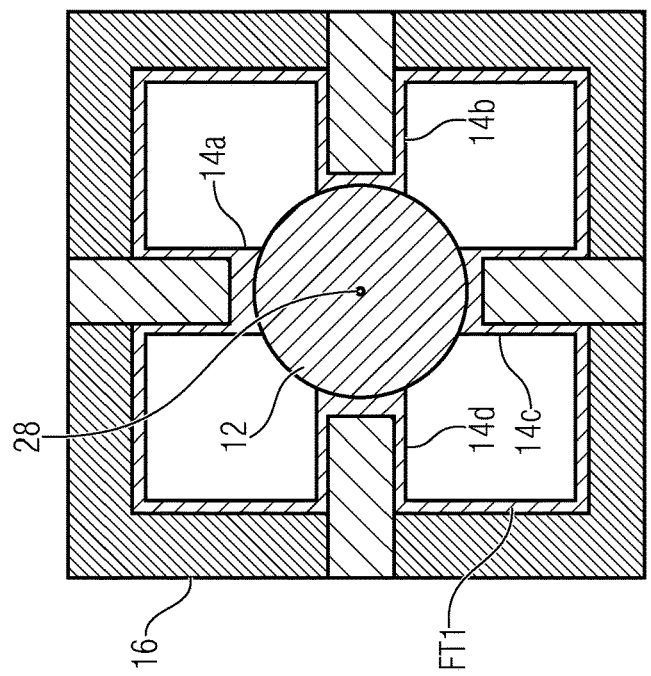
FIG 60B
FIG 60A

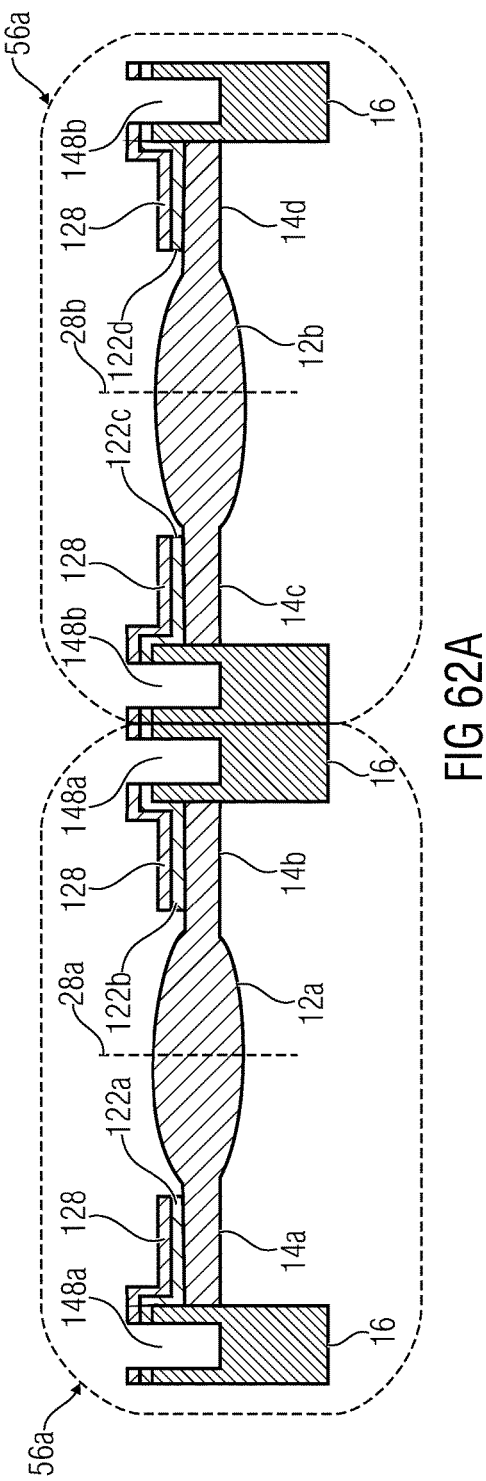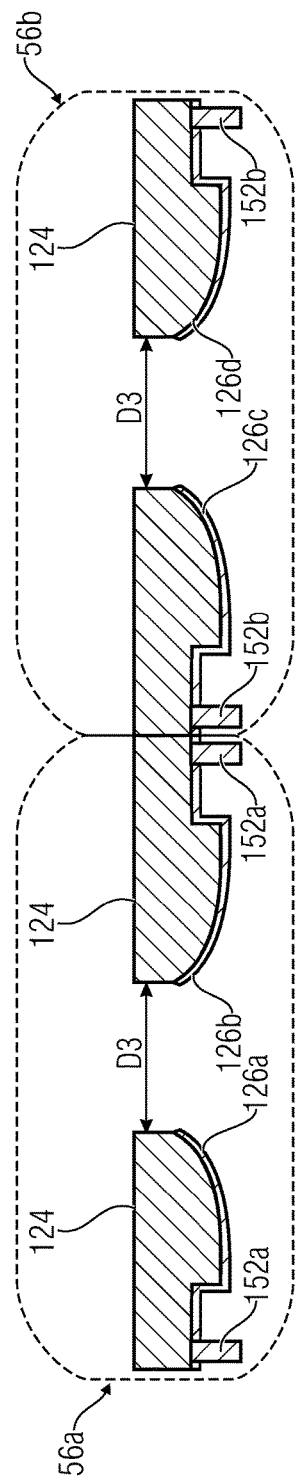

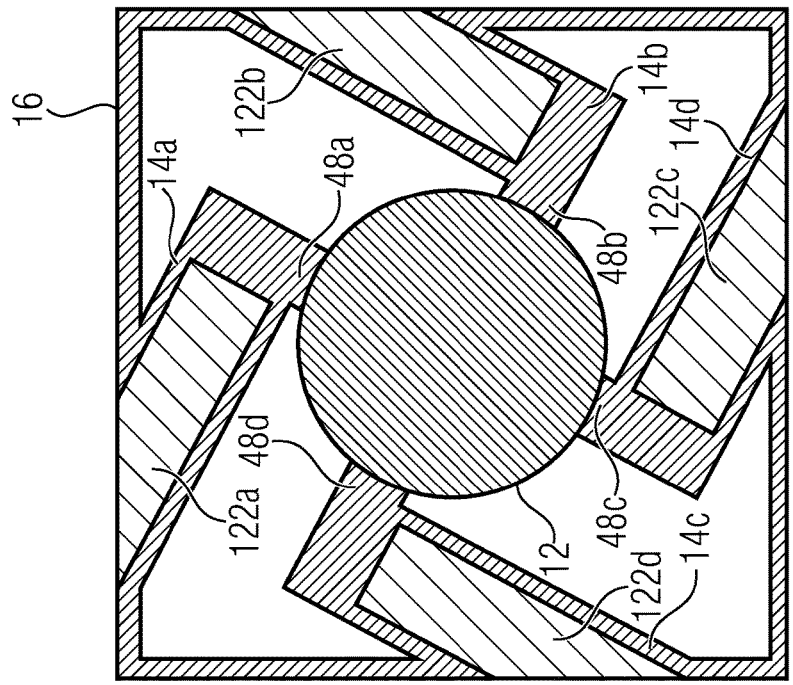
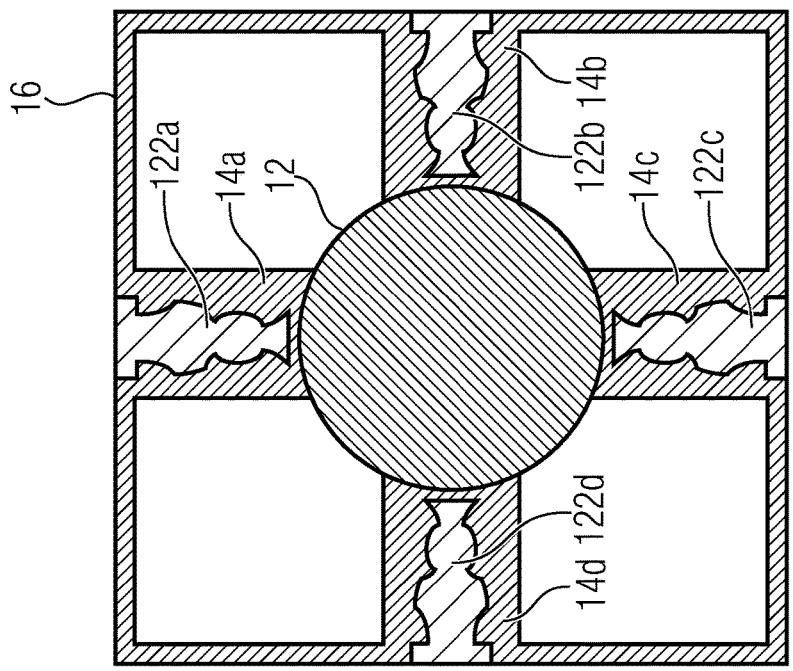

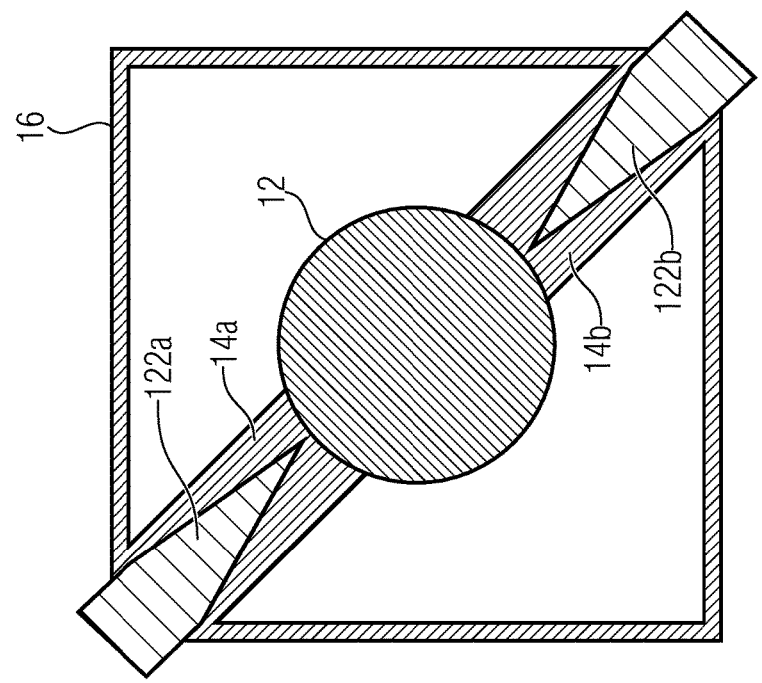
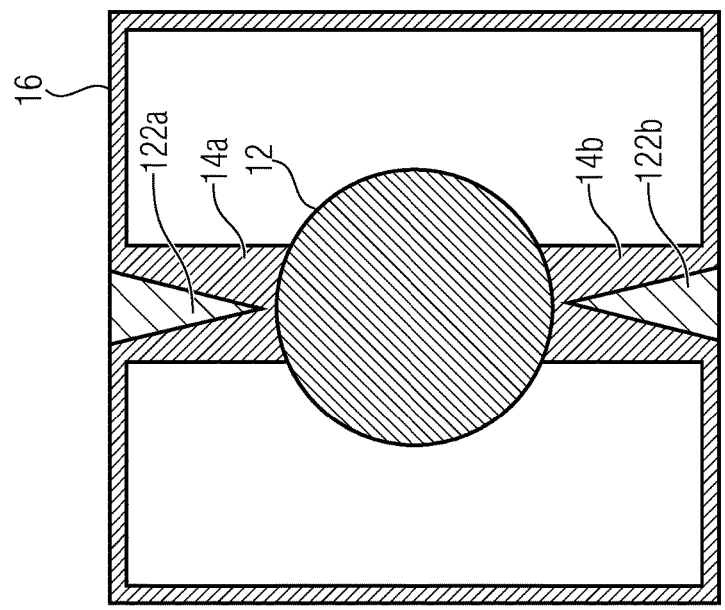
FIG 70
FIG 69

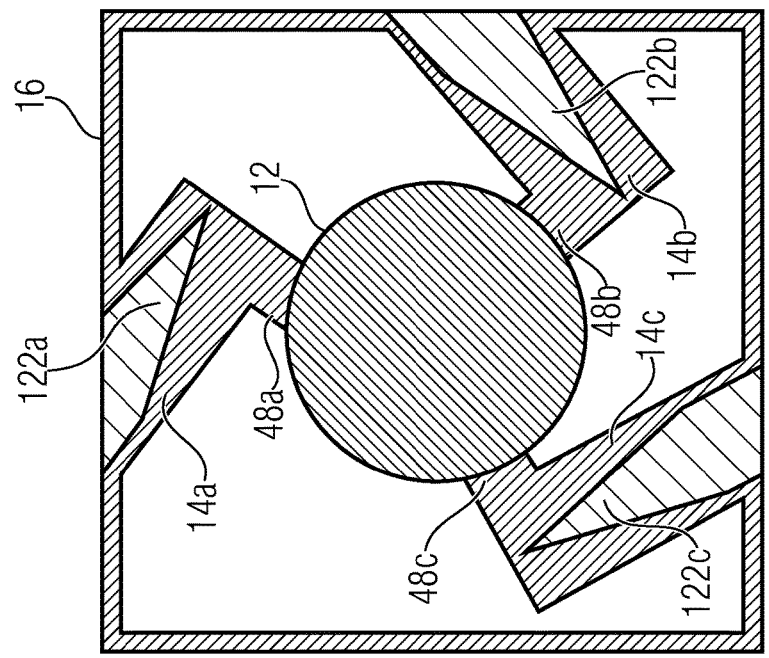
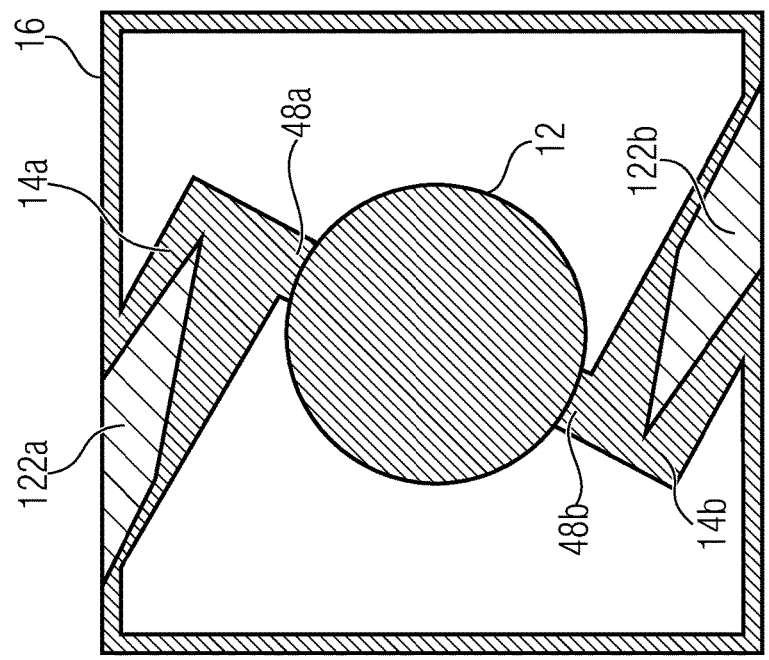

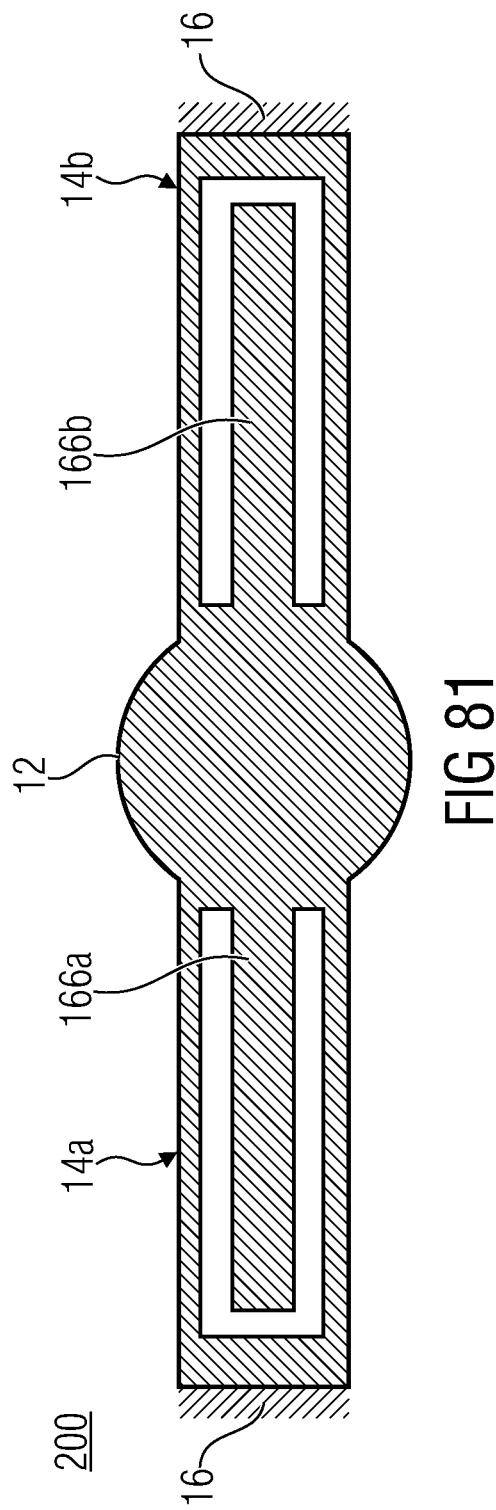

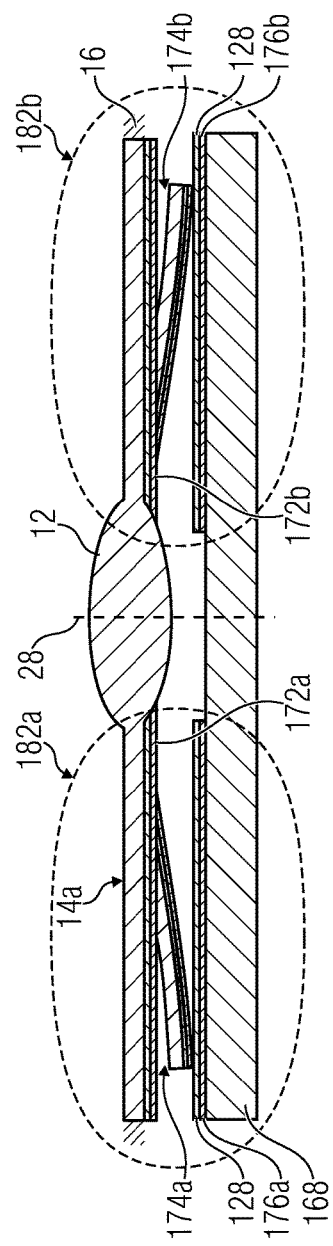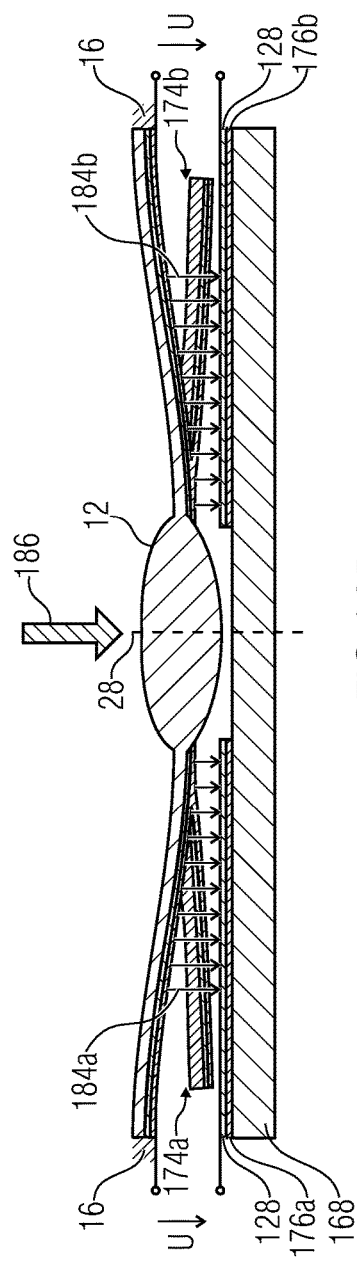

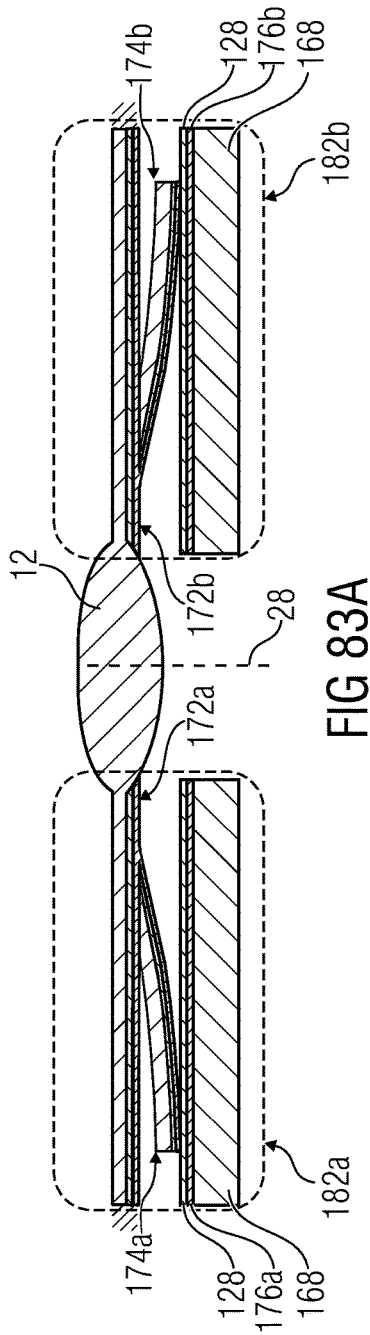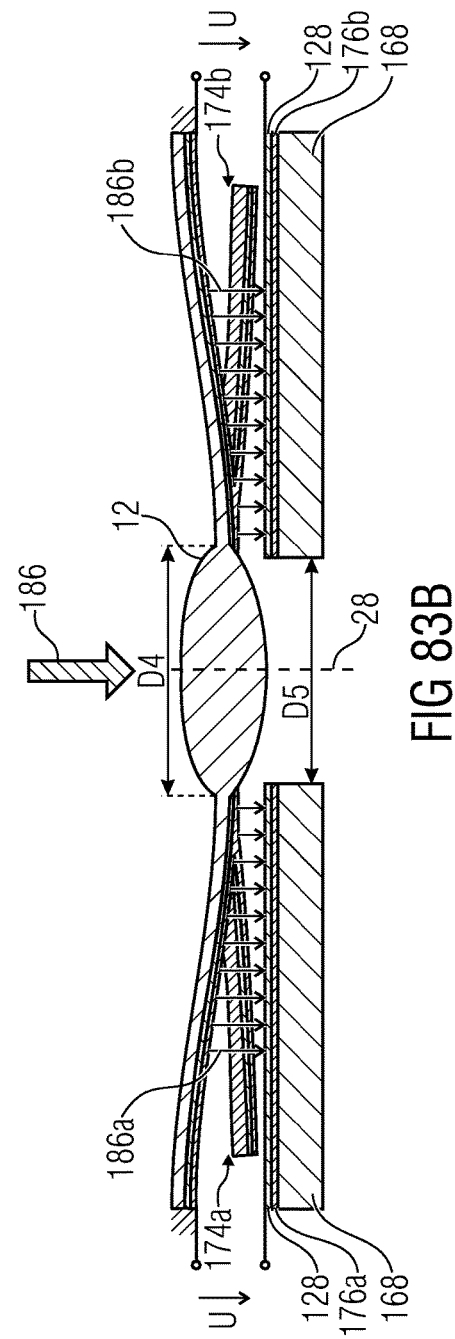

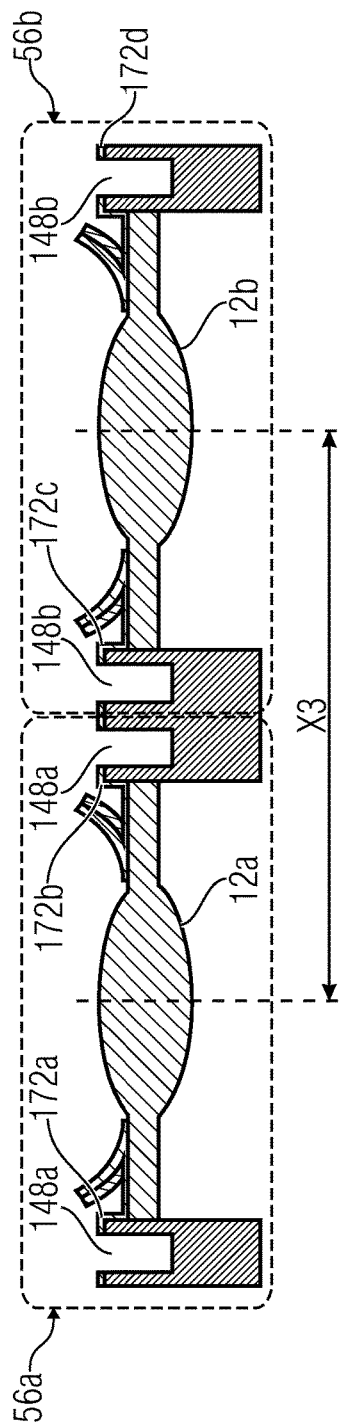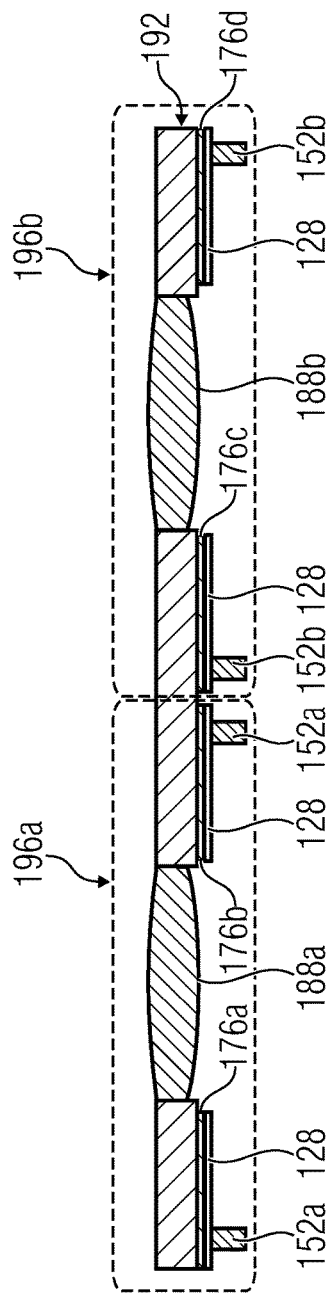

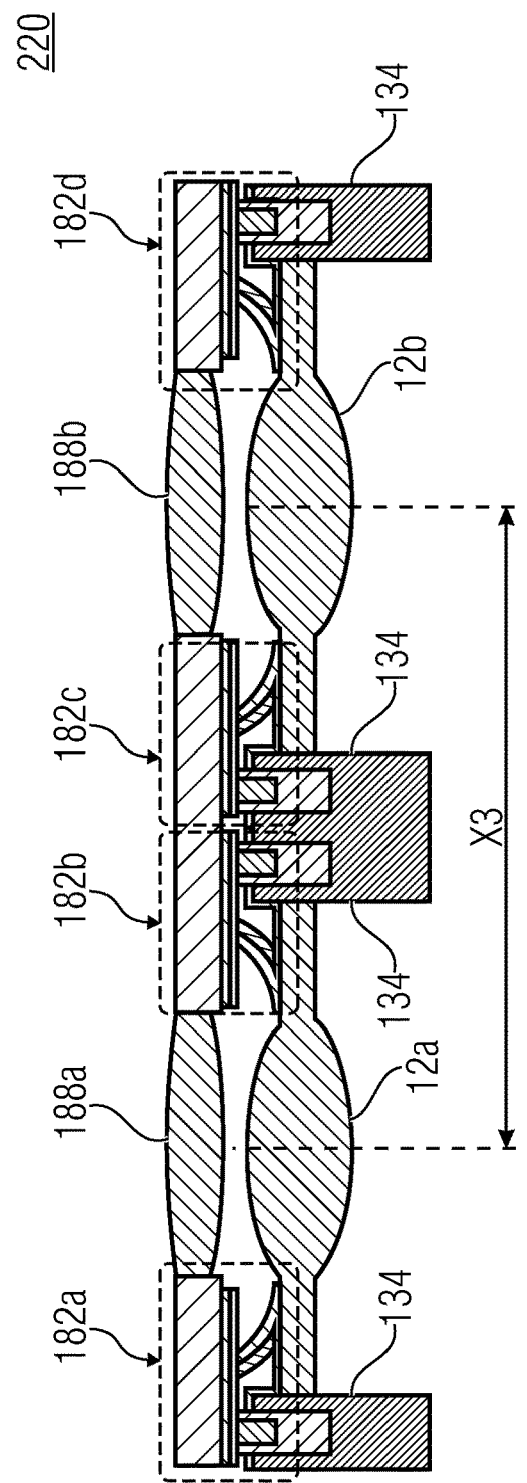

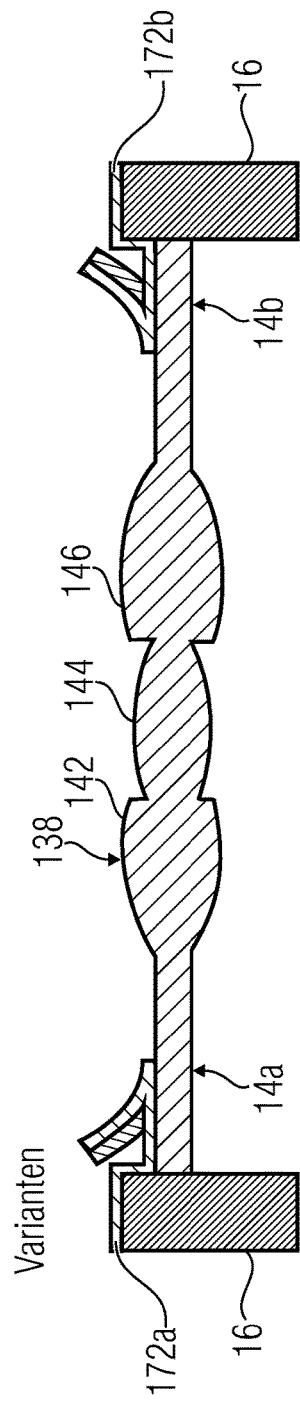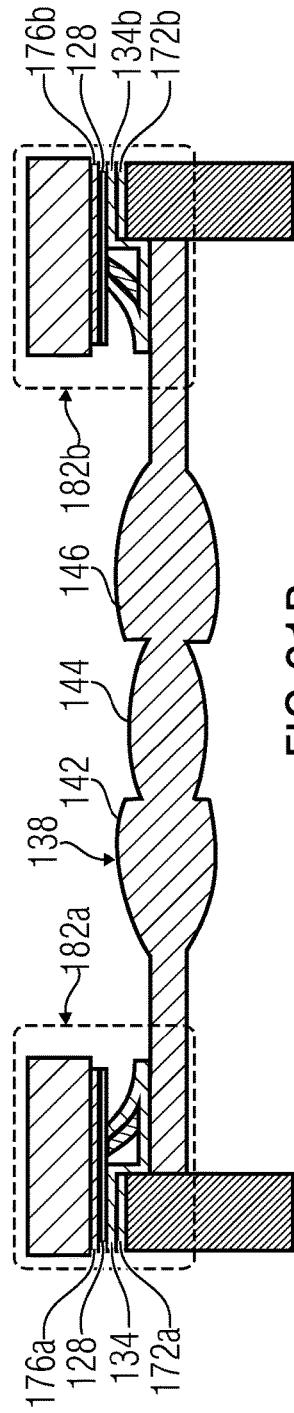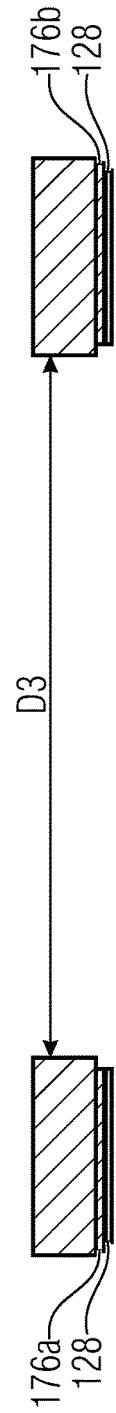

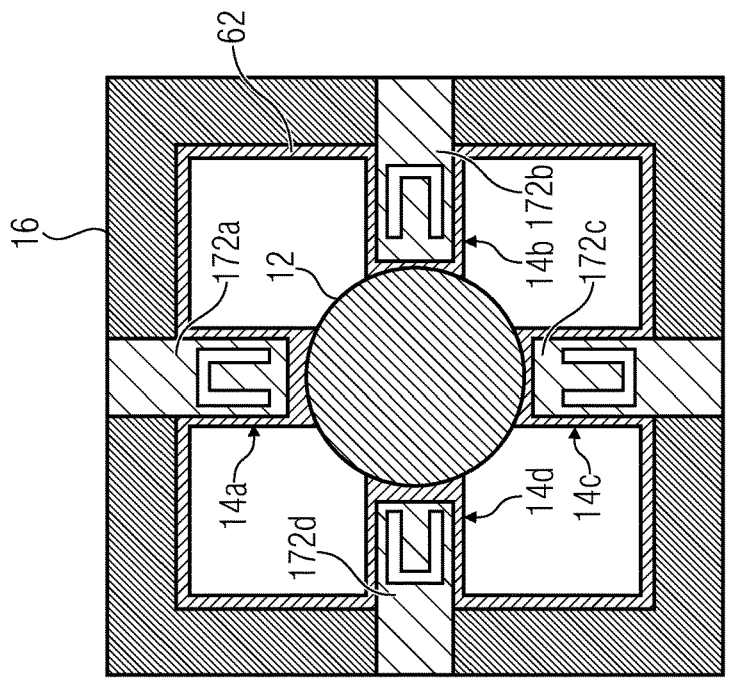
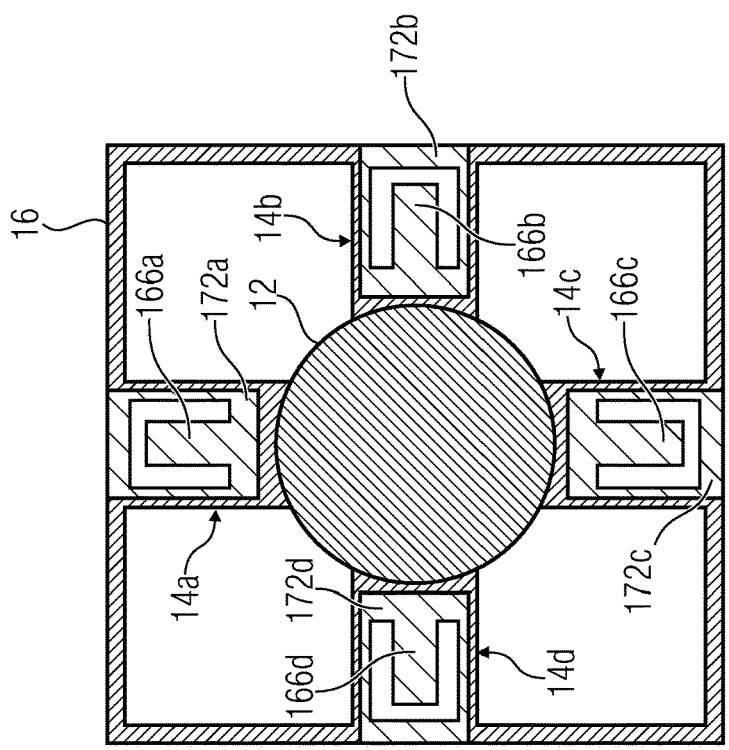
FIG 92A
FIG 92B

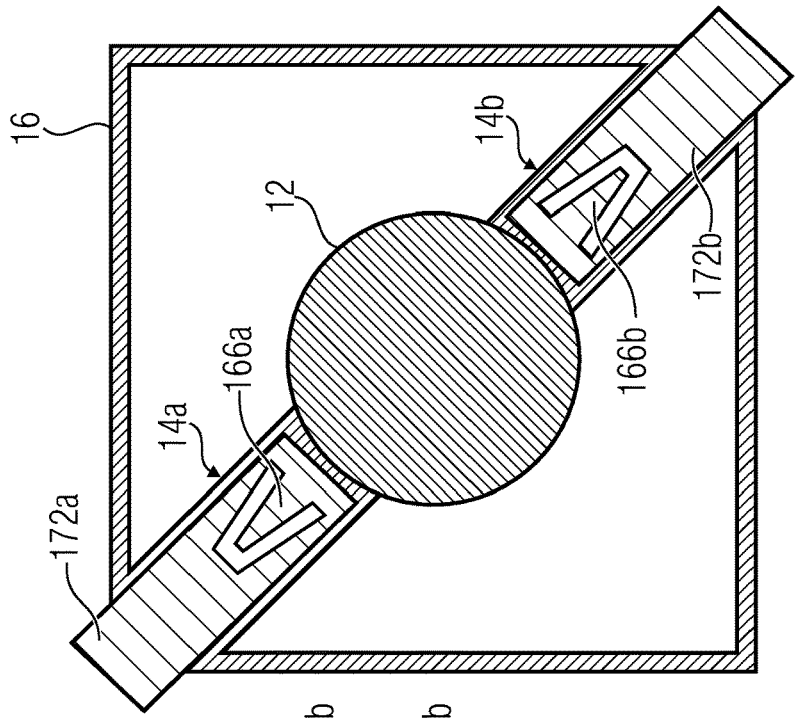
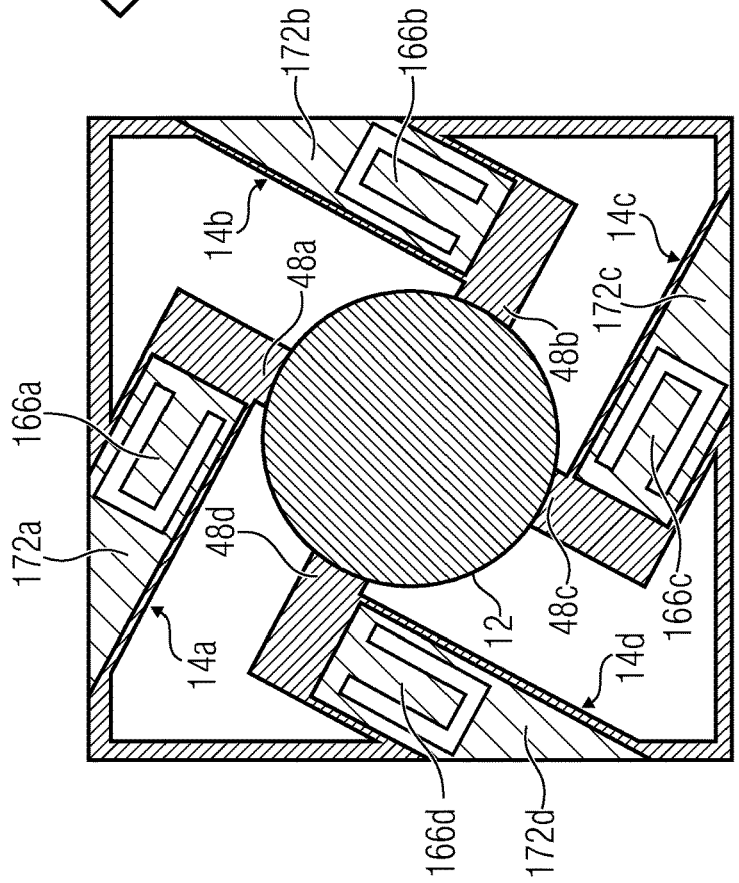

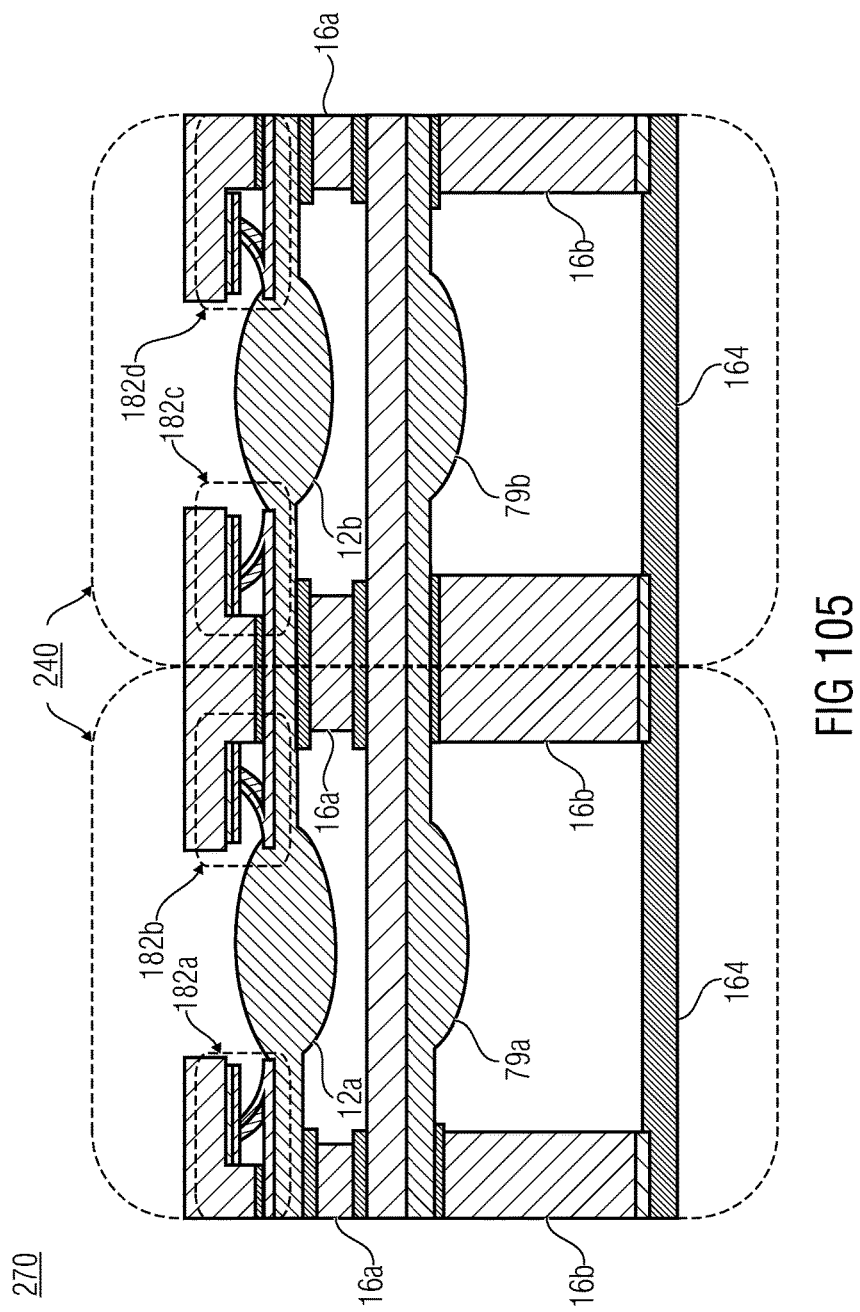

OPTICAL STRUCTURE WITH RIDGES ARRANGED AT THE SAME AND METHOD FOR PRODUCING THE SAME

CROSS-REFERENCE TO RELATED APPLICATIONS

This application is a continuation of copending International Application No. PCT/EP2014/060726, filed May 23, 2014, which is incorporated herein by reference in its entirety, and additionally claims priority from German Application No. 10 2013 209 829.4, filed May 27, 2013, which is also incorporated herein by reference in its entirety.

BACKGROUND OF THE INVENTION

The present invention relates to an apparatus having an optical structure and ridges connecting the optical structure to a supporting structure, wherein the optical structure is able to perform a movement with regard to a reference plane, and the invention also describes possible adjustments for the apparatus.

Optical structures made of curable material, as are known, for example, from DE 102009055080 A1, change their characteristics with varying environmental temperatures. Thus, a polymer lens changes its extension with varying temperature, such that the refractive index and the curvature of the optical lens are also changed. This can have the effect that an optical device, such as a camera or a projector, provides a varying image capturing and/or image reproduction quality.

For compensating a varying image reproduction and/or image capturing quality, lenses and/or lens groups used in optical equipment are readjusted for compensating a thermally induced variation of a focal length of the optical equipment. For this, actuators, such as moving coil drives, piezo motor drives or other motor drives are used. Also, liquid lenses are used which allow a variation of the lens curvature. However, these methods necessitate active adjustment of the focal length of the optical system.

As a result of variations in the manufacturing process of optical components, the parameters of the components, in particular the focal length of the lenses, vary. If the components are joined to more complex structures together with further components, the target parameters of the assembly, for example an objective, might not be obtained. In order to ensure optimum functionality, the components have to be readjusted after joining in order to ensure optimum orientation of the individual components and hence compensation of inaccuracies occurring as a consequence of production and joining tolerances. The main target of adjustment is, for example, optimum orientation of the image plane of a lens or a lens stack with regard to a predetermined image plane, wherein at least one optoelectronic image converter, a so-called imager, resides.

Lenses or lens groups, such as objectives, are cased in one or several housing parts, among others including an external thread. A holder having a corresponding internal thread can be inserted in one or several housing parts, wherein a specific distance, mostly an optimum focal position, is adjusted. After the adjustment has been performed, the position is possibly fixed, for example by an adhesive which can be implemented in a UV-curable manner. In this way, the overall optical structure is adjusted via additional apparatuses that are to be introduced specifically and that are implemented exclusively for this step.

For realizing the autofocus function, among others, voice coil motors are used. The same consist of many individual parts and cannot be produced in wafer level technology.

SUMMARY

According to an embodiment, an apparatus may have: an optical structure; at least two ridges, each connecting the optical structure to a supporting structure; and an electrostatic drive for deflecting the optical structure, wherein the electrostatic drive includes a cantilever electrode and a stationary electrode electrically insulated from the cantilever electrode, which at least partly opposes the cantilever electrode, wherein the cantilever electrode is arranged on or in at least one portion of at least one ridge and wherein the cantilever electrode is at least partly deflected out of a plane where the ridge is arranged in the direction of the stationary electrode, in order to effect deformation of the ridge when an electric field is applied between the cantilever electrode and stationary electrode.

According to another embodiment, a method for producing an apparatus having an optical structure with at least two ridges, each connecting the optical structure to a supporting structure, and an electrostatic drive, may have the steps of: forming the ridges in order to allow a movement of the optical structure in relation to a reference plane; arranging a cantilever electrode on or in a portion of the ridges; arranging the stationary electrode such that the same opposes the cantilever electrode at least partly and is electrically insulated from the cantilever electrode; deflecting the cantilever electrode in the direction of the stationary electrode, wherein applying an electric field between the cantilever electrode and the stationary electrode causes a deformation of the ridge and a movement of the optical structure.

According to a first aspect of embodiments described below, an optical apparatus is provided which is able to counteract variations of optical characteristics caused by temperature variations in a self-regulating manner and independent of further actuators. Apparatuses can be miniaturized and can be produced in wafer level technology, so that a smaller construction size and/or lower production costs can be obtained. According to this aspect, apparatuses can, for example, compensate production tolerances and/or can allow variable focusing during operation of the optical overall system by inducing heat, so that further focusing mechanical members are substituted.

According to the first aspect, an apparatus includes an optical structure having at least two ridges that are implemented to allow a movement of the optical structure with regard to a reference plane. According to the first aspect, a method includes the implementation of ridges such that the same allow a movement of an optical structure arranged at the same, which counteracts a thermally induced variation of the optical characteristic of the optical structure.

According to the first aspect, the fact is exploited that the thermally induced variation, for example of polymer elements of an optical structure, can be compensated by using the thermally induced mechanical variations occurring simultaneously in the ridges in order to counteract the variation of the optical characteristic of the optical structure.

According to an embodiment, the ridges are structured in a single-layered manner. In this case, the ridges can consist of the same material as the optical structure suspended from the ridges, allowing a simplified production. The material can have a higher coefficient of thermal expansion than the supporting structure surrounding the optical structure, which leads, during a temperature increase, to a movement of the optical structure in a direction along the optical axis. The direction of movement of the optical structure is defined by a curvature of the ridges lying in the plane in which the optical axis of the optical structure lies.

According to an alternative embodiment, the ridges are structured in a multi-layered manner, which allows a straight, non-curved implementation of the ridges, and the combination of ridge materials can be formed independent of the coefficients of thermal expansion of the surrounding support structure at which the ridges are mounted, since the bending of the ridges is performed by the different coefficients of thermal expansion of the ridge materials. Decoupling of mechanical and optical characteristics of the layer material can also be obtained when the layers are arranged discontinuously and in more than two layers.

According to an embodiment, the longitudinal center lines of the ridges intersect the optical axis of the optical structure and the ridges are connected to the optical structure at the end. According to an alternative embodiment, the longitudinal center lines of the ridges do not intersect the optical axis of the structure and the ridges are laterally connected to the optical structure via protrusions. The latter example allows a larger longitudinal extension of the ridges and hence the enlargement of the obtainable travel range of the optical structure.

Further embodiments show the option of arranging electrical heating elements at the ridges. This allows a deflection of the ridges and hence a positioning of the optical structure in dependence on an induced temperature and independent of the environmental temperature which can, among other things, be used for active focusing of varying object distances, or an autofocus. By varying deflections of the ridges, tilting of the optical structure or controlled focusing of the optical structure can also be obtained. In particular, a control (not shown) can be provided or can at least be connected, which either controls the heating elements, in order to focus a known object distance, or regulates how, for example in dependence on an evaluation of a signal dependent on the optical characteristic of the optical structure, such as the sharpness of an image captured in an image plane, which is defined at least partly by the optical structure, such as a lens system comprising the lens suspended on the ridges.

A second aspect of embodiments described below relates to a concept which enables maintaining an initial position of an optical structure after performed adjustment to become easier, for example without arranging threads or introducing allocated further mechanical components in housing structures, so that the termination of the adjustment, for example during production, is made easier.

According to the second aspect, an apparatus includes at least two ridges connecting an optical structure to a supporting structure and at which an annealable adhesive is arranged which effects fixing of a predetermined orientation of the optical structure. According to the second aspect, a method includes forming ridges such that the same allow a movement of an optical structure arranged at the same, which counteracts a thermally induced variation of the optical characteristic of the optical structure, arranging an annealable adhesive between the supporting structure and the ridges as well as annealing the adhesive in order to effect a predetermined orientation of the optical structure with regard to a reference plane.

According to the second aspect, the fact is exploited that ridges, by means of an adhesive arranged between the ridges and the supporting structure, obtain deflection of the optical structure to an initial adjustment and by annealing of the adhesive, the adjusted initial position after annealing the adhesive from the optical structure is maintained.

A third and fourth aspect of embodiments described below solve the object of providing a concept for optical apparatuses which is able to induce movements into an optical structure connected to a frame via ridges independent of the environmental temperature and with high dynamics, wherein the actuators used for this are miniaturized and can be produced in wafer level technology, so that a smaller structural size and/or lower production costs can be obtained. According to these aspects, apparatuses can compensate, for example, production tolerances and/or can allow a variable focusing during operation of the optical overall system.

According to the third aspect an apparatus includes at least two ridges connecting an optical structure to a supporting structure and an electrostatic drive having first and second electrodes that are arranged at least partly opposed to one another, and the first electrode being arranged on one of the ridges in order to cause deformation of the ridges when an electric field is applied between the first and second electrodes. According to the third aspect, a method includes the formation of ridges such that the same allow a movement of an optical structure arranged at the same, an arrangement of the first electrode at or in one of the ridges and an arrangement of the second electrode such that the same at least partly opposes the first one and an electric field between the first and second electrodes causes a deformation of the ridges.

According to the third aspect of embodiments described below the fact is exploited that an electrostatic drive having first and second electrodes can be arranged at at least one of the ridges such that applying an electric field between the first and second electrodes of the electrostatic drive causes deformation of the ridge.

According to an embodiment, a first electrode of an electrostatic drive is arranged at the ridges connecting an optical structure to a supporting structure and a second electrode is arranged at a mold component joined to the supporting structure.

According to an alternative embodiment, the second electrode of the electrostatic drive is arranged at the supporting structure so that the arrangement of a mold component can be omitted.

According to an embodiment, the first electrode is arranged at a surface of the ridge and spaced apart from the second electrode via an isolation layer. According to an alternative embodiment, the first electrode is embedded in the ridge so that the ridge material covering the first electrode simultaneously operates as isolation layer.

According to the fourth aspect, an apparatus includes at least two ridges connecting an optical structure to a supporting structure and an electrostatic drive having first and second electrodes arranged at least partly opposite to one another, the first electrode being arranged on at least part of the ridges and this part of the ridge being at least partly deflected in the direction of the second electrode from a plane in which the ridge is arranged in order to effect a deformation of the ridges when an electric field is applied between the first and second electrodes.

According to the fourth aspect, a method comprises the formation of ridges such that the same allow a movement of an optical structure arranged at the same, the arrangement of the first electrode at or in one of the ridges and an arrangement of the second electrode such that the same at least partly opposes the first one, as well as deflection of the first electrode in the direction of the second electrode so that an electric field between the first and second electrodes causes deformation of the ridges.

According to the fourth aspect, the fact is exploited that an electrostatic drive having first and second electrodes can be arranged at at least one of the ridges, a portion of the ridge being formed as an inner part is deflected from the plane of the residual ridge in the direction of the second electrode and that applying an electric field between the first and second electrodes of the electrostatic drive causes a deformation of the ridge.

Embodiments of the invention will be discussed in more detail below. In the figures, the same or equal elements are provided with the same reference numbers.

BRIEF DESCRIPTION OF THE DRAWINGS

Embodiments of the present invention will be detailed subsequently referring to the appended drawings, in which:

FIG. 1a is a cross-sectional illustration of an apparatus having a lens mounted on a supporting structure via two ridges;

FIG. 1c is a state of the apparatus having a lens moved from the original position whose movement counteracts the change of the optical characteristic;

FIGS. 2a-b are schematic cross-sectional views having alternative lens shapes, wherein FIG. 2a shows a plano-convex lens and FIG. 2b a concavo-convex lens;

FIG. 4 is a schematic cross-sectional view of an apparatus having three-layered ridges;

FIGS. 5a-d are schematic side views of different embodiments of two-layered lenses and ridges, wherein FIG. 5a shows the discontinuous arrangement of a second material layer at the lens and the ridges for building a three-layered overall structure, FIG. 5b an apparatus analogous to FIG. 5a having ridges including a discontinuous curve of the thickness, FIG. 5c an apparatus of an integral second material layer including discontinuous changes of the layer thickness, and FIG. 5d an apparatus analogous to FIG. 5c wherein the layer thicknesses in the area of the ridges include a continuous change;

FIG. 6a is a schematic side view of a collecting two-layered lens having a constant thickness of the second layer;

FIG. 6b is a schematic side view of a collecting two-layered lens having a symmetrical layer thickness curve of the first and second layers;

FIG. 6c is a schematic side sectional view of a collecting two-layered lens having a constant thickness of the first layer;

FIG. 6d is a schematic side sectional view of a diffusing two-layered lens, wherein the first layer is implemented in the form of a collecting lens and the second layer in a variable layer thickness is arranged at the first layer;

FIG. 6e is a schematic side sectional view of a diffusing two-layered lens analogous to FIG. 6d, wherein the first layer is implemented in the form of a plano-convex lens;

FIG. 6f is a schematic side sectional view of a diffusing two-layered lens, wherein the second layer is implemented in the form of a concavo-convex lens;

FIG. 13 is a top view of an apparatus analogous to FIG. 7, wherein electric heating elements are arranged at the ridges;

FIG. 14 is a top view of an apparatus analogous to FIG. 8, wherein electric heating elements are arranged at the ridges;

FIG. 17 is a top view of an apparatus analogous to FIG. 11, wherein electric heating elements are arranged at the ridges;

FIG. 18 is a top view of an apparatus analogous to FIG. 12, wherein electric heating elements are arranged at the ridges;

FIGS. 30a-b are two cross-sectional views of an apparatus each where a stationary lens is arranged at the supporting structure, wherein FIG. 30a shows the arrangement of the moving lens at a lower distance and FIG. 30b at a greater distance to the reference plane;

FIGS. 31a-b are two cross-sectional views with one apparatus each having a moving and a stationary lens, wherein a circumferential frame of at least one material of the ridges is formed at the supporting structure, wherein FIG. 31a shows the arrangement of the moving lens at a smaller distance and FIG. 31b at a greater distance to the reference plane;

FIGS. 32a-b are two cross-sectional views with one apparatus each, wherein the stationary lens includes a glass layer and the cross-section of the supporting structure changes across the curve of the layer stack, wherein FIG. 32a shows the arrangement of the moving lens at a smaller distance and FIG. 32b at a greater distance to the reference plane;

FIG. 46 is a cross-sectional view of an apparatus analogous to FIG. 44, wherein an additional internal frame analogous to FIG. 31 of at least one material of the ridges is also arranged and joined by an adhesive layer;

FIG. 47b is a cross-sectional view of an apparatus during the method for fixing a new initial position with a method according to FIG. 47a;

FIGS. 50a-c are cross-sectional views of an apparatus having a lens and ridges as well as a supporting structure which is implemented such that adhesive can be arranged at the same, wherein FIG. 50a shows a convexo-convex lens, FIG. 50b a plano-convex lens, and FIG. 50c a convexo-concave lens;

FIGS. 51a-b are cross-sectional views of an apparatus having a lens stack and ridges as well as a supporting structure which is implemented such that adhesive can be arranged at the same, wherein FIG. 51a shows the arrangement of the moving lens of the stack at a lower distance and FIG. 51b at a greater distance to the reference plane;

FIGS. 52a-b are cross-sectional views of an apparatus having a lens stack and ridges as well as a supporting structure which is alternatively implemented such that adhesive can also be arranged at the same, wherein FIG. 52a shows the arrangement of the moving lens of the stack at a lower distance and FIG. 52b at a greater distance to the reference plane;

FIG. 54a are cross-sectional views of a supporting structure implemented with different widths, a stationary lens at a glass carrier, wherein the supporting structure consists of the same material as the stationary lens at the glass carrier, as well as a moving lens arranged at ridges;

FIG. 54b is a cross-sectional view of an arrangement of two structures analogous to FIG. 54a beside one another, wherein the supporting structure is arranged continuously at the glass carrier in the areas between the structures;

FIG. 54c is a cross-sectional view of an arrangement of two structures analogous to FIG. 54a beside one another, wherein the supporting structure is interrupted in the areas between the structures and areas on the glass carrier exist that are not covered by the supporting structure;

FIG. 57a is a cross-sectional view of an apparatus having electrostatic drives, wherein an isolation layer is arranged at a second electrode in the joined state;

FIG. 57b is a cross-sectional view of the unjoined partial apparatuses of the apparatus according to FIG. 57a;

FIG. 60a is a top view of an apparatus having a lens and four ridges, wherein electrodes are arranged on the ridges and the supporting structure;

FIG. 60b is a top view of a mold component having an isolation layer, below which electrodes are arranged;

FIG. 62a is a cross-sectional view of an apparatus having two adjacent cells, each comprising a moving lens as well as peripheral structures;

FIG. 62b is a cross-sectional view of a mold component which is implemented to be joined to the apparatus of FIG. 62a;

FIG. 67 is a top view of an apparatus analogous to FIG. 65 having electrodes formed in a free form at the ridges;

FIG. 68 is a top view of an apparatus analogous to FIG. 11 having electrodes formed on the ridges whose outer edges run parallel to the ridge edges;

FIG. 69 is a top view of an apparatus analogous to FIG. 8 having electrodes formed triangularly at the ridges;

FIG. 70 is a top view of an apparatus analogous to FIG. 9 having electrodes formed triangularly at the ridges;

FIG. 71 is a top view of an apparatus analogous to FIG. 11 having electrodes formed in a free form at the ridges;

FIG. 72 is a top view of an apparatus analogous to FIG. 12 having electrodes formed in a free form at the ridges;

FIG. 81 is a top view of an apparatus having a lens and two ridges, wherein recesses in the ridges form an inner part of the ridges;

FIG. 82a is a cross-sectional view of an apparatus having a lens and cantilever electrodes deflected in the direction of the static electrodes, wherein the static electrodes are arranged at a transparent mold component;

FIG. 82b is a cross-sectional view analogous to FIG. 82a, wherein the lens experiences deflection;

FIG. 83a is a cross-sectional view of an apparatus analogous to FIG. 82a, wherein the mold component is formed as an opaque body having a material recess;

FIG. 83b is a cross-sectional view of a deflected lens analogous to FIG. 82b with a mold component analogous to FIG. 83a;

FIG. 85a is a top view of a part of an apparatus having a lens and a ridge, wherein the inner part is formed analogous to FIG. 84a;

FIG. 90a are cross-sectional views of an apparatus having two adjacent cells analogous to FIG. 87, wherein the cells each include grooves;

FIG. 90b is a cross-sectional view of a mold component having two sections, wherein each section includes a mold component having an optical effective area;

FIG. 90c is a cross-sectional view of an apparatus including the apparatus of FIG. 90a with a mold component according to FIG. 90b joined to the same by means of adhesive;

FIG. 91a is a cross-sectional view of an apparatus analogous to FIG. 61a, wherein the electrostatic drives include cantilever electrodes;

FIG. 91b is a cross-sectional view of an apparatus analogous to FIG. 61b, wherein the electrostatic drives include cantilever electrodes;

FIG. 91c is a cross-sectional view of a mold component analogous to FIG. 61c which is implemented in a planar manner;

FIG. 92a is a top view of an apparatus having a lens and four ridges analogous to FIG. 7, at the ridges and parts of the supporting structure of which rectangularly formed electrodes having an inner part are arranged;

FIG. 92b is a top view of an apparatus analogous to FIG. 92a, wherein the supporting structure includes a circumferential frame of at least one material of the ridges;

FIG. 93 is a top view of an apparatus analogous to FIG. 7, at the ridges of which electrodes are formed whose inner part is formed in a trapezoidal shape;

FIG. 94 is a top view of an apparatus analogous to FIG. 8, at the ridges of which electrodes are formed whose inner part is formed in a trapezoidal shape;

FIG. 95 is a top view of an apparatus analogous to FIG. 10, at the ridges of which electrodes are formed whose inner part is formed in a rectangular manner;

FIG. 96 is a top view of an apparatus analogous to FIG. 9, at the ridges of which electrodes are formed whose inner part is formed in a trapezoidal shape;

FIG. 97 is a top view of an apparatus analogous to FIG. 11, at the ridges of which electrodes are formed whose inner part is formed in a trapezoidal shape;

FIG. 98 is a top view of an apparatus analogous to FIG. 12, at the ridges of which electrodes are formed whose inner part is formed in a trapezoidal shape;

Figure 99:
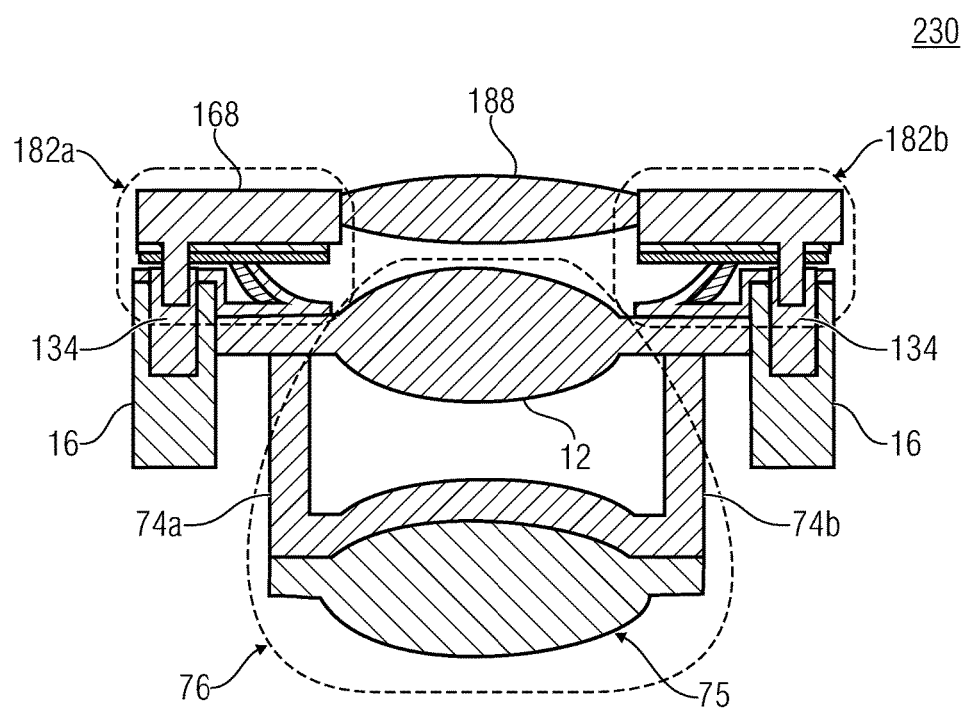
Figure 100:
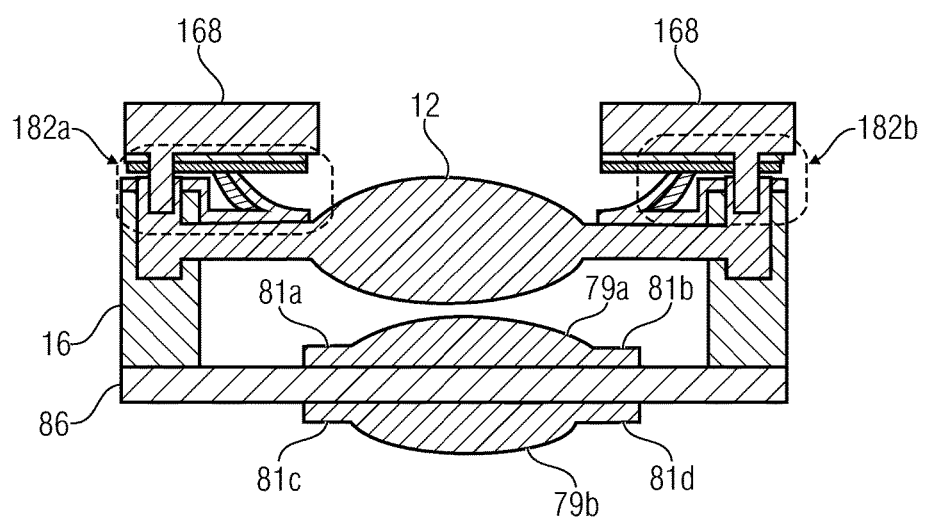
Figure 101:
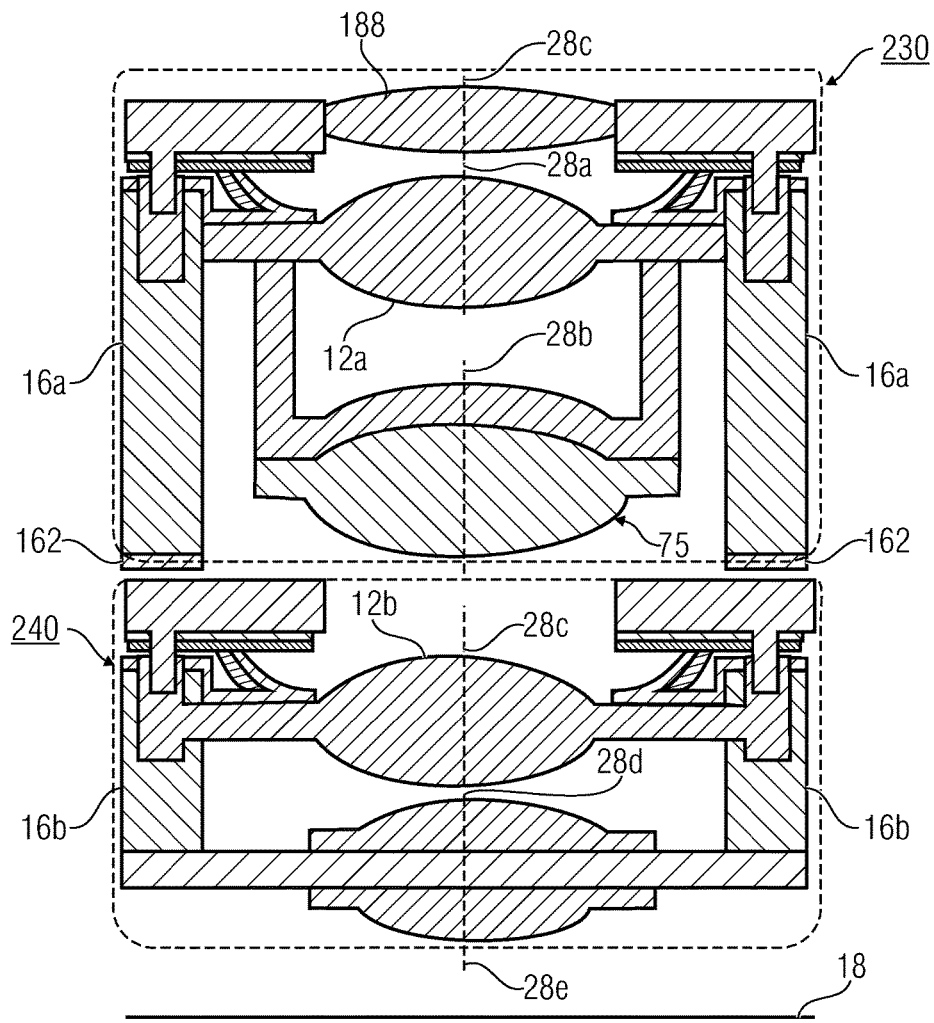
Figure 102:
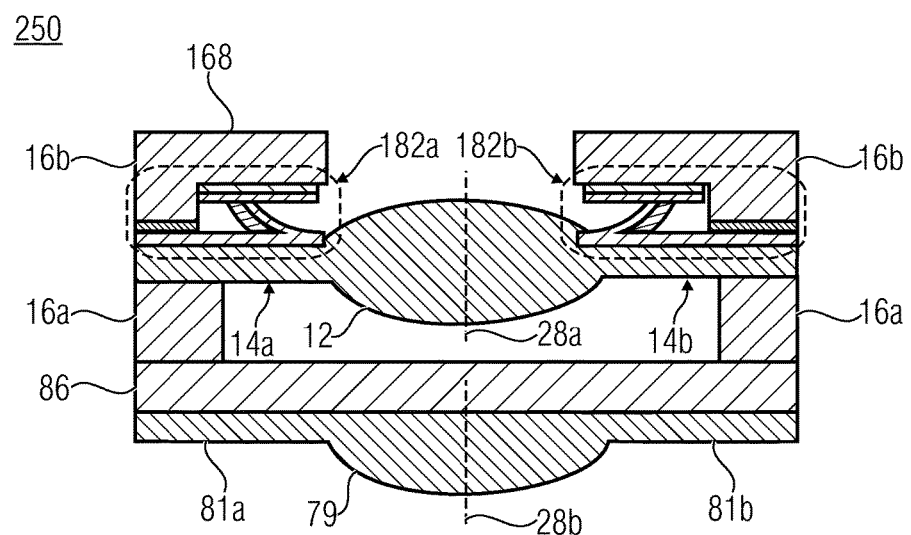
Figure 103:
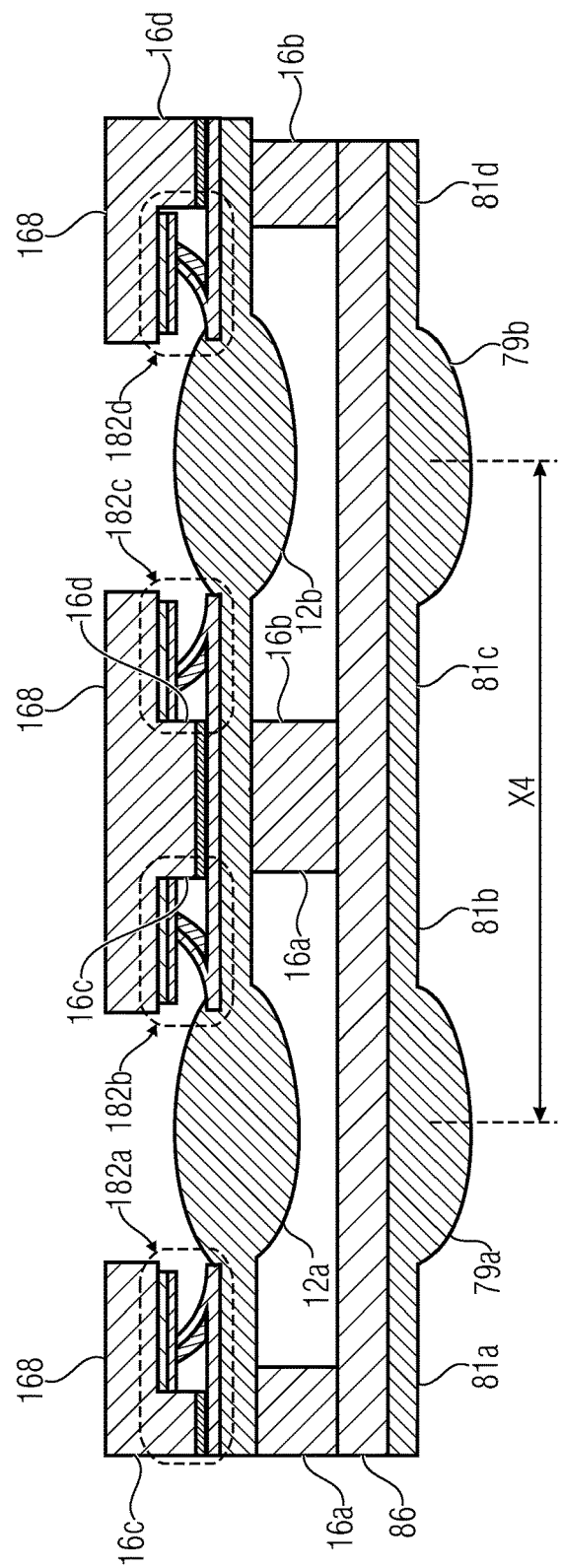
Figure 104:
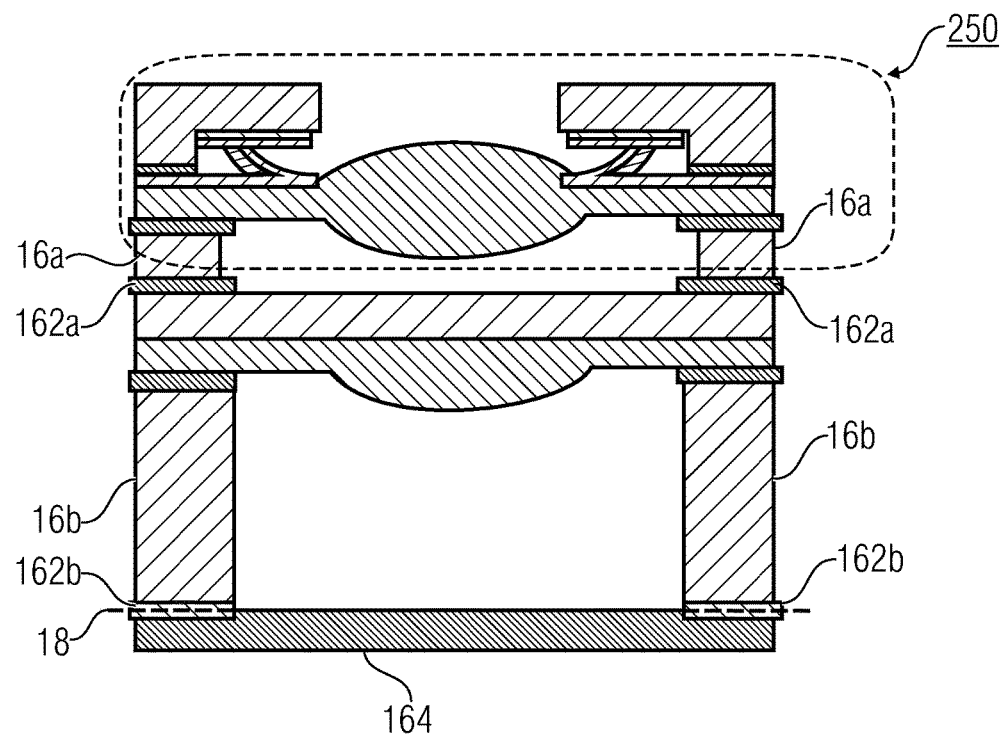

FIG. 99 are cross-sectional views of an apparatus where a mold component having an optical effective area is joined to the supporting structure via grooves and tongues and the electrostatic drives include a cantilever electrode;

FIG. 100 are cross-sectional views of an apparatus wherein a lens is moved by electrostatic drives including a cantilever electrode with regard to a glass wafer, on which a stationary lens is arranged, and the joining zone between the supporting structure of the moving lens and the structure including the counter electrode is implemented as grooves and tongues;

FIG. 101 are cross-sectional views of an overall apparatus consisting of two partial apparatuses, the partial apparatuses being joined via an adhesive layer and the optical axes of the moving, co-moving and stationary lenses as well as the optical effective area essentially coincide and the electrostatic drives including a cantilever electrode as well as the joining zones implemented as grooves and tongues, at which adhesive is arranged for connecting the partial apparatuses;

FIG. 102 are cross-sectional views of an apparatus where the supporting structure is formed of a polymer material and the lens is moved with regard to a glass wafer including a stationary lens at a surface;

FIG. 103 are cross-sectional views of an apparatus having two cells, each including a moving lens with regard to a glass wafer by means of an electrostatic drive and the electrostatic drives including a cantilever electrode;

FIG. 104 are cross-sectional views of an apparatus where a lens is moved by means of electrostatic drives with regard to a glass wafer and an image converter and the electrostatic drives include cantilever electrodes;

FIG. 105 is a cross-sectional view of an apparatus having two adjacent cells, each moving a lens with regard to a glass wafer and an image converter by means of electrostatic drives and the electrostatic drives including cantilever electrodes.

DETAILED DESCRIPTION OF THE INVENTION

FIG. 1a shows a cross-sectional view of an apparatus 10 according to an embodiment of the invention. The apparatus includes a lens 12 mounted on a supporting structure 16, for example a frame, via two ridges 14a and 14b and arranged at a distance 22 to a reference plane 18 shown schematically in FIG. 1. The lens 12 and the ridges 14a and 14b are arranged in a common position plane 26. The reference plane 18 can, for example, represent an image plane where the image sensor comprised by the apparatus 10 is arranged. The distance 22 is selected according to the focal length of the lens 12. The ridges 14 are structured in a single-layered manner of a material including a greater coefficient of thermal expansion than the supporting structure 16. In case of a temperature increase, the ridges consequently expand particularly along the direction from the supporting structure 16 towards the lens 12 more than the supporting structure and can hence effect a deflection of the lens from the original position. The direction of movement is defined independent of the materials, for example via a curvature, as is explained in FIG. 3.

Figure 1B:
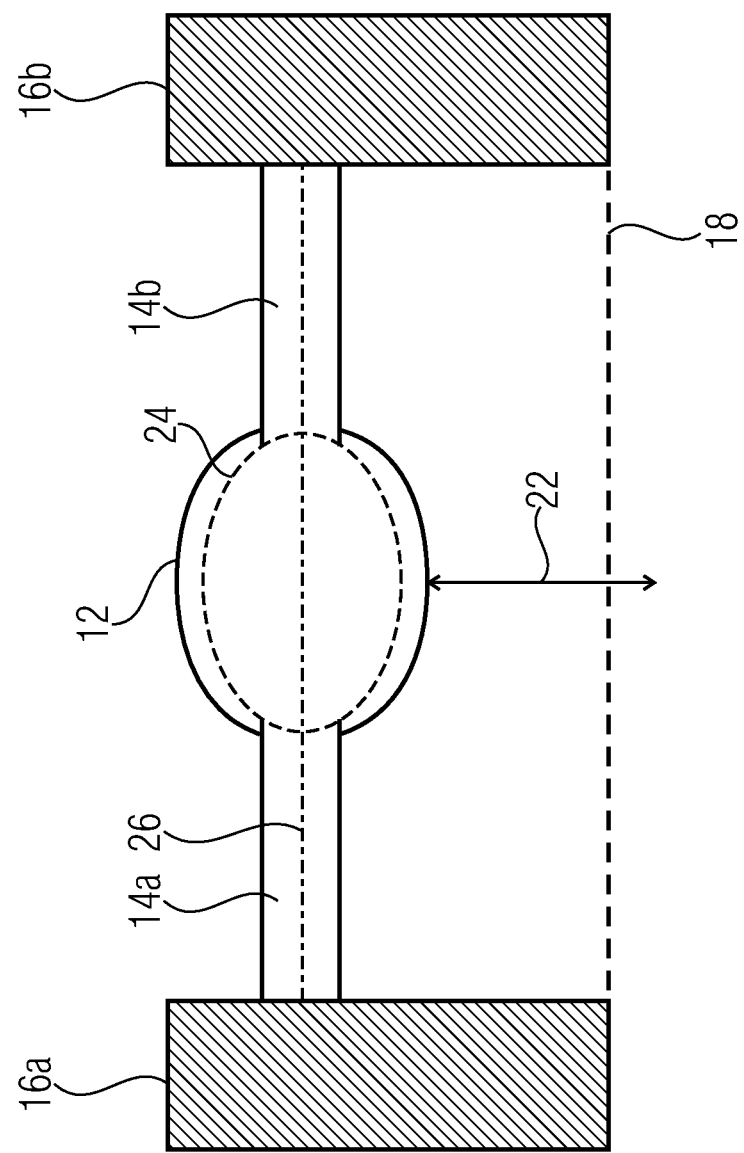
FIG. 1b is a theoretical state of the apparatus having a lens whose optical characteristic is changed by thermal influences.

FIG. 1b shows the lens 12 shown in FIG. 1a in the case of a temperature increase, for example of the environmental temperature. The increase in temperature causes a deformation of the lens 12 causing an altered lens curvature and additionally a change of the refractive index and hence a changed focal length of the lens 12. In FIG. 1b, the dotted line 24 indicates the original shape of the lens 12. As indicated, the increase in temperature has effected a thickening of the lens and additionally a reduction in the refractive index which, on the one hand, reduces the distance 22 between the lens 12 and the reference plane 18 and, as a consequence of the changed surface curvature and the simultaneous change in the refractive index, results in a changed focal length of the lens 12. This has the effect that the resulting focus of the lens indicated by the dotted line 22a lies outside the reference plane 18.

A change in the optical characteristic of the lens 12 caused by an increase in the environmental temperature, as was described in the introductory part of the description of the present application is compensated in that the ridges are implemented such that the temperature increase causes a movement of the ridges 14a and 14b and hence of the lens 12, which counteracts the change in the optical characteristic. In the embodiment described in FIGS. 1a-b, the ridges 14a and 14b effect a movement of the lens 12 away from the reference plane 18, so that the original position of the focus of the lens 12 is maintained independent of the temperature variation. The ridges 14a and 14b are implemented such that a temperature variation, for example a temperature increase, results in a deformation of the ridges 14a and 14b, which themselves result in a movement or a thermally influenced position of the lens 12. The thermally induced change in the length of the ridges 14a and 14b results in a movement of the lens 12 in the direction outside the original position plane 26 along the optical axis 28 of the lens 12. Suitable dimensioning of the ridges 14a and 14b has the effect that the lens 12 is moved such that the unsuitably focused focal length of the lens 12 is focused again on the reference plane 18. Thus, athermization of the apparatus 10 is achieved.

In the following, embodiments for the implementation of the ridges 14a and 14b will be discussed in more detail which allow the compensation of the optical characteristic of the lens 12. Here, it should be noted that the above and the following explanations are in the context of a temperature increase, but the described approach applies analogously for a temperature drop.

Figure 2A:
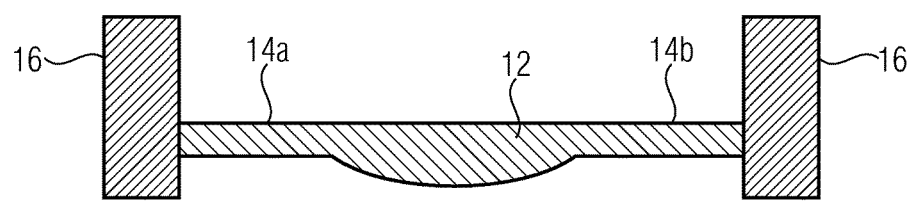
Figure 2B:
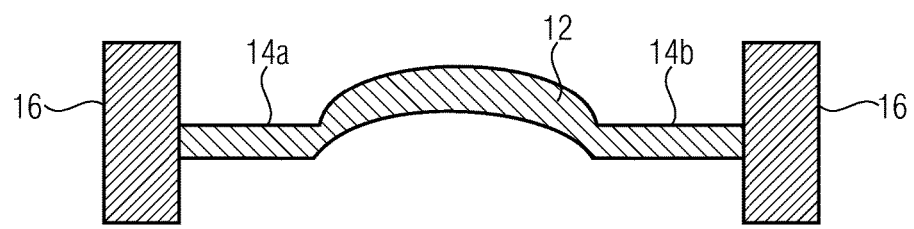

FIG. 2 shows a first embodiment for implementing the ridges 14a and 14b as a single-layered structure. The lens 12 is mounted on the supporting structure 16 via the ridges 14a and 14b. Due to the single-layered implementation of the ridges 14a and 14b, integral implementation of the ridges 14a, 14b and the lens 12 becomes possible. FIG. 2a shows a plano-convex lens 12 and FIG. 2b a concavo-convex lens 12. The lens can have any possible implementation, such as concave, convex, biconcave, biconvex, concavo-convex, convexo-concave or a planar side.

Figure 3:
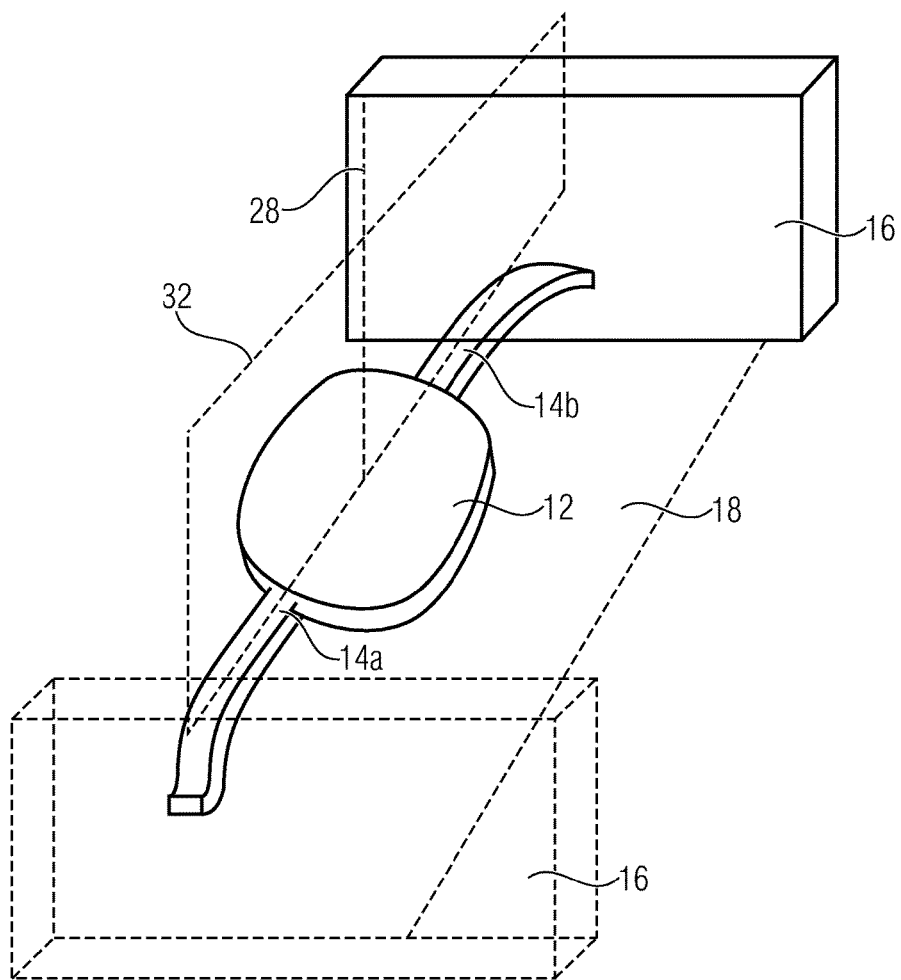
FIG. 3 is a perspective view of single-layered ridges having a curvature.

FIG. 3 shows the apparatus of FIG. 1 in a perspective view. The single-layered ridges 14a and 14b have a curvature along their geometry in the plane 32, including the optical axis 28 of the lens 12. If the temperature increases and the lens 12 and the ridges 14a and 14b are heated, the curvature of the ridges 14a and 14b in the present embodiment defines a movement of the lens along the optical axis 28 away from the reference plane 18, wherein the lens maintains its orientation to the reference plane 18. If the ridges 14a and 14b were implemented in a straight manner, the direction of movement of the lens 12 would be undefined in the case of a temperature variation. A direction of movement of the lens 12 directed towards the reference plane 18 in the case of a temperature increase can be obtained by changing the implementation of the curvature of the ridges 14a and 14b. An advantage of this embodiment is the implementation of lens 12 and the ridges 14a and 14b of one material, wherein the implementation can take place integrally. An integral implementation can result in a great simplification of the production process of the lens 12 and the ridges 14a and 14b since joining of different components can be omitted. Such an arrangement can be produced as a simple multiplier at wafer level, allowing significant cost reduction.

FIG. 4 shows an embodiment for implementing the ridges 14a and 14b as a three-layered structure. The ridge 14a is formed of a first layer 34a and a second layer 36a. The ridge 14b is formed of a first layer 34b and a second layer 36b. The second material layers 36a and 36b are formed discontinuously on the first material layers 34a and 34b and both spaced apart from the lens 12 and from the supporting structure 16. However, the same can also be implemented across the whole first material layers 34a and 34b and can be arranged at the lens 12 or the supporting structure 16. A discontinuous layer structure allows attuning the mechanical characteristics of the second material layers 36a and 36b with regard to the deflection of the ridges during a temperature variation. Also, the coefficients of thermal expansion of the materials of which the ridges 14 are formed can be implemented independent of the coefficient of thermal expansion of the supporting structure 16, since amplitude and direction of movement are defined by the different coefficients of thermal expansion of the material layers 34 and 36 and the material layers 34 and 36 expand differently during a temperature increase. Also, further material layers 37a; 37b which extend the mode of operation of the ridges 14 can be arranged at the ridges.

Figure 5D:
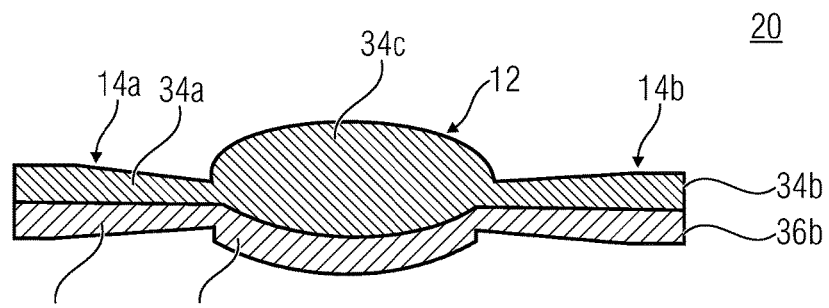
Figure 5C:
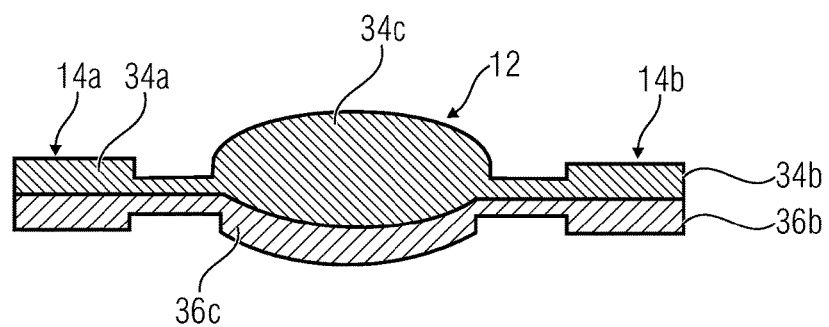
Figure 5B:
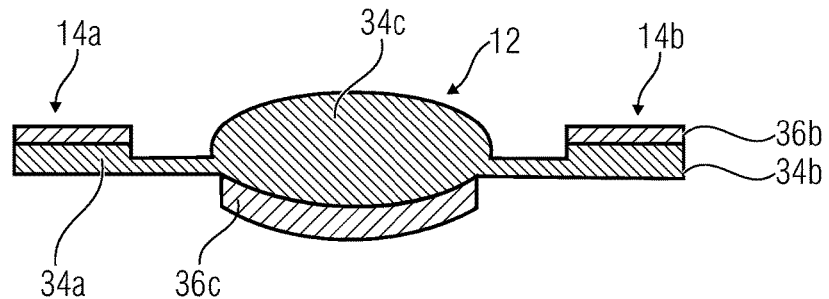
Figure 5A:
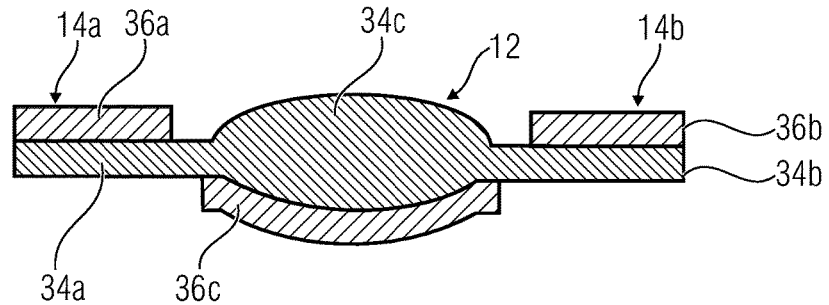

FIGS. 5a-d show an apparatus 20 where both the ridges 14a and 14b and the lens 12 include two material layers or two material layers form both the ridges and the lens. FIG. 5a shows an arrangement of the second material layers 36a and 36b on the first material layers 34a and 34b analogous to FIG. 4, wherein the material layers 34a, 34b and 34c form a first layer of the arrangement and the material layers 36a and 36b form a second layer of the arrangement. Up to the end of the ridges 14a and 14b facing away from the lens 12, the material layers 34a and 34b are covered with the second material layer 36a and 36b. The lens 12 is also formed of a first material layer 34c and a second material layer 36c discontinuously attached to the same, wherein the material layer 36c extends into an area of the ridges 14a and 14b. The material layer 36c is arranged on a side of the material layers 34a, 34b and 34c facing away from the layers 36a and 36b, and thereby represents a third layer of the overall structure. Due to the discontinuous arrangement of the additional ridge layers 36a, 36b and the additional lens material 36c as well as the three-layered structure, optical characteristics of the lens 12 can be defined in a manner decoupled from the mechanical characteristics of the ridges 14a and 14b.

In FIG. 5b, the layers 34a and 34b of the ridges 14a and 14b exhibit a discontinuous increase in the layer thickness. At the areas of the layers 34a and 34b increased in that way, the second material layers 36a and 36b are arranged and take on a mechanical function. Contrary to FIG. 5a, the layer 36c forming the third layer of the structure is merely implemented in the area of the lens 12, whereby the deformation of the ridges is merely defined by the ridge materials 34a, 34b, 36a and 36b.

In FIG. 5c, the material layers 36a, 36b and 36c are integrally formed and arranged at the material layers 34a, 34b and 34c and hence form a two-layered overall structure. The layers 34a, 34b, 36a and 36b exhibit a discontinuous change in the layer thickness which can, for example, have mechanical reasons.

FIG. 5d shows an apparatus according to FIG. 5c, wherein the thicknesses of the layers 34a, 34b, 36a and 36b continuously change across an area of the ridges 14a and 14b and exhibit a constant layer thickness in a different area facing away from the lens 12.

FIG. 6 represents different embodiments of two-layered ridges 14a and 14b as well as two-layered lenses 12, wherein FIGS. 6a-c each show a collecting lens 12 and FIGS. 6d-f a diffusing lens. The ratio of the thickness of the first layer 34a-c to the second layer 36a-c is arbitrary. Thus, one of the two layers 34a-c and 36a-c can have a constant thickness, like layer 34a-c in FIG. 6c, or a varying thickness, such as layer 36a-c in FIG. 6f. Also, layers 34a-c and 36a-c can each have a constant ratio of the thicknesses to one another, as in FIG. 6b where the ratio is 1:1.

Figure 7:
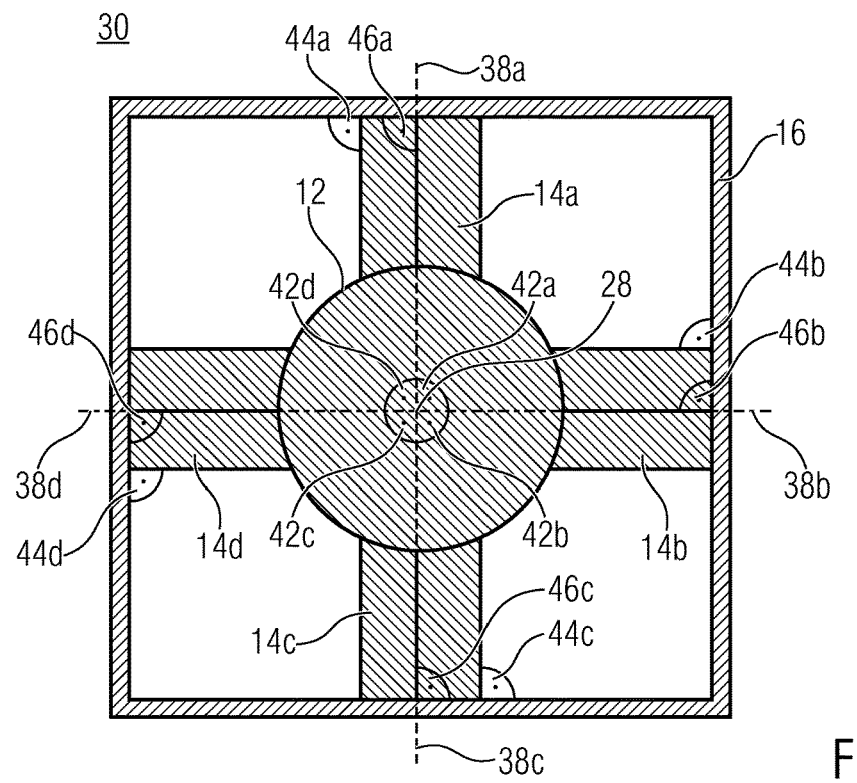
FIG. 7 is a top view of an apparatus having a lens and four ridges, wherein the longitudinal center lines of the ridges intersect the optical axis of the lens.

FIG. 7 shows a top view of an apparatus 30 with an embodiment where the lens 12 is connected to a supporting structure 16 via four ridges 14a-d. The ridges 14a-d are arranged such that their longitudinal center lines 38a-d intersect the optical axis 28 of the lens 12 and the ridges 14a-d oppose each other in pairs and the angles 42a-c form a right angle between two adjacent longitudinal center lines 38a-d. In this embodiment, the ridges 14a-d lead at a right angle to the supporting structure 16 formed with a planar surface, so that the angles 44a-d between the outer edge of the ridges 14a-d and the supporting structure 16 as well as between the longitudinal center lines 46a-d and the supporting structure 16 each form a right angle.

Figure 8:
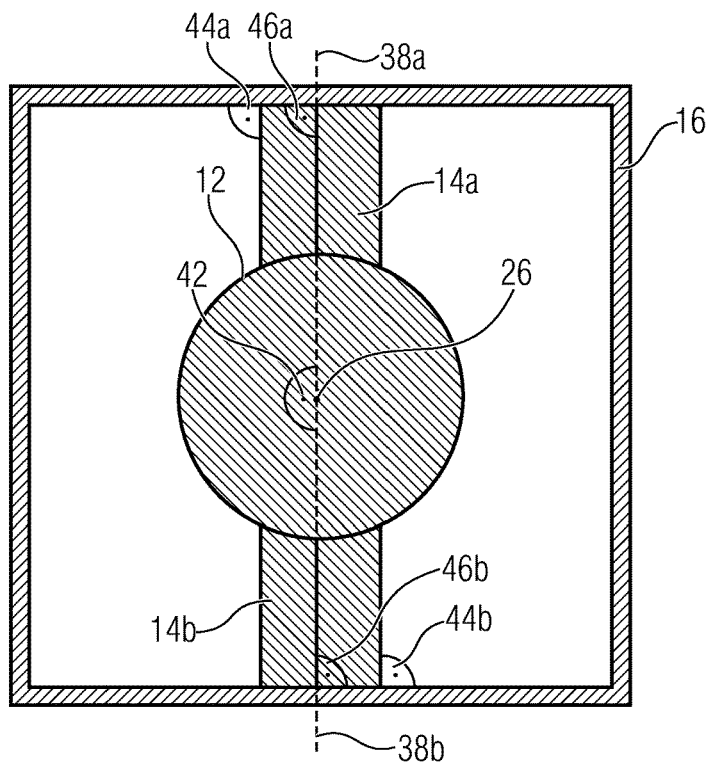
FIG. 8 is a top view of an apparatus having a lens and two ridges, wherein the longitudinal center lines of the ridges intersect the optical axis of the lens.

FIG. 8 shows an embodiment according to FIG. 7, where merely two ridges 14a and 14b are arranged in an opposing manner and connect the lens 12 to the supporting structure 16. In this case, the longitudinal center lines form an angle 42 of 180 degrees to one another.

Figure 9:
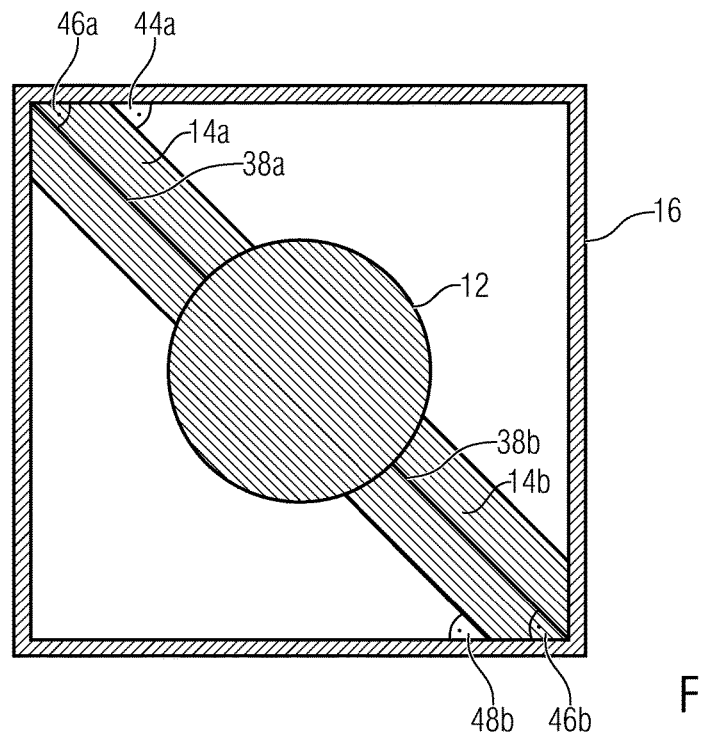
FIG. 9 is a top view of an apparatus having a lens and diagonally arranged ridges.

FIG. 9 shows an embodiment according to FIG. 8, wherein the ridges 14a and 14b are arranged diagonally to the supporting structure 16 and lead to two areas of the supporting structure each, wherein the angles 46a, 46a, 48a and 48b form an angle differing from 90 degrees.

Figure 10:
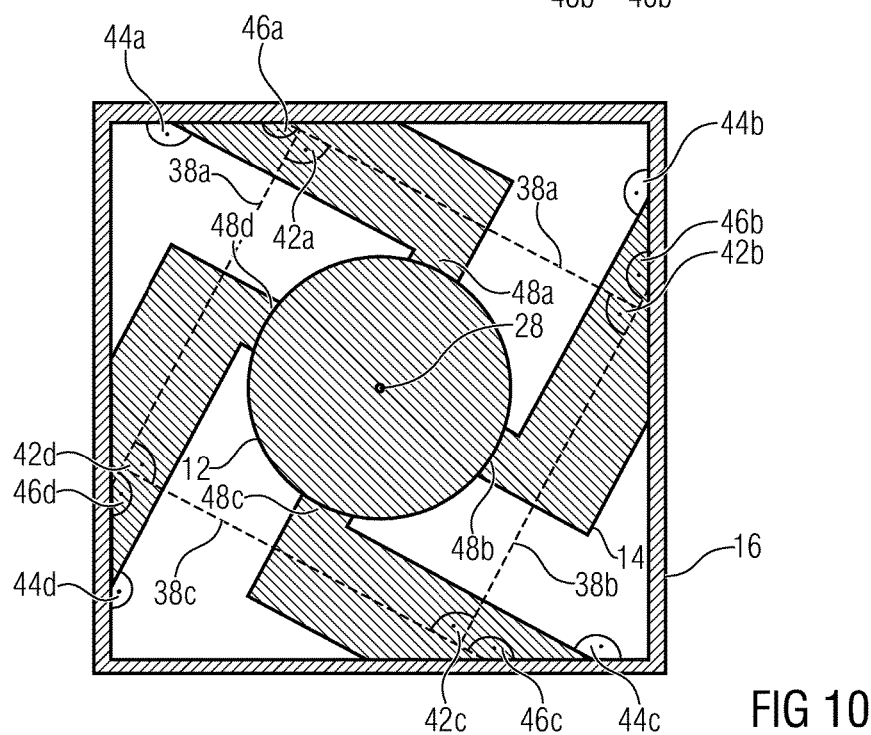
FIG. 10 is a top view of an apparatus having a lens and four ridges, wherein the longitudinal center lines of the ridges run past the optical axis of the lens.

FIG. 10 shows an embodiment as an alternative to FIGS. 7 and 8, where the ridges 14a-d are arranged such that they lead diagonally to the supporting structure 16, so that the angles 44a-d and 46a-d form an angle differing from 90 degrees and their longitudinal center lines 38a-d run past the optical axis 28 of the lens 12. On their ends facing the lens 12, the ridges 14a-d comprise formations 48a-d connecting the ridges 14a-d to the lens 12.

Compared to FIGS. 7-9, such an embodiment allows a greater longitudinal expansion of the ridges 14. The greater longitudinal extension can be used to obtain a greater obtainable travel range of the ridges 14, since the amplitude of the deflection of the lens 12 mounted on the ridges 14 along the optical axis 28 depends on the length of the ridges 14.

Figure 11:
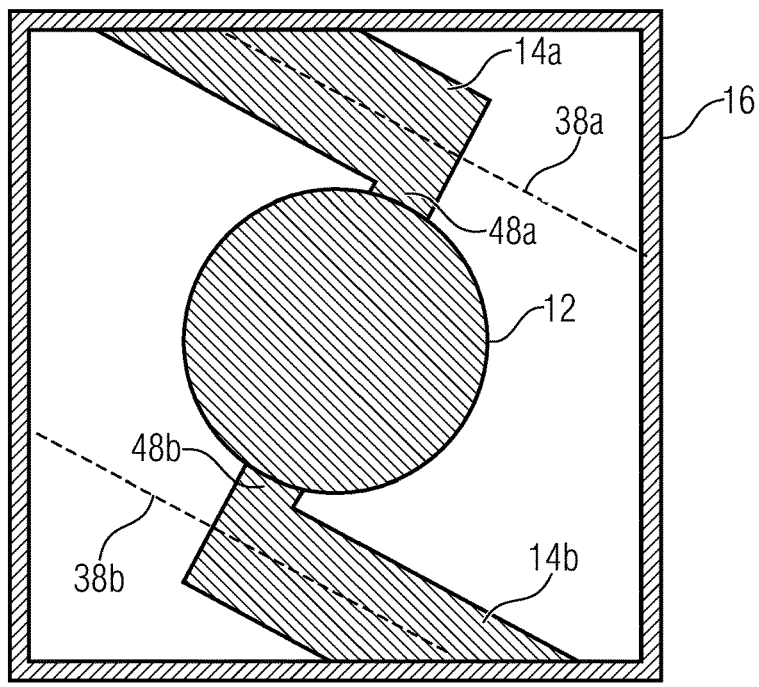
FIG. 11 is a top view of an apparatus having a lens and two ridges, wherein the longitudinal center lines run past the optical axis of the lens.

FIG. 11 shows an embodiment as an alternative to FIG. 10, wherein merely two ridges 14a and 14b which are offset and parallel to each other connect the lens 12 to the supporting structure via formations 48a and 48b.

Figure 12:
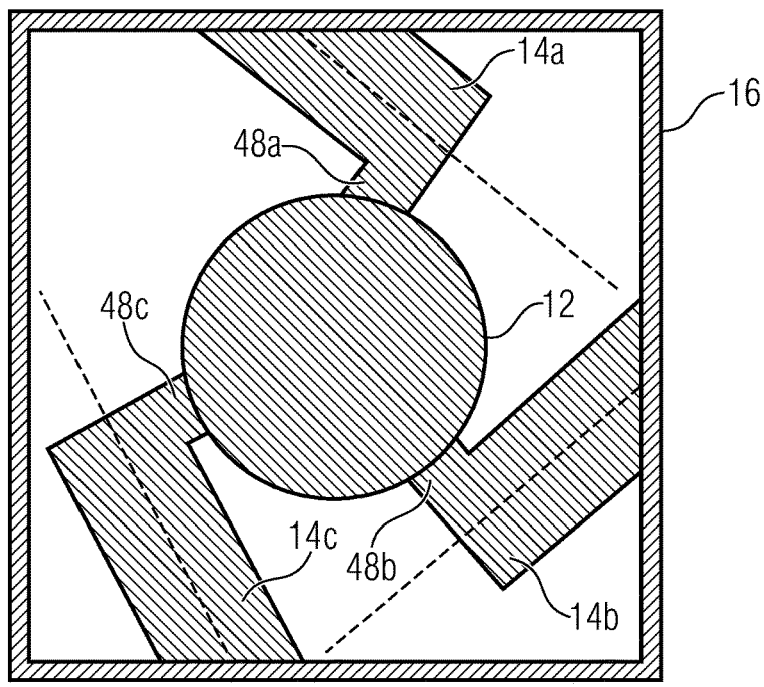
FIG. 12 is a top view of an apparatus having a lens and three ridges, wherein the longitudinal center lines of the ridges run past the optical axis of the lens.
Figure 16:
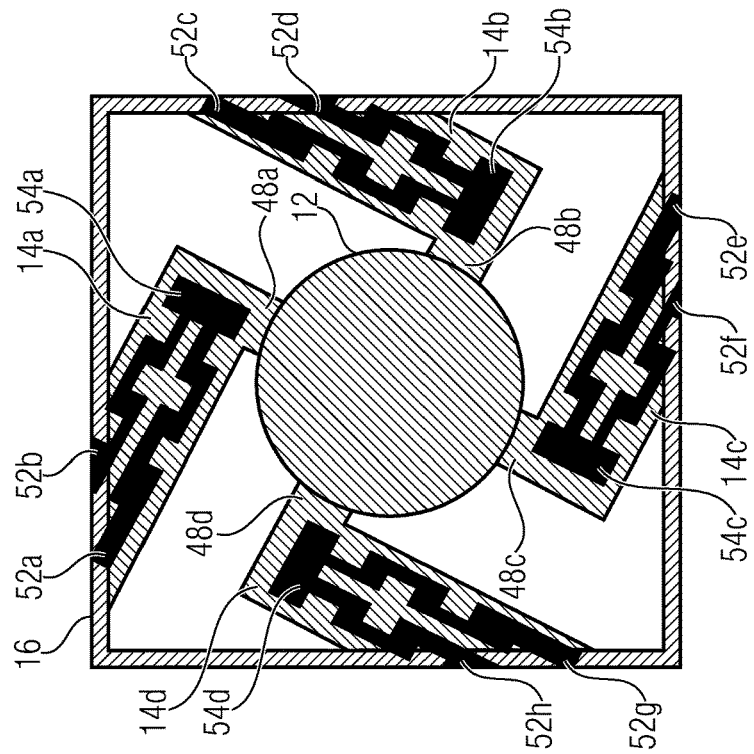
FIG. 16 is a top view of an apparatus analogous to FIG. 10, wherein electric heating elements are arranged at the ridges.
Figure 15:
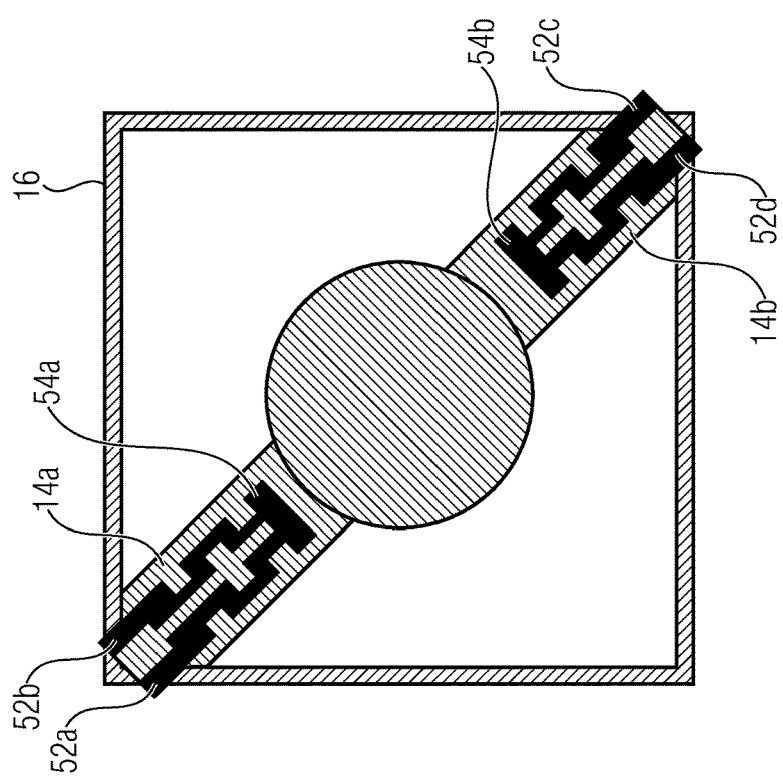
FIG. 15 is a top view of an apparatus analogous to FIG. 9, wherein electric heating elements are arranged at the ridges.

FIG. 12 shows a further embodiment according to FIGS. 10 and 11, wherein three ridges 14a-c arranged symmetrically around the lens 12 connect the lens 12 to the supporting structure via formations 48a-c.

The number of ridges and their arrangement can basically be arbitrary for use of the ridges 14. Here, it should be noted that, although the above and below embodiments describe a straight implementation of the ridges 14 along the curve from the supporting structure 16 to the lens 12, also another implementation, for example curved in a lateral direction, i.e. in a projection along the layer thickness direction or the optical axis, is possible. In this case the angles 44 and 46 can have differing values. Also in all embodiments, a rectangular or square implementation of the layout of the supporting structure 16 on the reference plane 18 is illustrated. However, the formation of the geometry of the supporting structure is generally arbitrary.

FIG. 13 shows the apparatus of FIG. 7 where heating elements 52a-j are arranged on a side of the ridges 14a-d. The heating elements 52a-j can, for example, be implemented electrically in the form of ohmic traces and are implemented to heat the ridges 14a-d locally and independent of the environmental temperature and can thereby effect a deflection of the ridges 14a-d and hence a movement of the lens 12. The shape of the heating elements can be straight, like the heating elements 52c and 52f, or have a rectangular curve, such as the heating element 52a. Alternatively, a meandering implementation of one or several heating elements 52a-j is possible. At each ridge 14a-d, an electrically conductive collecting ridge 54a-d is arranged, to which the heating elements 52a-j arranged on the ridges 14a-d lead. In this embodiment, contacting the heating elements 52a-j is performed at the stationary end of the ridges 14a-d and adjacent to the supporting structure 16, it can, however, be performed at any location of the electrodes. The heating elements 52a-j can both be implemented differently or be supplied with different electric potentials and currents, so that an individual heating performance can be adjusted for each heating element 52a-j.

FIGS. 14-18 show apparatuses analogous to FIGS. 7-12, wherein the above-described heating elements 52 and collecting ridges 54 are arranged at one side of the ridges 14. The electric heating elements 52 can be deposited or sputtered onto the ridges 14 by a printing method or vapor deposition by means of a template.

Figure 19:
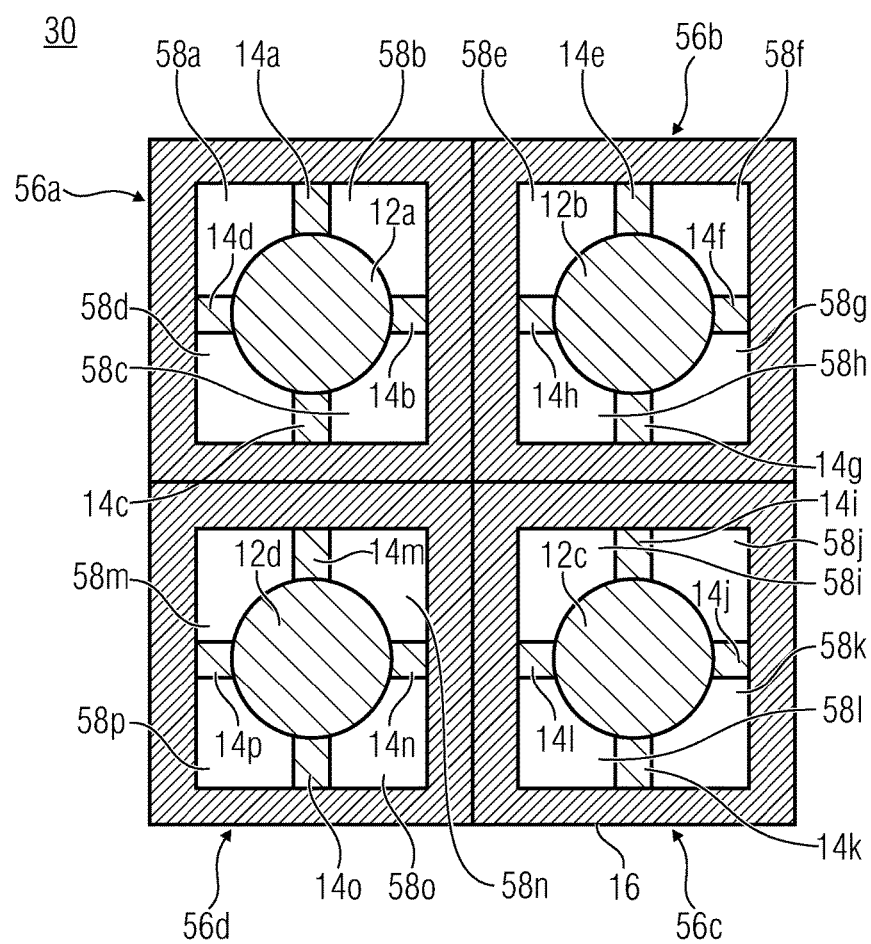
FIG. 19 is a schematic top view of an apparatus having four lenses connected to the supporting structure via four ridges each.

FIG. 19 shows an apparatus 30 having four lenses 12a-d each connected to the supporting structure 16 via ridges 14a-d, 14e-h, 14i-l and 14m-p. Each of the cells 56a-d enclosed by the supporting structure 16 represents an apparatus analogous to FIG. 7. In areas where light remains uninfluenced by lenses 12a-d, ridges 14a-p or the supporting structure 16, passageways 58a-p result. The supporting structure 16 is formed of a light-absorbing material and represents, for each cell 56a-d, a barrier for light processed in an adjacent cell 56a-d by the lens located therein.

Figure 20:
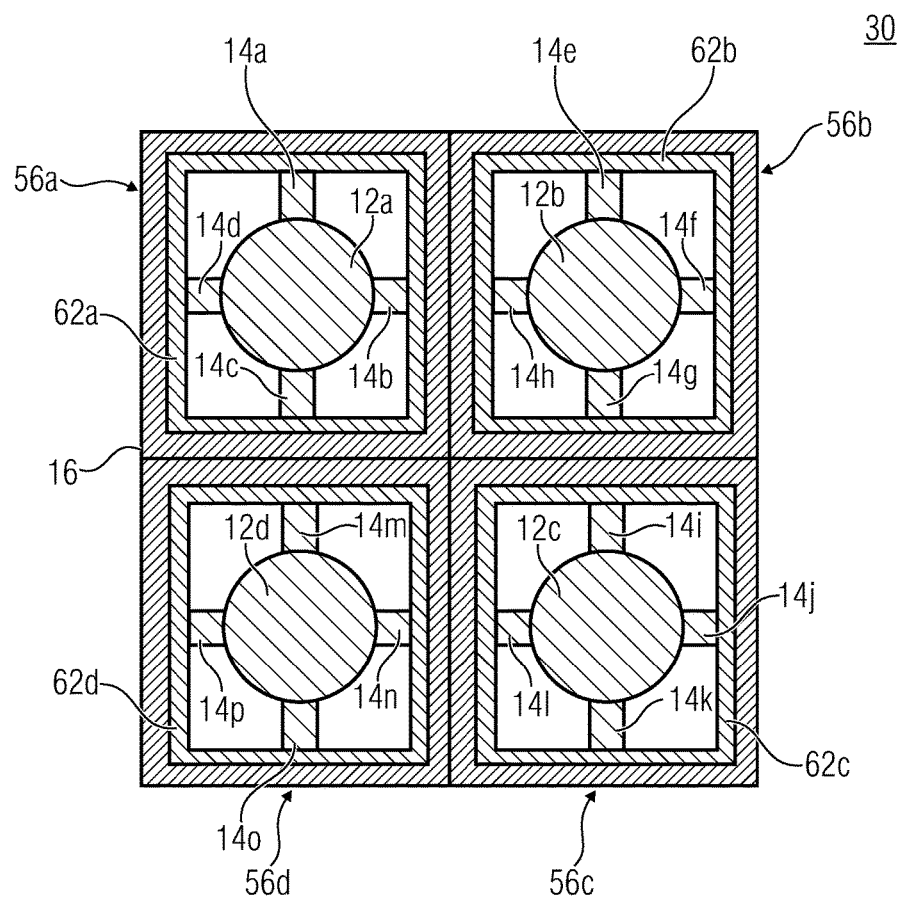
FIG. 20 is a schematic top view of an apparatus having four lenses connected to the supporting structure via four ridges each and wherein the supporting structure includes a circumferential frame of at least one material of the ridges.

FIG. 20 shows the apparatus 30 where the ridges 14a-d, 14e-h, 14i-1 and 14m-p arranged within a cell each lead to a part of the supporting structure 16 implemented as a circumferential frame 62a-d and consisting of at least one material of which the ridges 14a-p are formed. The frames 62a-d are attached to the light-absorbing material of the supporting structure 16. This embodiment can allow a simpler contacting of the ridges 14a-p with the supporting structure, since no direct material transition exists between the ridges 14a-b and the supporting structure 16, but the material transition is implemented between the frame 62 and the light-absorbing material, wherein the frame 62a-d abuts without a gap on the residual supporting structure 16 and the cells are arranged adjacent to one another.

Figure 21:
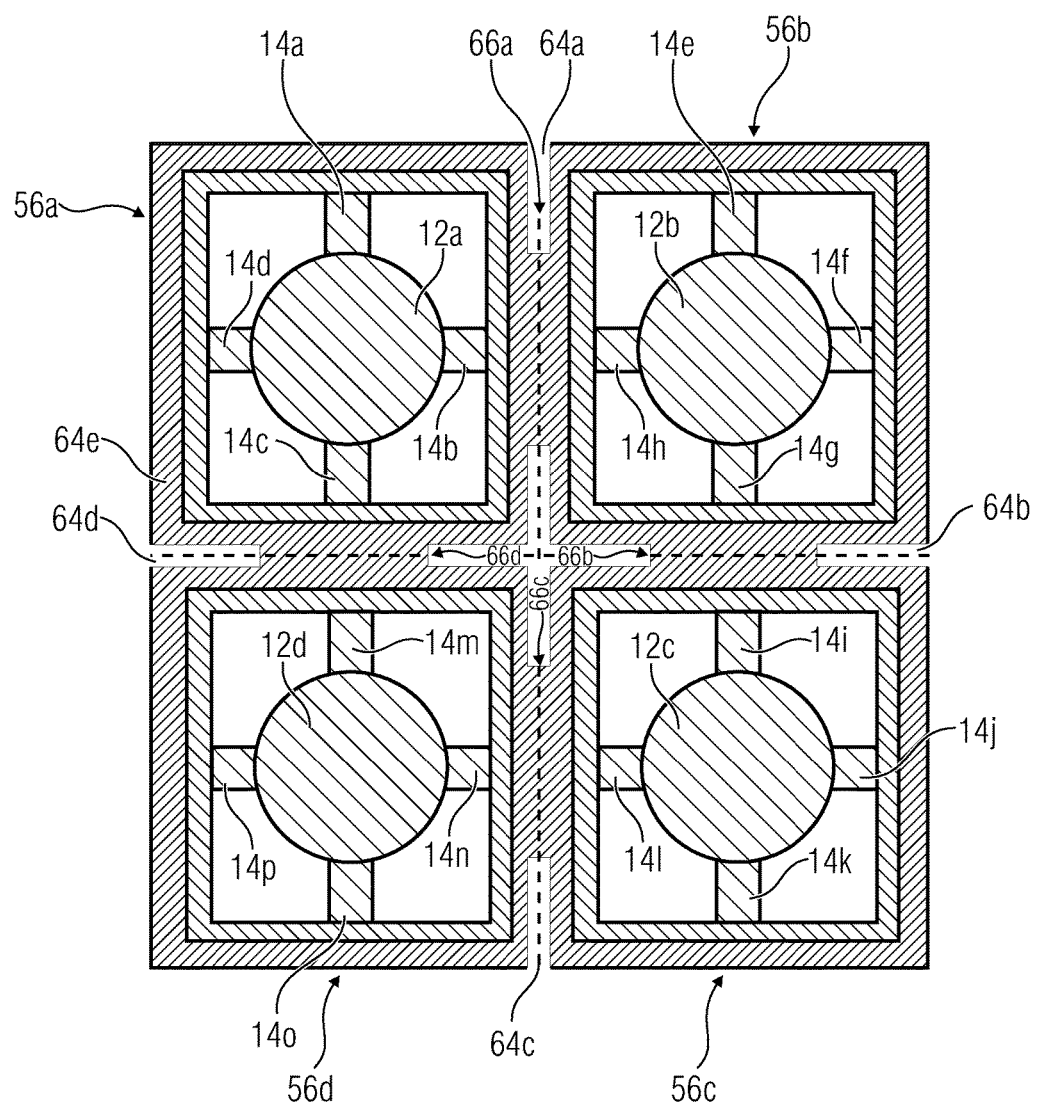
FIG. 21 is a top view of an apparatus having four lenses connected to the supporting structure via four ridges each, the supporting structure including a circumferential frame of at least one material of the ridges and the supporting structure further including recesses.

FIG. 21 shows an apparatus analogous to FIG. 20, wherein the supporting structure 16 includes recesses 64a-e, so that the cells 56a-d are only connected to one another via areas of the supporting structure 16 implemented as ridges 66a-d. This allows material and hence cost savings during production of the apparatus and can also result in better characteristics regarding the stability between the cells, in particular material tensions in the supporting structure 16 induced by thermal variations can be reduced. Further, separating the cells 56a-d, which might be necessitated in a further processing step, can be performed in a time-saving manner since only little material has to be cut through.

Figure 22:
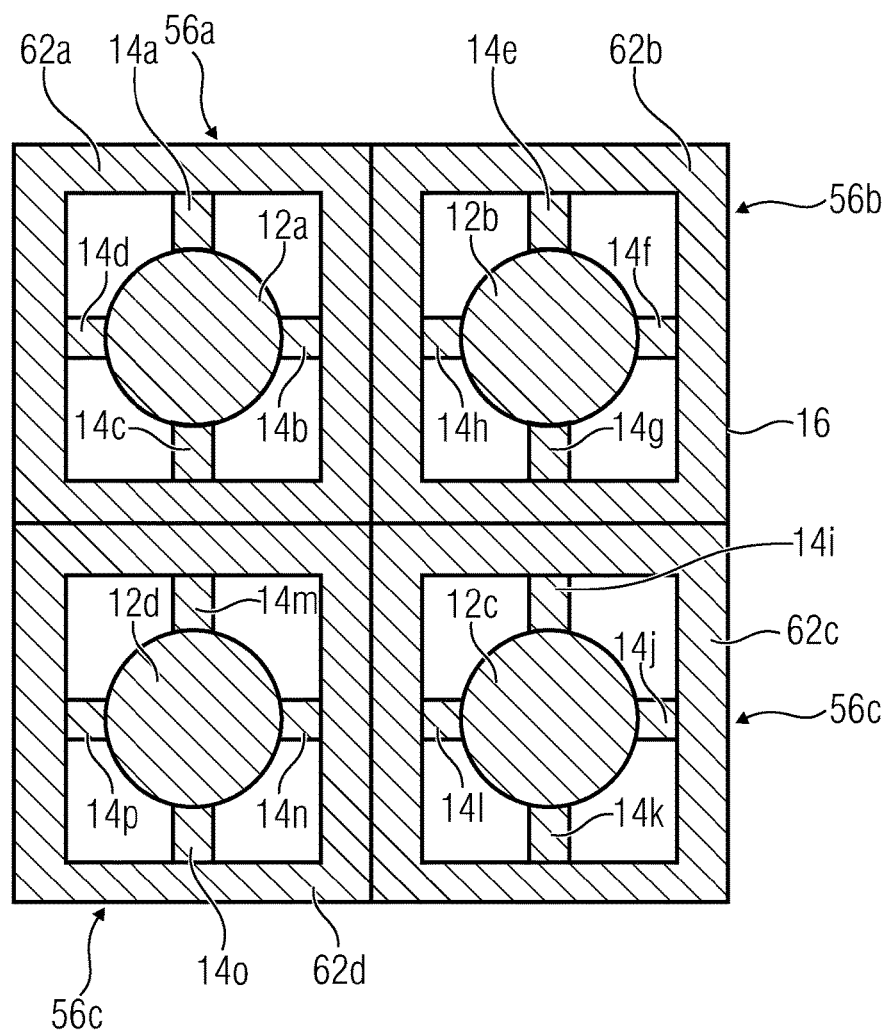
FIG. 22 is a top view of an apparatus having four lenses connected to the supporting structure via four ridges each, and wherein the supporting structure is completely formed of a circumferential frame of at least one material of the ridges.

FIG. 22 shows an apparatus analogous to FIG. 19, wherein the supporting structure 16 is completely formed of the frames 62a-d. By a complete implementation of the supporting structure 16 out of frames 62a-d, possibly a simpler or more cost-saving production of the apparatus during manufacturing or greater degrees of freedom when forming an optical overall structure can result. Thus, for example along the optical axis of the lens, further sections of the supporting structure 16 can be arranged, as will be illustrated below, among others in FIGS. 38 and 39. As in all previous and following embodiments, the ridges 14 can be implemented in a single-layered manner, i.e. monomorphic, or in a two-layered manner, i.e. bimorph.

Figure 23:
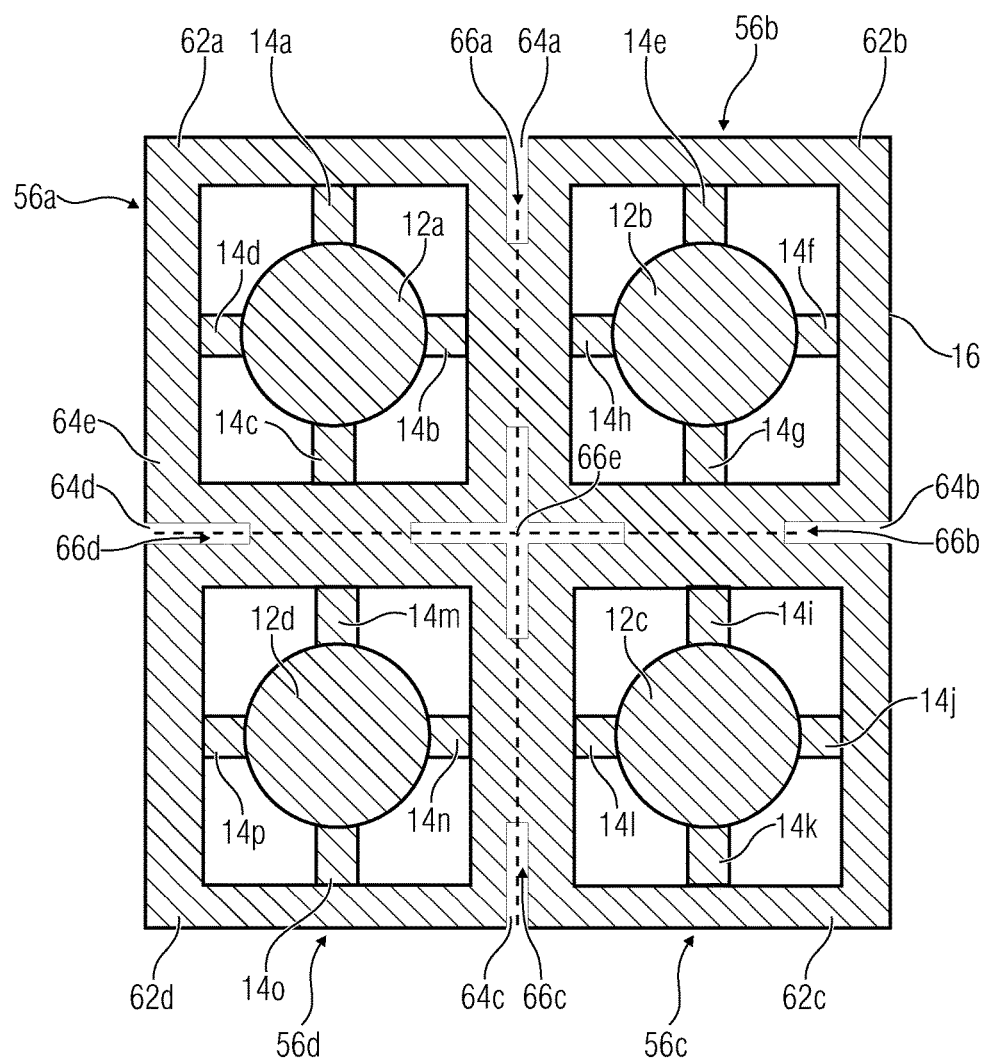
FIG. 23 is a top view of an apparatus having four lenses connected to the supporting structure via four ridges each, and wherein the supporting structure is completely formed of a circumferential frame of at least one material of the ridges and the supporting structure includes recesses.

FIG. 23 shows an apparatus analogous to FIG. 21, wherein the supporting structure 16 is completely formed of the frames 62a-d and wherein the recesses 64a-e are implemented so that the cells 56a-d are only connected to each other via areas of the supporting structure 16 or the frame 62a-d implemented as ridges 66a-d.

Figure 24:
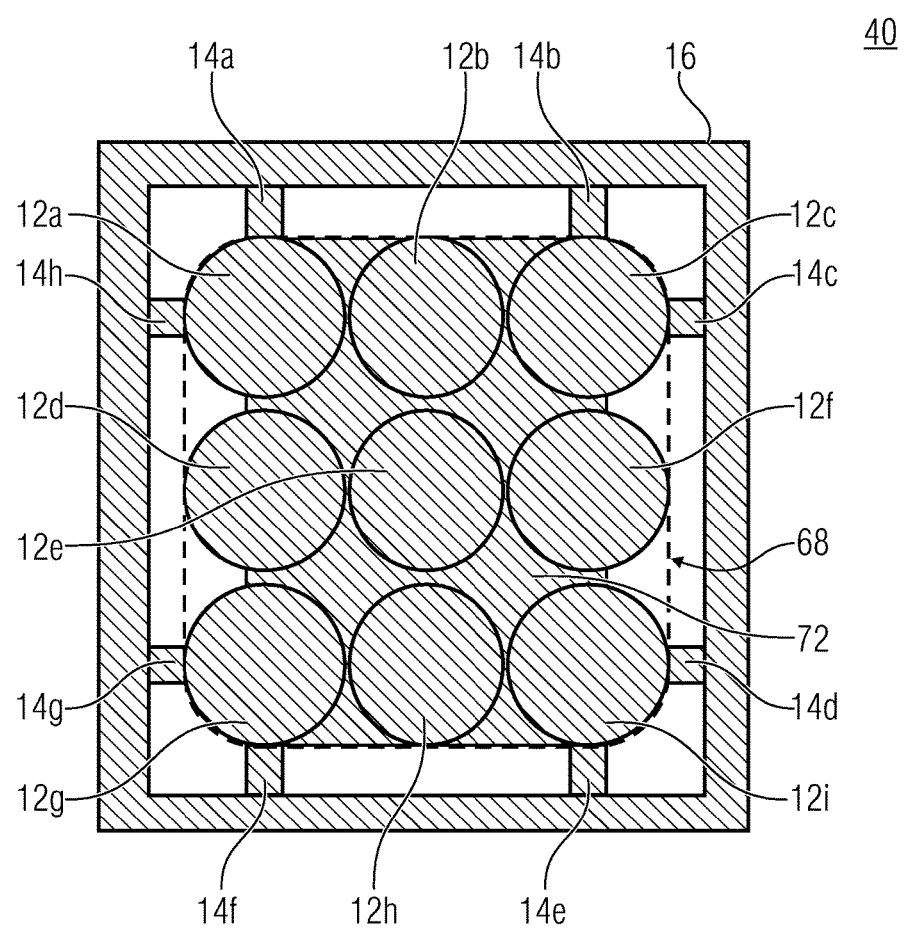
FIG. 24 is a top view of an apparatus having a lens field connected to the supporting structure via eight ridges.

FIG. 24 shows a schematic top view of an apparatus 40 where a lens array 68 is connected to the supporting structure 16 via eight ridges 14a-h and the lens array includes a support plane 72 and nine lenses 12a-i arranged in three rows and three columns on the support plane 72. In the present embodiment, the optical structure of the apparatus is implemented as a combination of several optical elements implemented as identical lenses 12a-i. Basically, however, it is also possible that, as an alternative to lenses, aspheres, free-form areas, diffractive structures, mirrors, prisms or, as illustrated, lens arrays consisting of several equal or different, also arbitrarily combinable optical elements that have just been listed having any number of rows and columns, are used. If several lenses 12 are arranged in an array 68, all the lenses 12 located thereon can be moved together across the ridges 14 and, hence, deviations within the movements of individual lenses 12 can be reduced.

In arrangements including several optical structures 12, as is shown, for example, in FIGS. 19 to 23, instead of the above-described lenses, also lens arrays 68, analogous to FIG. 24, can be arranged. Embodiments include lens arrays 68, a supporting structure 16, and a circumferential frame 62 of at least one lens material including ridges 66 between individual cells 56, allowing a simple separation of the cells at the end of a production process.

Figure 25:
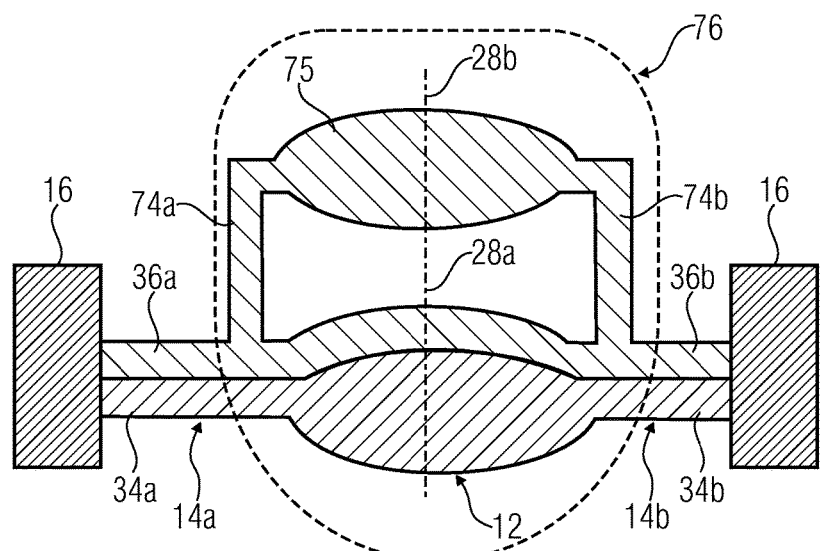
FIG. 25 is a cross-sectional view of an apparatus wherein a single-layered co-moving lens forms a lens stack together with the moving lens.

FIG. 25 shows a cross-sectional view of an apparatus analogous to FIG. 6, wherein at the ridges 14a and 14b structures 74a and 74b running perpendicular to them are arranged, which position a co-moving lens 75 with regard to the lens 12 such that the co-moving lens 75 is co-moved during a deformation of the ridges 14a and 14b and the optical axes 28a and 28b of the lenses 12 and 75 essentially coincide. The lenses 12 and 75 form a lens stack 76 together with the structures 74a and 74b. In this embodiment, the structures 74a and 74b are integral and formed of the same material as the co-moving lens 75 and the second material layer 36a and 36b of the ridges 14a and 14b. By arranging the co-moving lens 75 at the ridges 14a and 14b, the thermally induced change of the focal length of the lenses 12 and 75 during a temperature variation can also be compensated with regard to the respective other lens and simultaneously an additional arrangement of ridges 14 at the supporting structure 16 can be omitted.

As is shown in FIG. 25, the structures 74a and 74b can be ridges. Alternatively or additionally, the structures 74a and 74b can also be implemented in the form of a circumferential shape and/or contour arranged at a distance from the moving lens 12 or directly adjacent to the lens 12 at the ridges 14a and 14b. A circumferential contour allows a more exact positioning of a co-moving lens 75 with regard to a moving lens 12.

Figure 26:
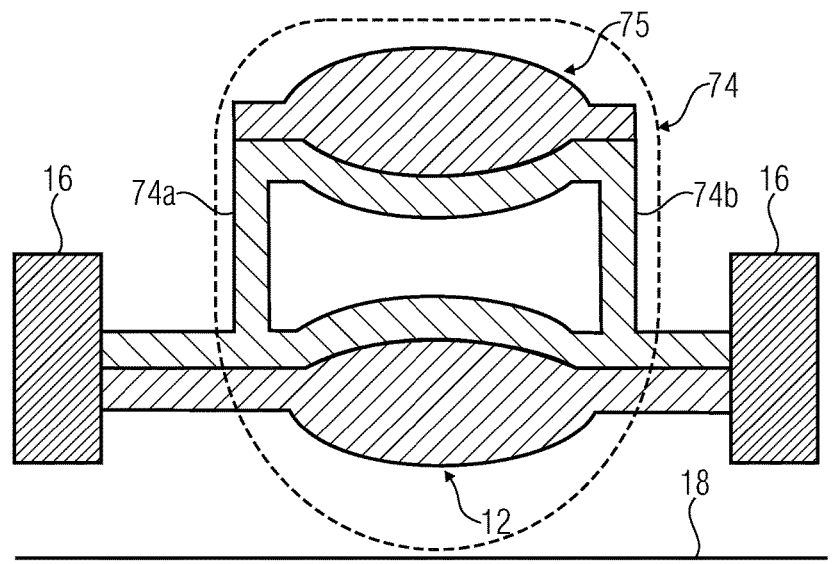
FIG. 26 is a cross-sectional view of an apparatus wherein a two-layered co-moving lens forms a lens stack together with the moving lens and the co-moving lens has a larger distance to a reference plane than the moving lens.

FIG. 26 shows an apparatus according to FIG. 25, wherein the co-moving lens 75 is implemented in a two-layered manner and arranged further apart than the lens 12 with regard to the reference plane 18.

Figure 27:
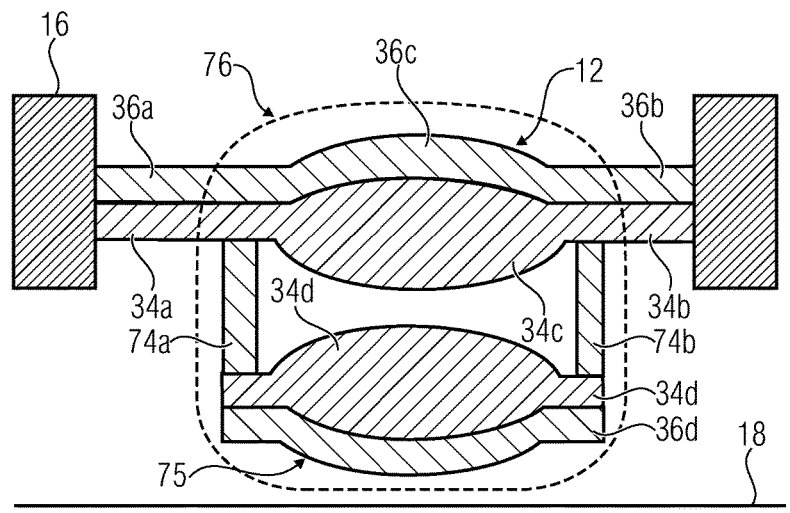
FIG. 27 is a cross-sectional view of an apparatus wherein the co-moving two-layered lens of the lens stack has a lower distance to a reference plane than the moving lens.

FIG. 27 shows an apparatus according to FIG. 26, wherein the co-moving lens 75 is arranged closer to the reference plane 18 compared to the lens 12. The further structures 74a and 74b are formed of any material, among others that of the second layer 36, and are arranged between the first material layer 34a or 34b of the ridges 14a or 14b and the first material layer 34d of the further lens 75, wherein the further structures 74a and 74b are formed in multiple pieces with the lenses 12 and 75.

Figure 28:
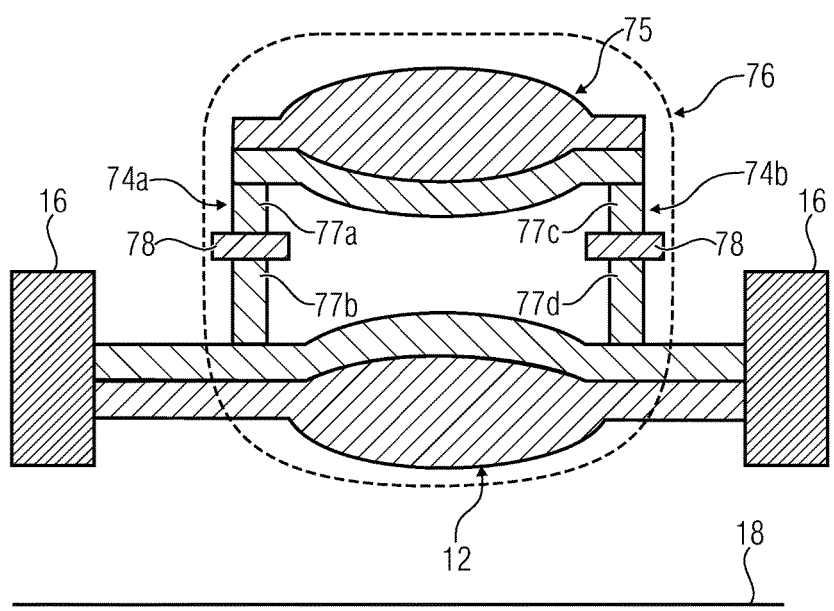
FIG. 28 is a cross-sectional view of an apparatus having a lens stack wherein the lens stack includes an adhesive layer.

FIG. 28 shows an apparatus according to FIGS. 25-27, wherein the further structures 74a and 74b include an adhesive layer 78 joining the sections 77a and 77b or 77c and 77d, respectively. Joining the structures 74a and 74b via an adhesive layer 78 allows the production of the apparatus in several separate production steps.

Basically, both the lens 12 and the co-moving lens 75 can include any number of material layers. The lens stacks 76 can also consist of any number of lenses connected to one another via further structures 74. The further structures 74 can be arranged at any layer of the ridges 14.

Figure 29:
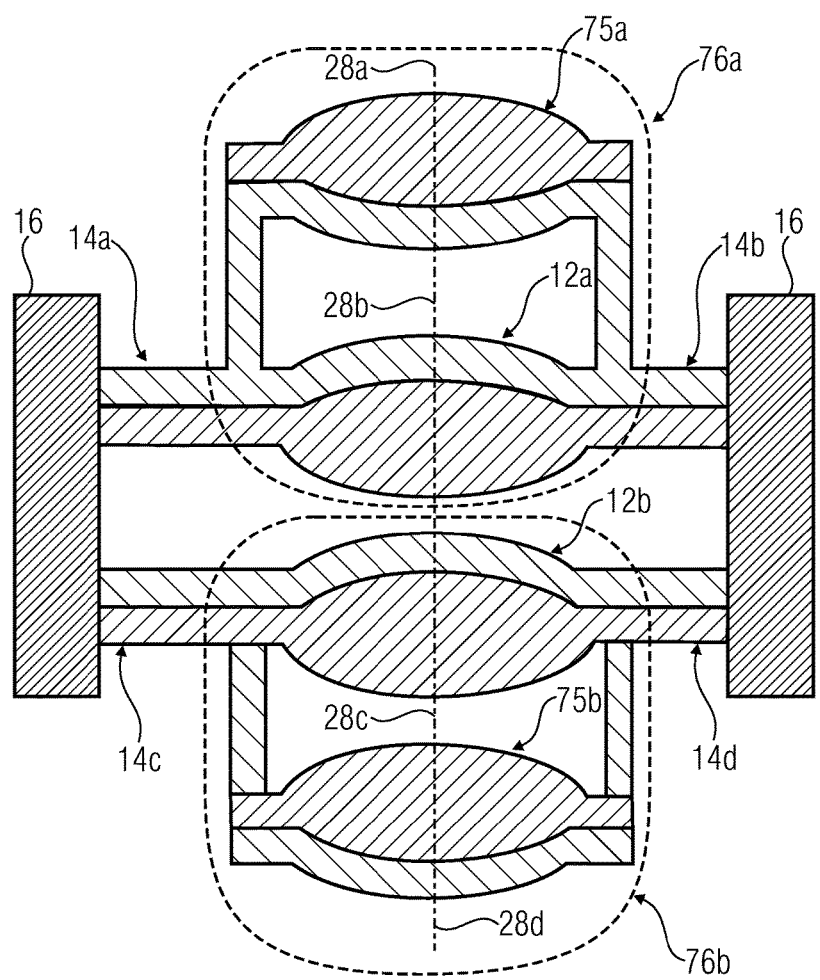
FIG. 29 is a cross-sectional view of an apparatus wherein the two different lens stacks are connected to the supporting structure.

FIG. 29 shows an apparatus 50 wherein two different lens stacks 76a and 76b are connected to the supporting structure 16 via the ridges 14a-d and the optical axes 28a-d of the lenses 12a, 12b, 75a and 75b essentially coincide. The direction and travel range of movement of a lens stack 76a or 76b during a temperature variation depends on the implementation of the ridges 14a and 14b or 14c and 14d, respectively, and is independent of the movement of the respective other stack 76a or 76b.

Figure 30A:
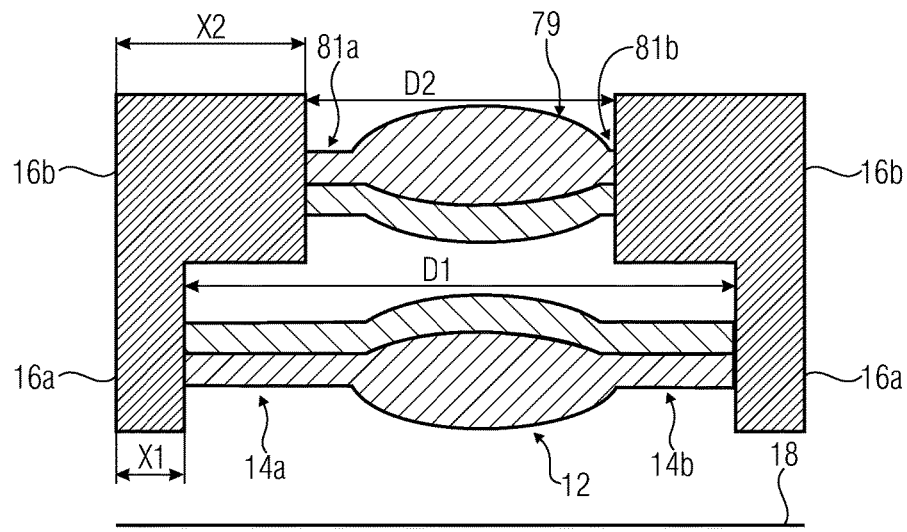

FIG. 30a shows an apparatus of FIG. 6c where a stationary lens 79 is arranged at the supporting structure 16. The supporting structure 16 includes a first portion 16a at which the lens 12 is arranged via the ridges 14a and 14b and a portion 16b orienting upwards toward the first further portion 16a. A diameter X1 of the first portion 16a is smaller than a diameter X2 of the second portion 16b, so that a gap D1 defined by the first portion 16a wherein the lens 12 and the ridges 14a and 14b are arranged is greater than the gap D2 defined by the second portion 16b where the stationary lens 79 and the layers 81a and 81 b implemented as ridges arranged at the same are arranged. The stationary lens 79 is also mounted to the supporting structure 16 via multi-layered ridges 81a and 81b and has essentially the same shape as the lens 12. Due to the small gap, the layers 81a and 81b of the stationary lens 79 are smaller than the ridges 14a and 14b of the lens 12, so that the ridges of the stationary lens 79 cause no or only little movement of the stationary lens 79 with regard to the reference plane 18 during a temperature variation. Alternatively, the stationary lens 79 can also be mounted directly on the supporting structure 16 without the layers 81a and 81b. Also, the lens can have a different shape than lens 12. The diameters X1 and X2 as well as the gaps D1 and D2 can basically have any shape, i.e. apart from round also oval or rectangular. The stationary lens 79 is arranged at a greater distance from the reference plane 18 than the moving lens 12.

Figure 30B:
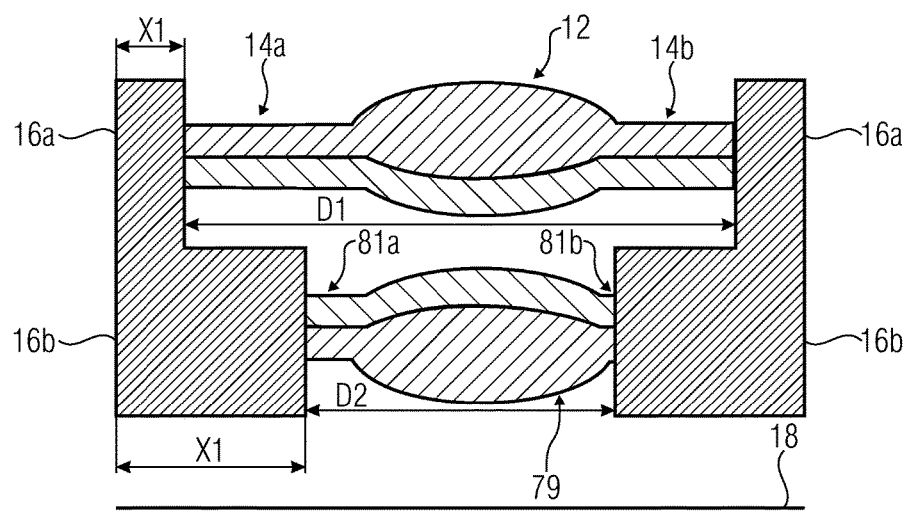

FIG. 30b shows an apparatus similar to FIG. 30a, wherein the stationary lens 79 is arranged below the lens 12 and at a smaller distance from the reference plane 18 than the lens 12.

Figure 31A:
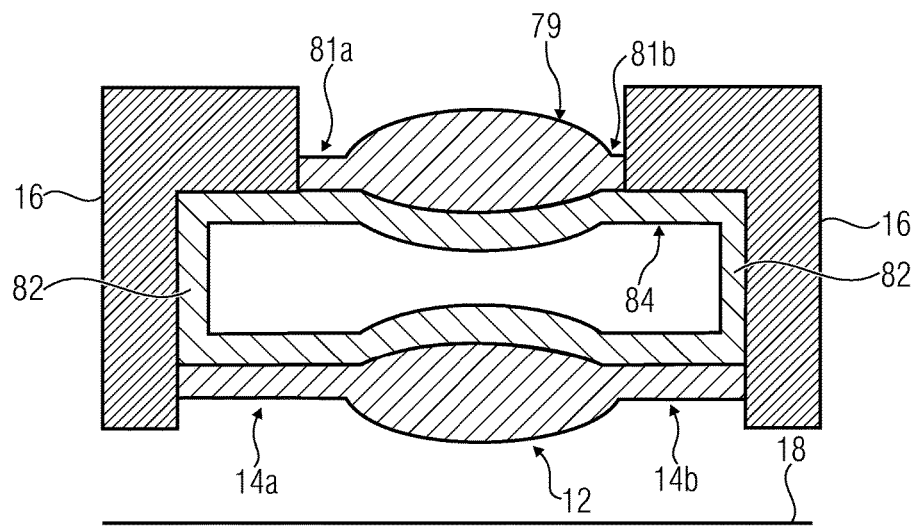
Figure 31B:
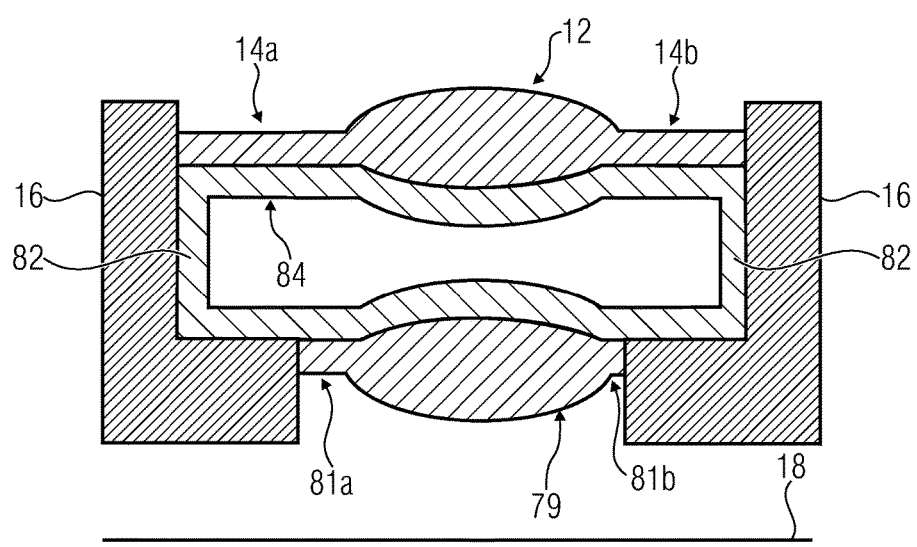

FIGS. 31a and 31b show an apparatus analogous to FIGS. 30a and 30b, wherein a segment 82 of a lens material is arranged at the supporting structure 16 between the lens 12 and the stationary lens 79 such that a circumferential frame results. The segment 82 is formed of a material of which also one of the layers of the lenses is formed.

Figure 32A:
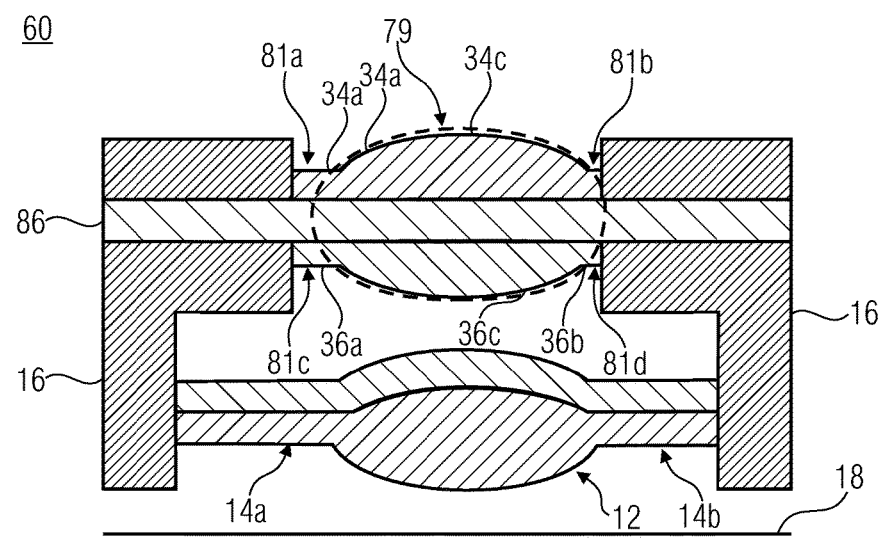
Figure 32B:
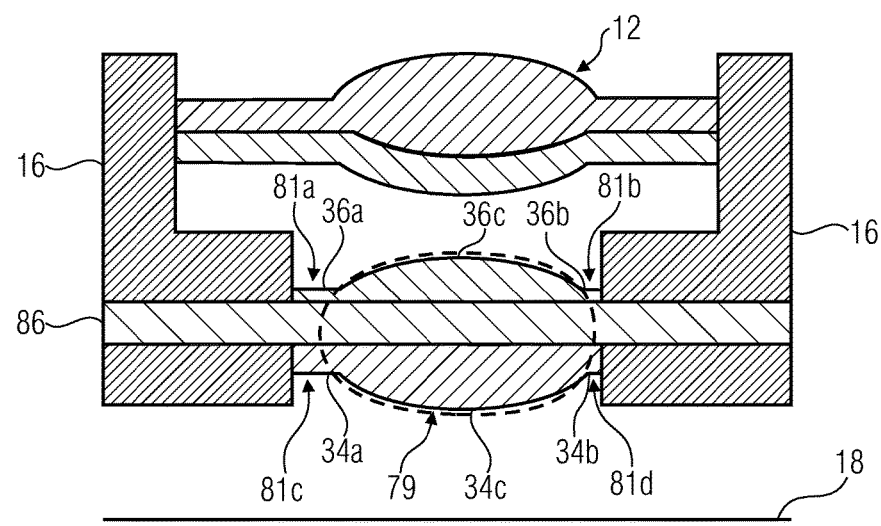

FIG. 32 shows an apparatus 60 analogous to the apparatus of FIGS. 30 and 31. The stationary lens 79 arranged in a stationary manner at the supporting structure 16 is structured in a two-layered manner and includes, apart from the two material layers 34 and 36, a glass wafer 86 arranged between the material layers 34 and 36 and projecting into the supporting structure 16. With the glass wafer 86, the stationary lens 79 can be extended both by further optical characteristics, for example in the form of a diffractive grid introduced into the glass wafer 86, and by further mechanical characteristics, such as additional stiffeners.

Figure 33:
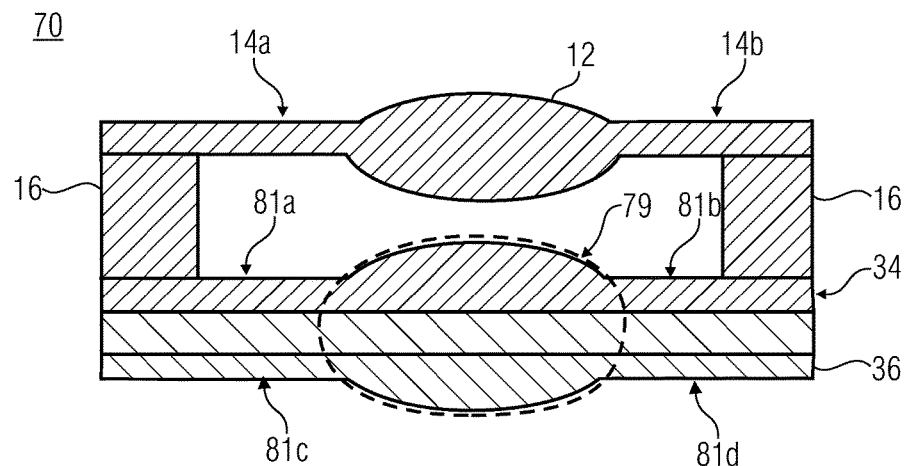
FIG. 33 is a cross-sectional view of an apparatus where the stationary lens includes a glass layer and the moving lens as well as the circumferentially arranged spacer structure consist of the same material.

FIG. 33 shows a side view of an apparatus 70 having a moving lens 12 with the ridges 14a and 14b. The stationary lens 79 is formed in a two-layered manner and includes a glass wafer 86 which implements the lens 79 in a stationary manner, despite the continuous layers 81a-d arranged at the same and which is arranged between the two material layers 34 and 36 of the stationary lens 79. The supporting structure 16 is implemented integrally with layers 81a and 81b.

Figure 34:
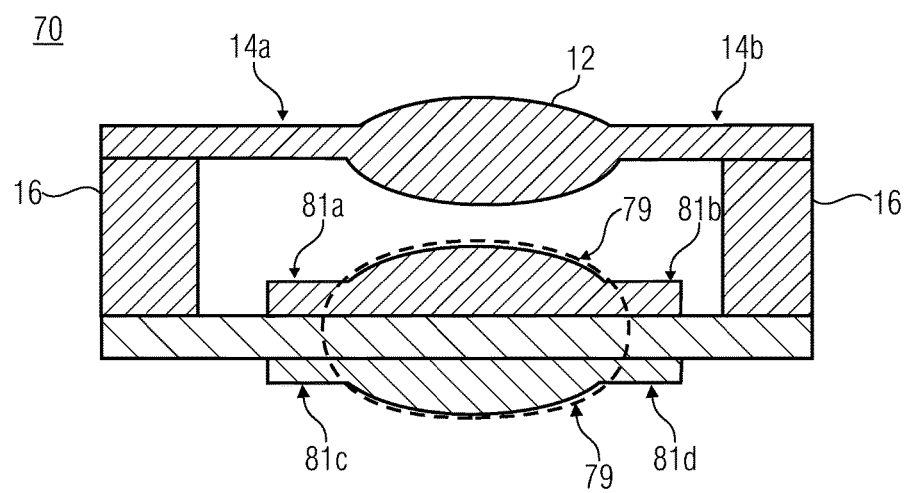
FIG. 34 is a cross-sectional view of an apparatus where the stationary lens is arranged on a glass layer, the areas around the optical functional area of the stationary lens are discontinuously formed and the moving lens as well as the circumferentially arranged spacer structure consist of the same material.

FIG. 34 shows the apparatus 70, wherein the layers 81a-d arranged at the stationary lens 79 are arranged only partly on the glass wafer 86 as well as spaced apart from the supporting structure 16. The arrangement of the stationary lens 79 at the supporting structure is implemented via the glass wafer 86.

Figure 35:
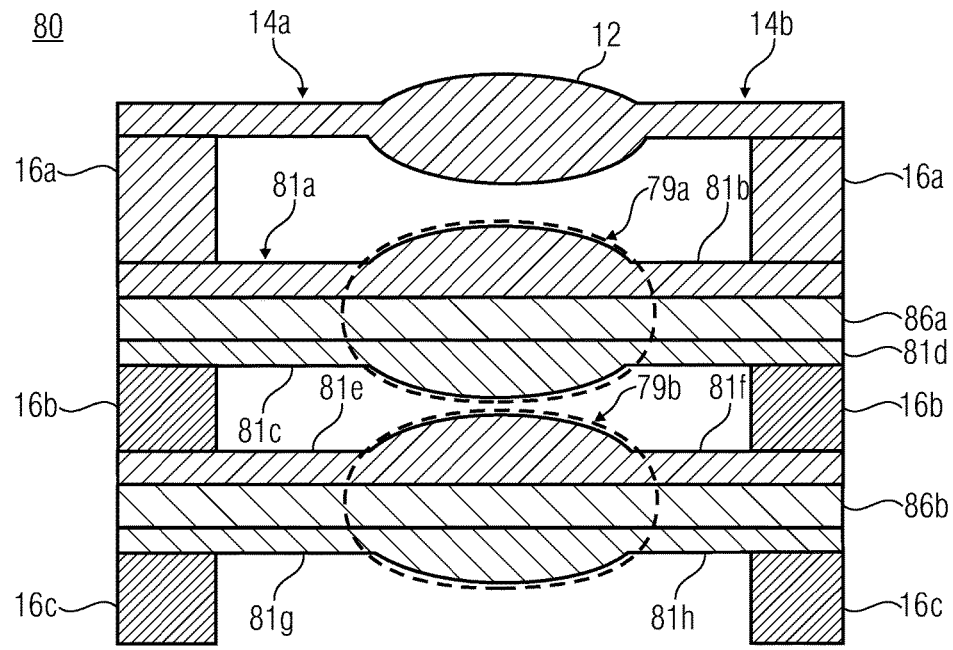
FIG. 35 is a cross-sectional view of an apparatus having one moving and two stationary lenses, wherein the stationary lenses each comprise a glass layer and continuously formed areas around the optical functional area of the stationary lens and spacer structures of a different material than the optical functional areas are formed between lens layers.

FIG. 35 shows an apparatus 80 analogous to the apparatus 70 of FIG. 33, wherein further sections of the supporting structure 16b and 16c are arranged at the apparatus 70, which include a glass wafer 86b and a stationary lens 79b with layers 81e-h. The elements of the supporting structure 16b and 16c are formed of a different material than the supporting structure 16a. By joining different supporting structures 16a-c and the combination of the lens 12 and stationary lenses 79a and 79b, optical systems implemented in any manner can be formed. Any order and number of moving, co-moving and stationary lenses 12, 75 and 79 can be realized.

Figure 36:
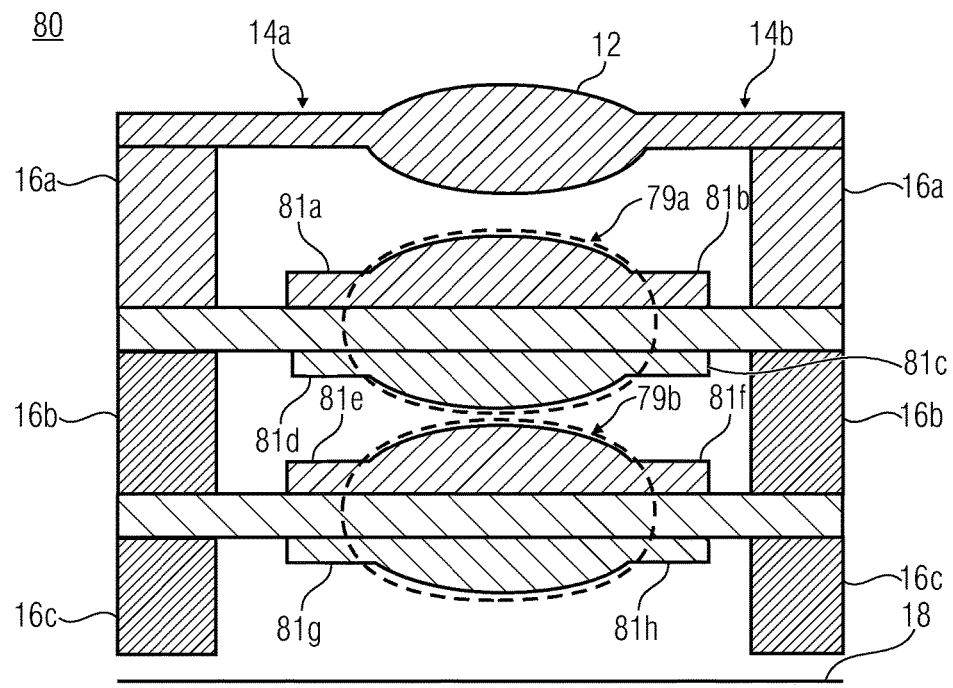
FIG. 36 is a cross-sectional view of an apparatus having one moving and two stationary lenses, wherein the stationary lenses each include a glass layer and discontinuously formed area around the optical functional area of the stationary lens.

FIG. 36 shows the apparatus 80, where the layers 81a-h arranged at the stationary lenses 79a and 79b are only partly arranged at the glass wafers 86a and 86b.

It is also possible for merely lenses 79a and 79b without layers 81 to be arranged on the glass wafers 86a and 86b.

Figure 37:
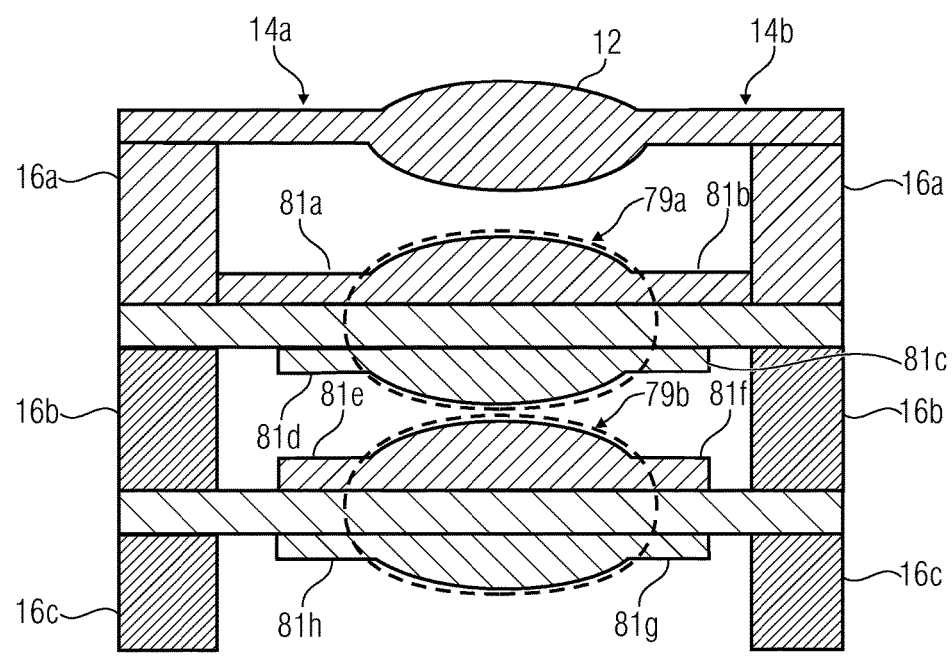
FIG. 37 is a cross-sectional view of an apparatus where the moving lens and the ridges arranged at the same are integrally formed of one material, and in the residual apparatus only different materials are formed.

FIG. 37 shows an apparatus analogous to FIG. 36, wherein the moving lens 12 and the ridges 14a and 14b arranged at the same are formed integrally of one material and in the residual apparatus exclusively other materials are implemented.

Figure 38:
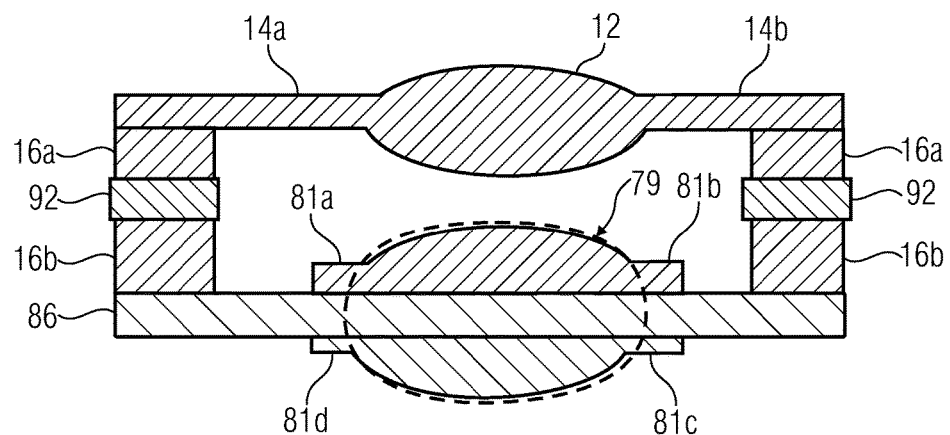
FIG. 38 is a cross-sectional view of an apparatus where the individual parts of the supporting structure are joined by an adhesive layer.

FIG. 38 shows an apparatus 70, wherein the individual parts 16a and 16b of the supporting structure 16 are joined to one another with an adhesive layer 92.

Figure 39:
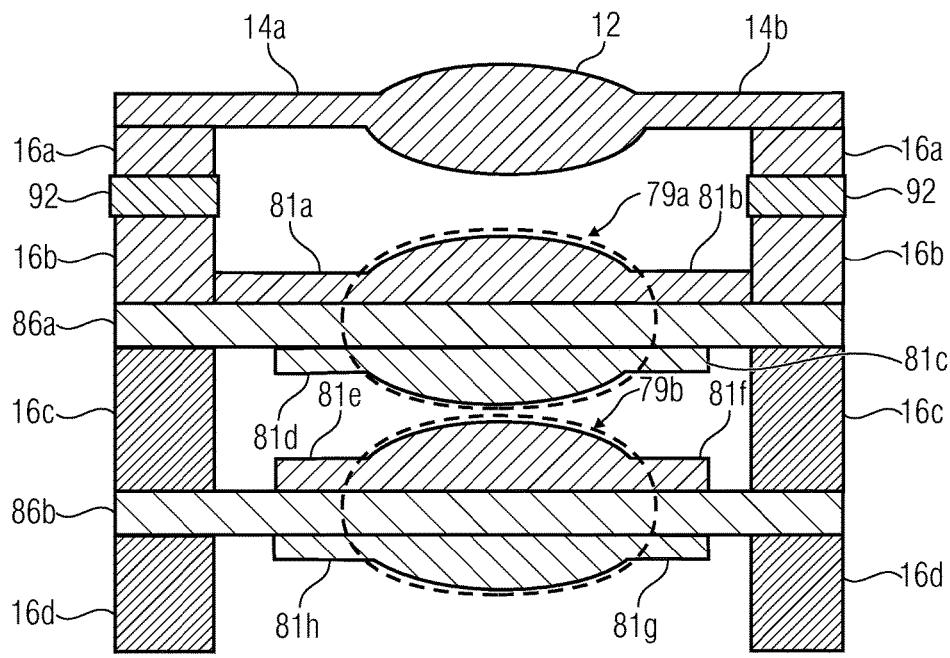
FIG. 39 a cross-sectional view of an apparatus having one moving and two stationary lenses each comprising a glass layer, wherein the supporting structure includes an adhesive layer.

FIG. 39 shows an apparatus analogous to FIG. 37, wherein the individual parts 16a and 16b of the supporting structure 16 are joined to one another with the adhesive layer 92.

Joining parts of a supporting structure 16 by means of the adhesive layer 92 can allow constructing structures and apparatuses whose components are implemented in different partial processes. Also, any material transitions within the supporting structure 16 can be formed when differently joined parts include different materials or layer sequences.

Figure 40:
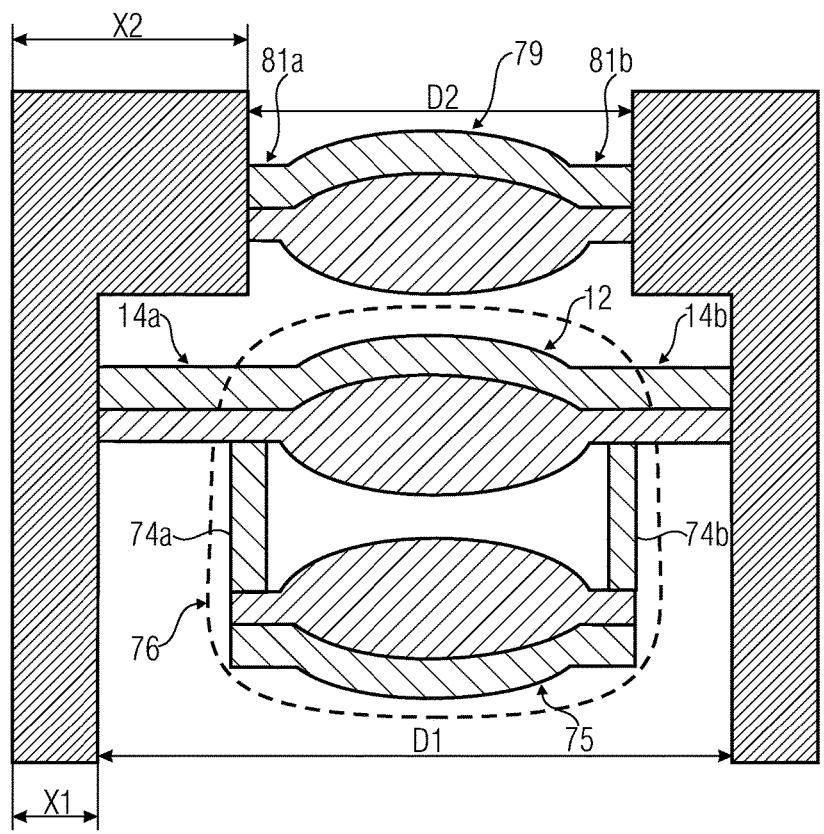
FIG. 40 is a cross-sectional view of an apparatus analogous to FIG. 30 having a moving lens, a co-moving lens arranged at the same and a stationary lens having short ridges arranged at the supporting structure without a glass layer.

FIG. 40 shows an apparatus 90 analogous to FIG. 30, wherein instead of a lens, a lens stack 76 is arranged at the supporting structure 16.

Figure 41:
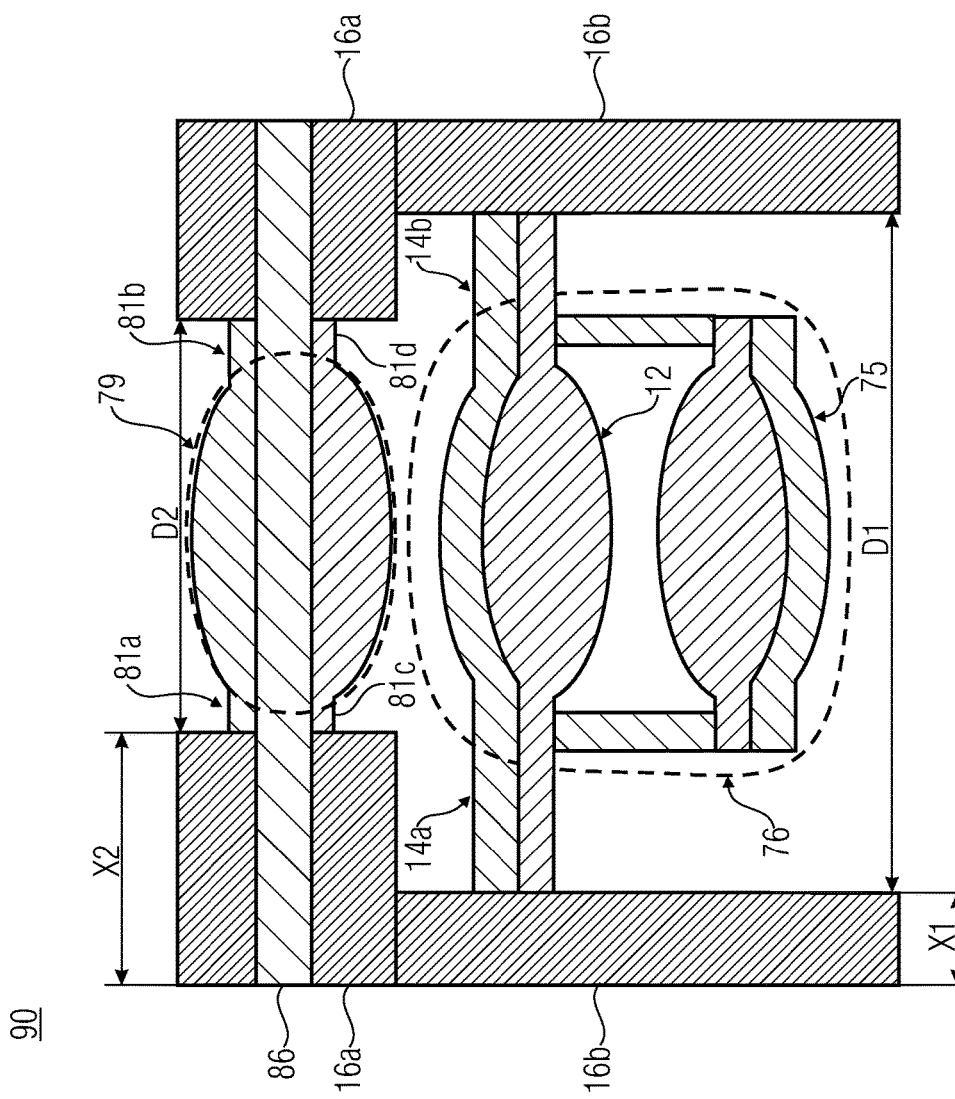
FIG. 41 is a cross-sectional view of an apparatus analogous to FIG. 40, wherein the stationary lens, the continuously formed areas arranged at the same and the supporting structure include a glass layer laterally to the stationary lens and the continuously formed areas.

FIG. 41 shows an apparatus 90 where the lens 79, arranged in a stationary manner, includes a glass wafer 86 projecting into the supporting structure 16.

Figure 42:
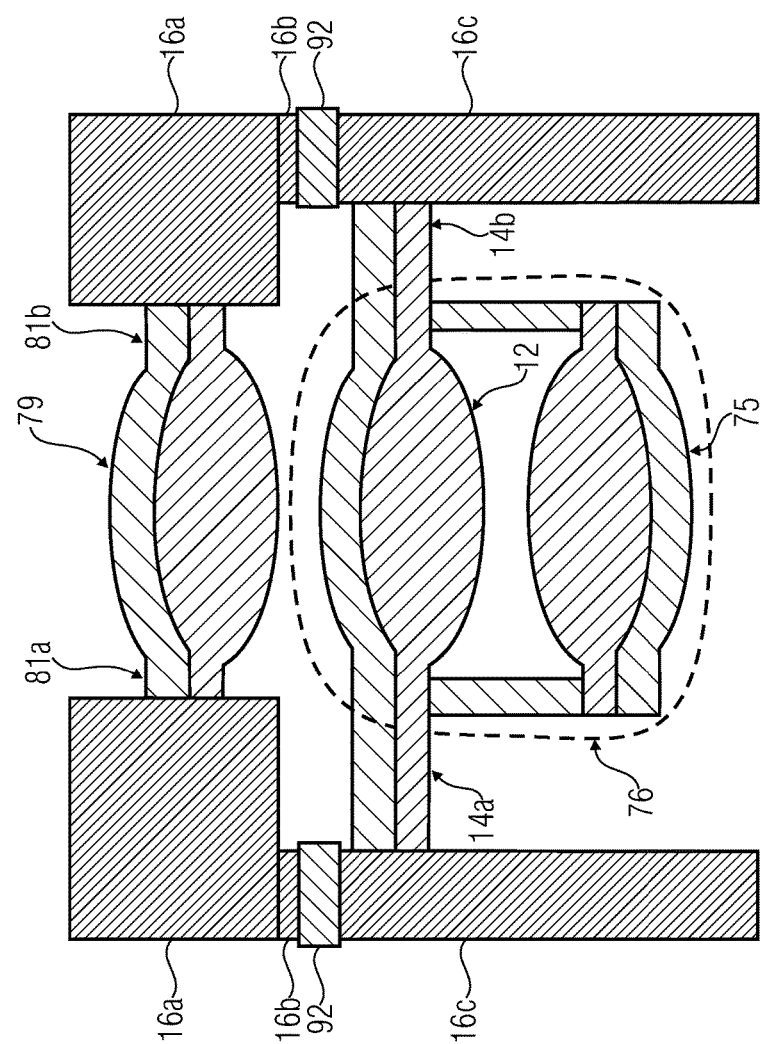
FIG. 42 is a cross-sectional view of an apparatus analogous to FIG. 40, wherein the supporting structure includes an adhesive layer in the area between the moving and the stationary lens.

FIG. 42 shows an apparatus 90 analogous to FIG. 40, wherein the parts 16b and 16c of the supporting structure 16 are joined to one another via the adhesive layer 92.

Figure 43:
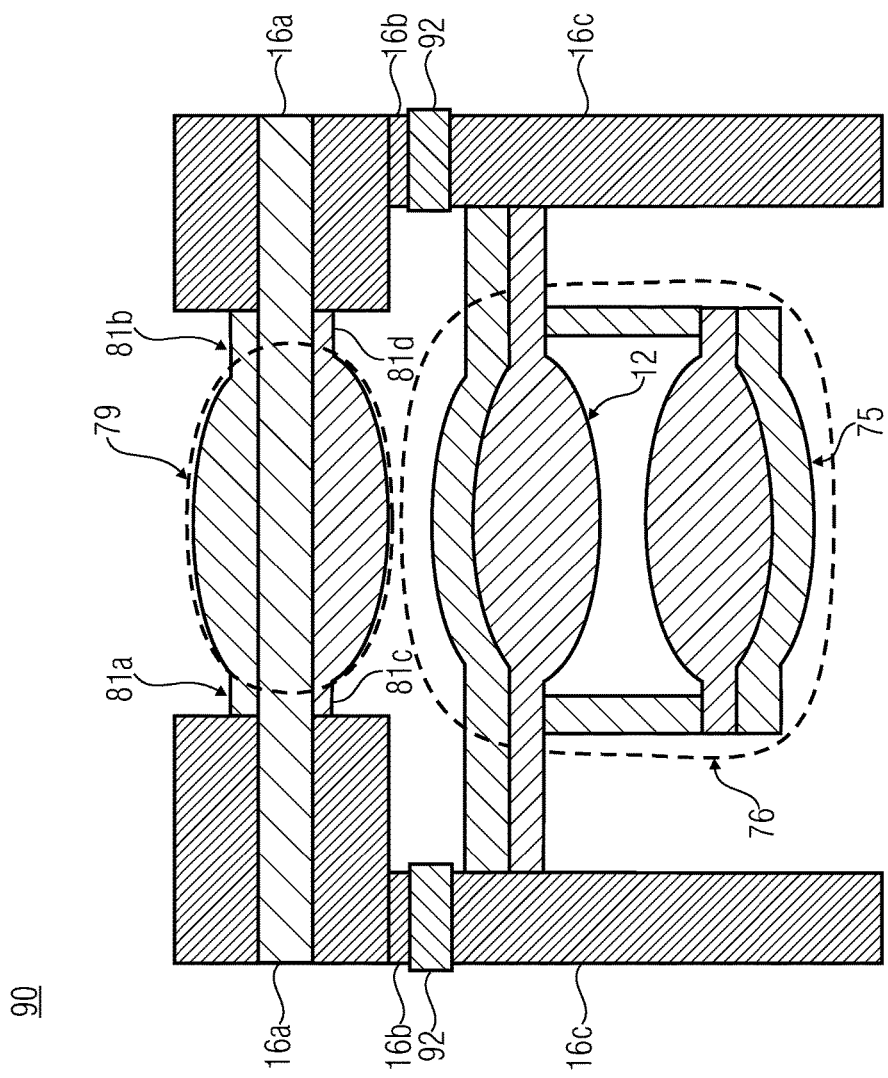
FIG. 43 is a cross-sectional view of an apparatus analogous to FIG. 41, wherein the supporting structure includes an adhesive layer analogous to FIG. 42.

FIG. 43 shows the apparatus 90 analogous to FIG. 42, where the stationary lens 79 includes, analogous to FIG. 41, a glass wafer projecting into the supporting structure 16 and wherein the parts 16b and 16c of the supporting structure 16 are joined to one another via the adhesive layer 92.

Figure 44:
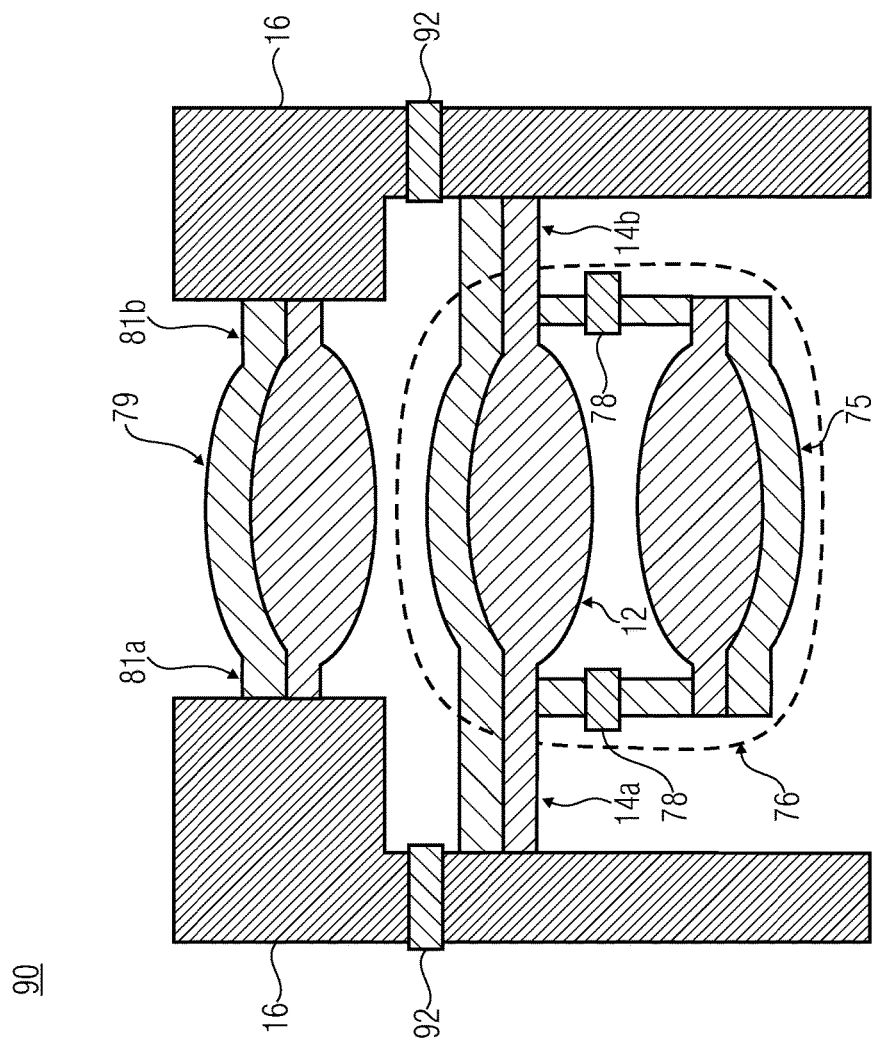
FIG. 44 is a cross-sectional view of an apparatus analogous to FIG. 42, wherein the structures connecting the moving and the co-moving lens include an adhesive layer.

FIG. 44 shows the apparatus 90 analogous to FIG. 42, wherein the structures 74a and 74b include the adhesive layer 78.

Figure 45:
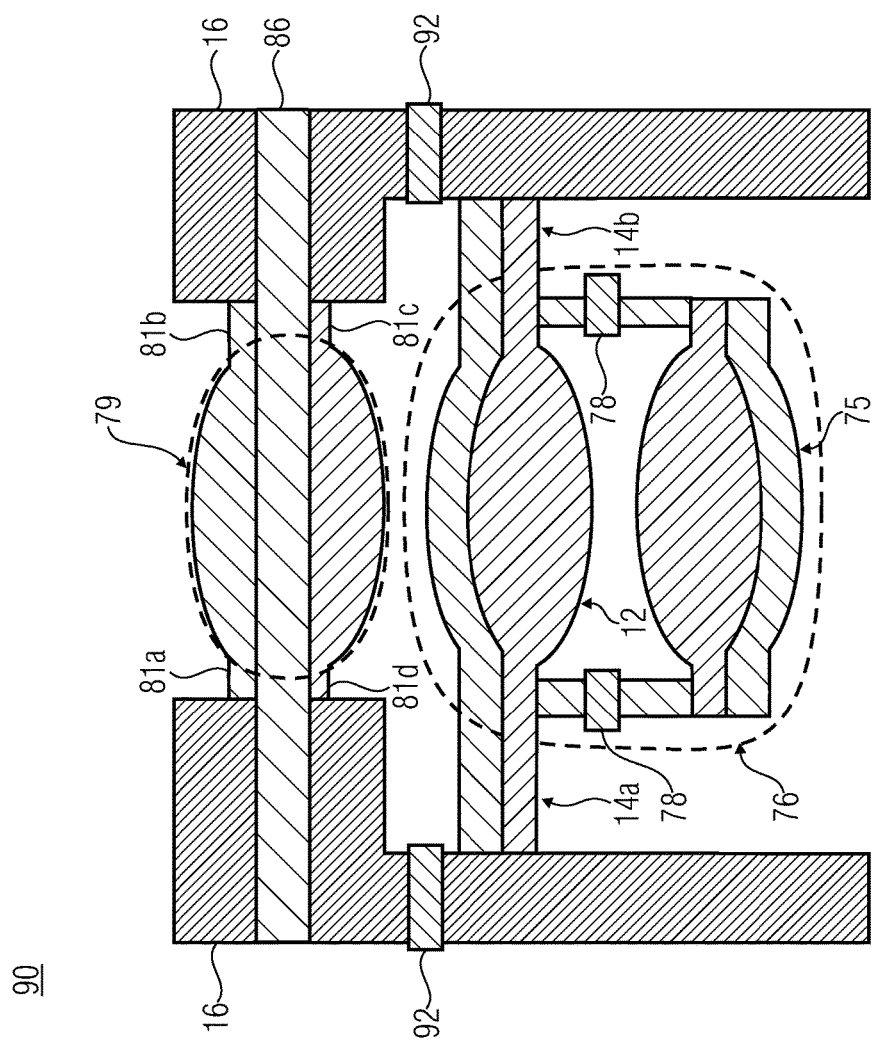
FIG. 45 is a cross-sectional view of an apparatus analogous to FIG. 44, wherein the stationary lens includes a glass layer analogous to FIG. 43 and the structures connecting the moving and the co-moving lens include an adhesive layer.

FIG. 45 shows the apparatus 90 analogous to FIG. 44, wherein the stationary lens 79, analogous to FIG. 43, includes a glass wafer 86 projecting into the supporting structure 16.

FIG. 46 shows an apparatus 90 analogous to FIG. 44, wherein further segments 82a-d of a lens material are arranged between the moving lens 12 and the stationary lens 79 and form a circumferential frame 84, wherein the segments 82a and 82b are joined via the adhesive layer 92 and the adhesive layer 92 simultaneously joins the individual parts 16b and 16c of the supporting structure 16.

The above embodiments, but also the embodiments described below can easily be transferred to cases having not only one lens but another optical structure, such as a diffraction grating.

The above-described embodiments emphasize the provision of an option for compensating the temperature dependency of optical characteristics of an optical structure, such as the temperature dependency of the focal length of the lens by monomorphic or bimorph deflection of the ridges by which the lens or the optical structure is suspended, so that, for example, an image plane or intermediate image plane of an optical image, to which the lens contributes, changes its position less due to temperature variations. While the above embodiments showed a deflection from the layer plane of the layer(s) forming the ridges, according to which the optical structure is moved, for example, in a layer thickness direction, it would also be possible to transfer the principle also to deflections within the layer plane. Thereby, also movements other than translatory movements along the optical axis or tiltings could be obtained. In addition to the virtually passive compensation effect for obtaining athermization of the characteristics of the optical structure, the above-described structures can be provided with heating elements in order to cause movement of the optical components actively and independent of the environmental temperature.

The above embodiments can be combined with the aspect of embodiments described below, according to which annealable adhesive is used for fixing an adjustment of the position of an optical structure adjustable via ridges. The following embodiments can also be used independently of the temperature compensation effect of the above embodiments.

Figure 47A:
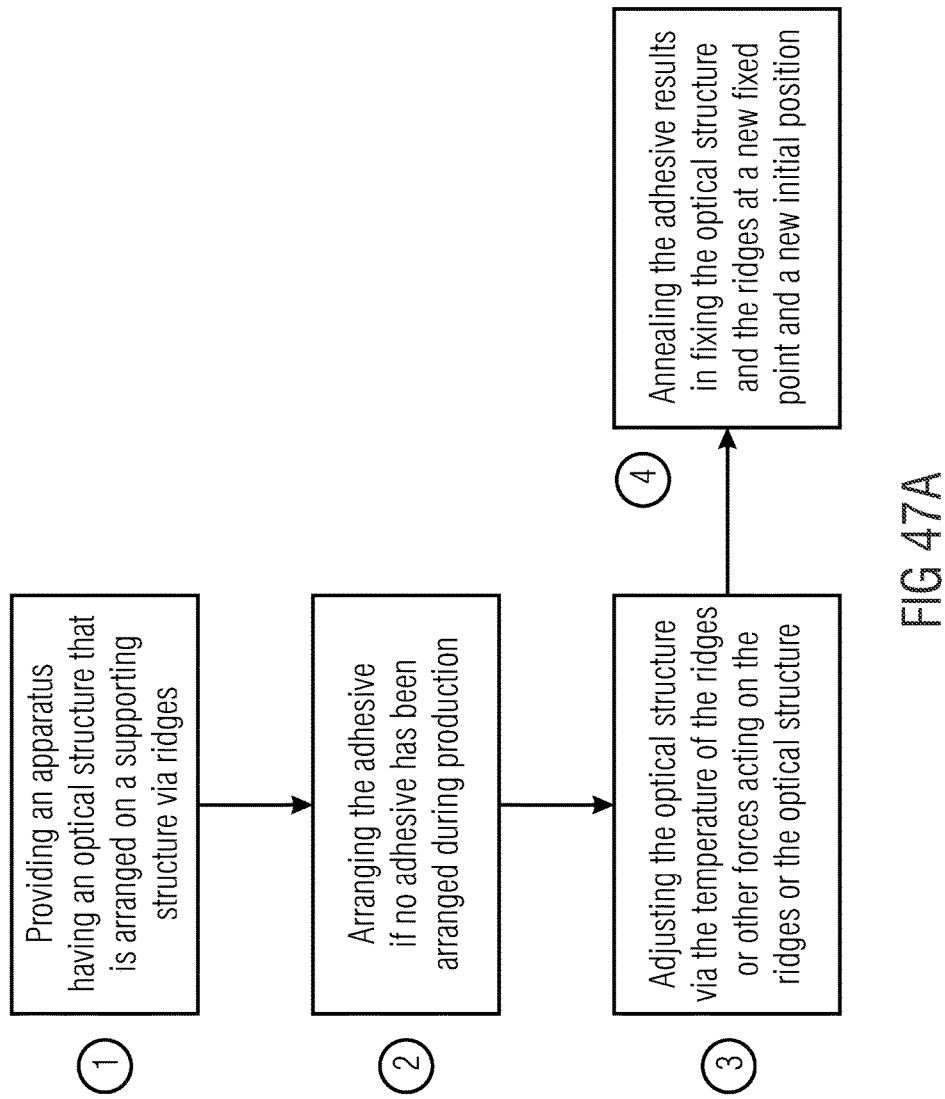
FIG. 47a is a block diagram of the method for fixing an initial position of the lens by means of adhesive.

FIG. 47a shows a schematic block diagram with regard to the adjusting and fixing of a new initial position of an optical structure 12 concerning its position with regard to the reference plane 18. Step 1 includes the provision of an apparatus to be adjusted including an optical structure. Provision can also include the production of the apparatus with the optical structure 12 and the ridges 14. During production of the apparatus, an adhesive 102 to be annealed later can be introduced into the apparatus. If the adhesive 102 is not yet arranged at the apparatus during the provision of the apparatus, the same will be arranged at the apparatus in a second step, so that the same is arranged between the ridges 14 and the supporting structure 16. In a third step, adjustment of the optical structure with regard to the reference plane 18 is performed, so that a desired distance or a desired orientation of the lens 12 with regard to the reference plane 18 is obtained. The desired orientation can include, for example, an optimum focal position of the lens 12 with regard to the reference plane 18. Adjustment is performed by an adjusting influence 104 moving the lens 12 from its original position P1 to an adjusted position P2. This can be performed, for example, by activating heating elements disposed on the ridges initiating a deformation of the ridges 14. Other influences are also possible, for example electrostatic forces acting on the ridges, and such forces that are generated via electrostatic drives, such as are illustrated, for example, in FIGS. 64 and 81. It is also possible that external mechanics act on the structure and cause deflection of the ridges 14 and hence the lens 12 mounted thereon. During adjustment an intermediate check can be performed once or several times as to whether the desired orientation has been achieved. If a change in the environmental temperature is used for adjustment, i.e. the above-described effect of temperature-dependent deflection of respectively designed ridges is used, a previously determined or known connection between the temperature and the optical characteristic of the optical structure is used during adjustment in order to determine the optimum adjustment with regard to a predetermined usage or operating temperature for which the optical structure is intended. If the ridge deflection during adjustment is caused in another manner, adjustment is performed, for example, at the operating temperature or within an interval of permitted operating temperatures.

While maintaining the adjusted position P2, annealing of the adhesive 102 is performed in a fourth step, which results in a fixing of the lens 12 and the ridges 14, wherein, at the location of the annealed adhesive 102, a new fixing point of the ridges 14 is formed which defines a new form of movement of the ridges 14. It could be that the lens 12, after fixing according to the above temperature dependency, is still movable by the deformation of the ridges in the area between the new fixing point and the lens 12. This residual movability should be considered during adjustment already in the previous adjustment step. If, for example, the ridges have been deflected by means of local heating of the ridges according to an above embodiment and if the temperature for obtaining the optimum adjustment or orientation was high, it can be advantageous, depending on the residual movability, to deflect the ridges prior to fixing a little beyond the optimum deflection point in order to avoid unnecessitated temperature control for fine adjustment of the lens during operation.

Figure 47B:
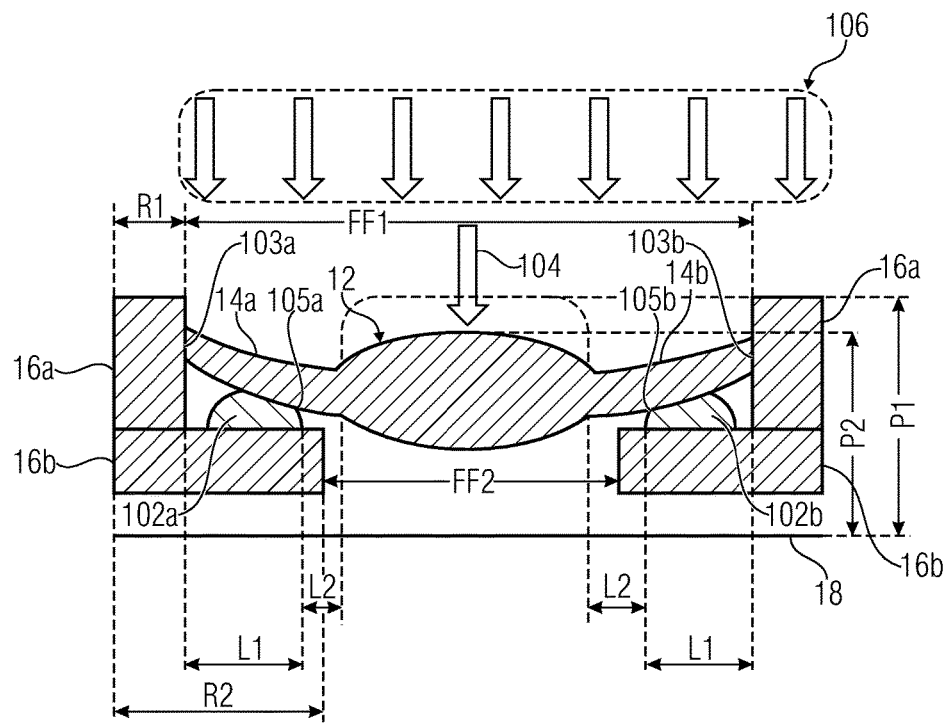

FIG. 47b shows an apparatus where the supporting structure 16 consists of two sections 16a and 16b. The lens 12 is arranged at the portion 16a via the ridges 14a and 14b. The portion 16a includes a width R1 which is smaller than a width R2 of the portion 16b of the supporting structure oriented downwards to the first portion 16a. A gap FF1 defined by the first portion 16a of the supporting structure is hence greater than a gap FF2 defined by the second portion 16b. By adjusting a new position P2 of the lens 12 differing from the original position P1 with regard to the reference plane 18 by the adjusting influence 104 and annealing 106 of the adhesive 102 and removal of the adjusting influence 104, the lens 12 has the adjusted position P2 as the new initial position. The locations of the annealed adhesive 102a and 102b define new fixed anchoring points of the ridges 14. A deformation of the ridges 14 induced thermally or by other, for example electrostatic forces is in this case only effected in an area L2 between the lens 12 and the fixing point defined by the annealed adhesive.

A residual expansion L1 of the ridges 14 has, for example, only an insignificant effect on the positioning of the lens 12 in space. An old suspension point 103a/103b is replaced by a new suspension point 105a/105b of the lens 12.

Figure 47C:
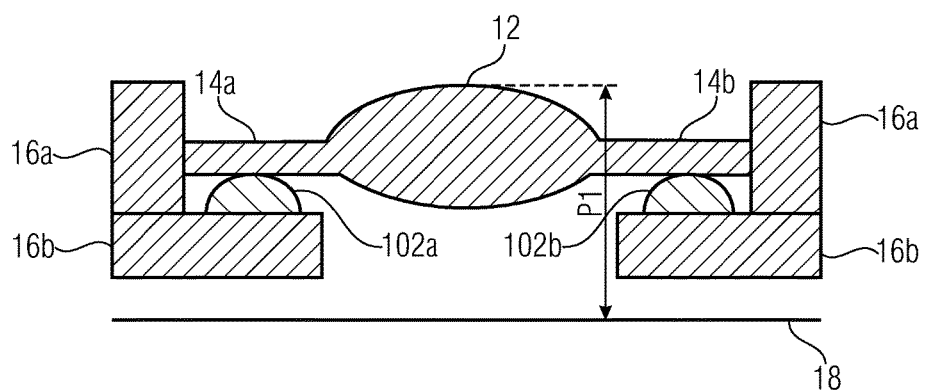
FIG. 47c is a cross-sectional view showing the method step of arranging adhesive between the ridges and the supporting structure.

FIG. 47c shows an apparatus where in a step preparing for FIG. 47b adhesive 102a and 102b is arranged between the ridges 14a and 14b as well as the supporting structure in portion 16b. Here, the portion 16b of the supporting structure is implemented in an stationary manner with regard to the ridges 14a and 14b, so that the ridges 14a and 14b and hence the lens 12 can be adjusted with regard to the reference plane 18.

Although the adhesive 102 is implemented in a UV-curable manner in FIG. 47 and the annealing 106 is performed by means of UV radiation, other forms of adhesive, for example a thermally activatable adhesive, which are annealed by corresponding annealing processes such as thermal processes, are also possible. Adjustment 104 can be performed, for example, by activating the heating elements 52 or by another external force. If adjustment is performed by means of temperature, either by the environmental temperature or by activating the heating elements, fixation by means of adhesives can be implemented such that the same compensates both the production tolerances of the overall structure and the re-deformation of the ridges that might occur when the adjusting temperature is taken back and the ridges are cooled down to the regular environmental temperature. This re-deformation can possibly result in a renewed shift of the lens from its intended target position.

Alternatively, it is also possible that adjustment is performed by electrostatic drives where forces act on the ridges such that the target position of the lens is obtained and fixed by the adhesive. Alternatively, also, an external force, such as by a grip or another external device, can be used for deflection and adjustment of the lens.

The above-described shortening of the ridge length, which will be effective later during operation, to the length L2 generated by the new fixing point 105 can be considered both during provision of the ridges and also by a respective dimensioning of the ridge materials, so that the ridges are, for example, made longer, whereby the bending line results in a greater amplitude or materials generating a stronger stroke are selected, so that the determined characteristic curve between the shift of the optical structure and the shift of the optical characteristic of the lens is maintained.

Figure 48:
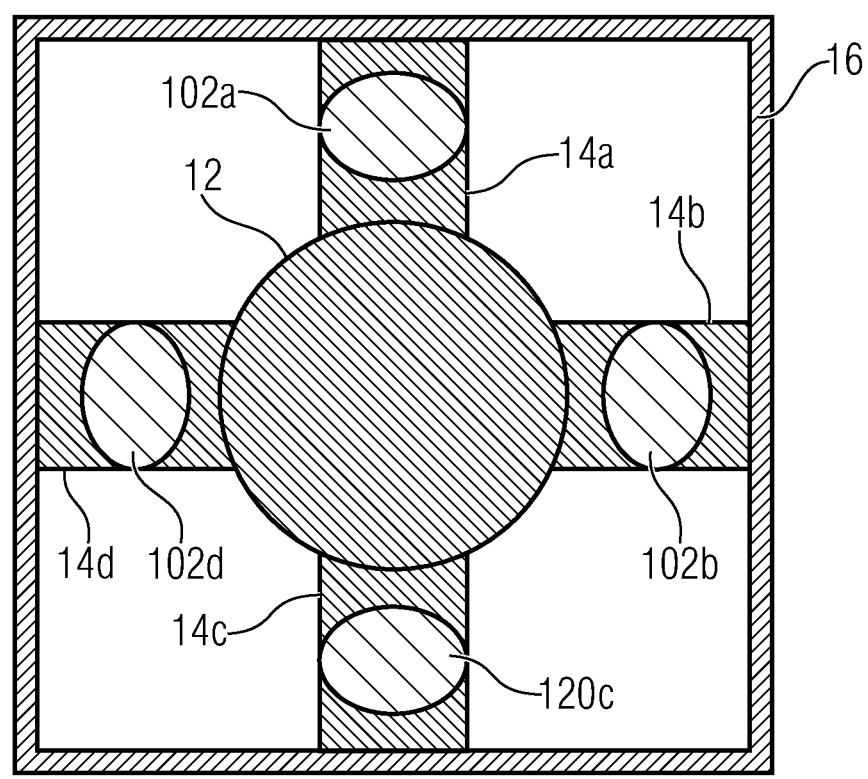
FIG. 48 is a top view of an apparatus having a lens and four ridges, wherein adhesive is arranged at the ridges.

FIG. 48 shows the apparatus 30, where an adhesive 102a-d annealable by UV radiation is arranged at the ridges 14a-d.

Figure 49:
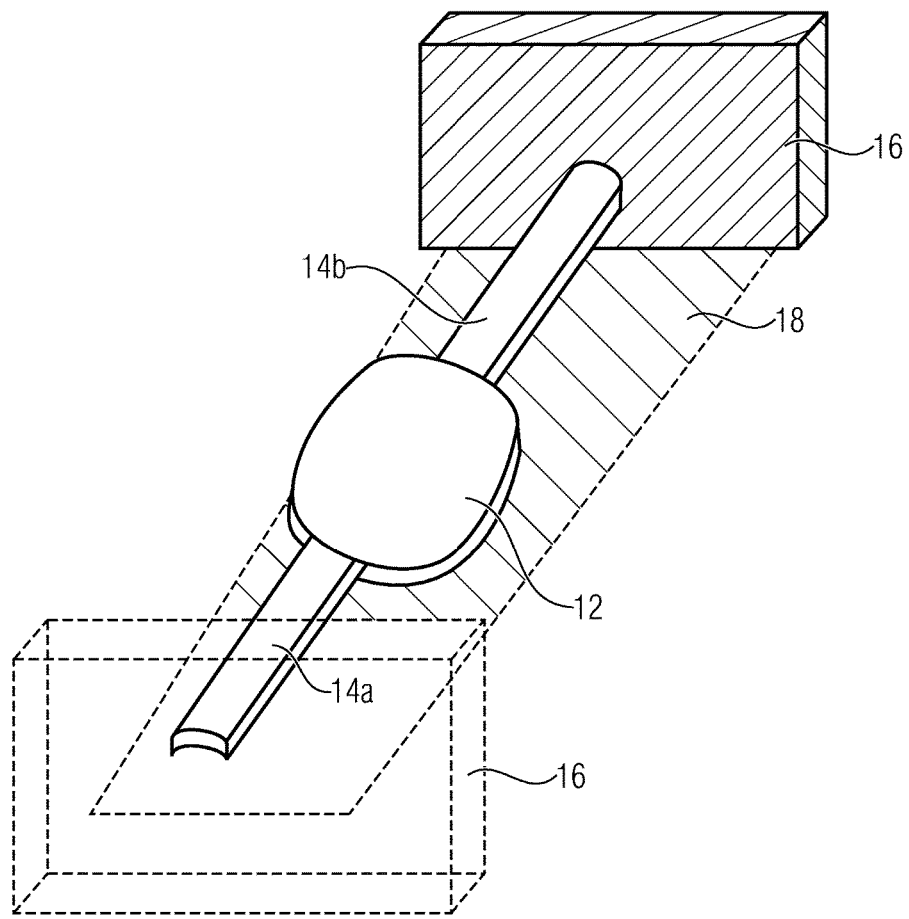
FIG. 49 is a perspective view of an apparatus having a lens and ridges, wherein the ridges have a concavo-convex cross-section.

FIG. 49 shows an apparatus 10 where the ridges 14a and 14b with a concavo-convex cross-section have a curved geometry. This allows both a stabilization of the stationary position of the lens 12 as well as a definition of the movement of the lens 12 which is arranged at the supporting structure 16 via single-layered ridges.

Figure 50A:
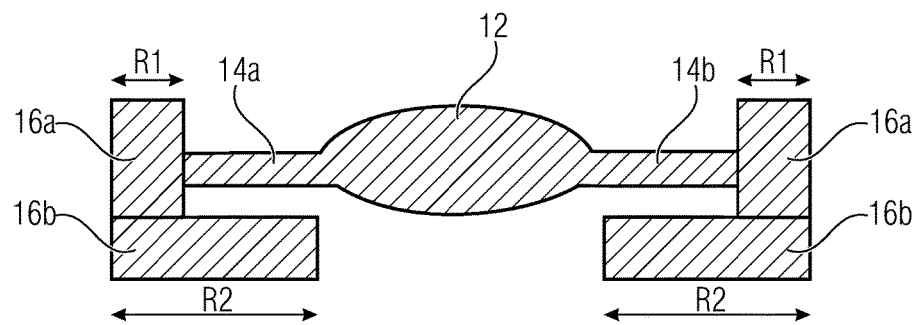
Figure 50B:
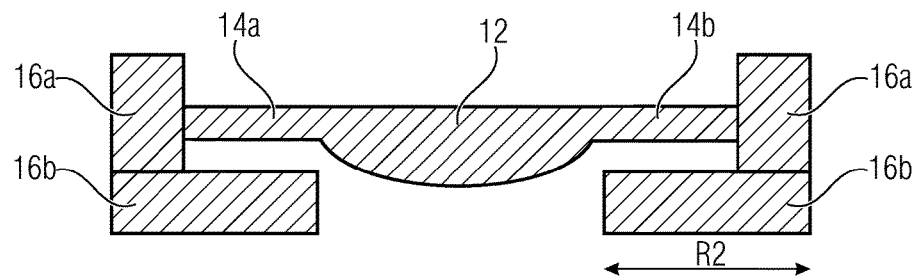
Figure 50C:
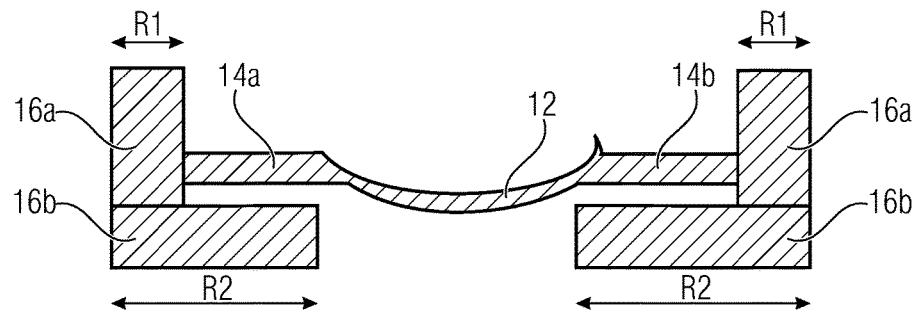

FIG. 50 shows an apparatus analogous to FIGS. 1 and 2, wherein the supporting structure 16 includes a portion 16a having a width R1 and a further portion 16b having a width R2 and the ridges 14a and 14b are arranged in the portion 16a at the supporting structure 16. The space between the ridges 14a and 14b, respectively and the portion 16b of the supporting structure 16 is implemented to allow an arrangement of an annealable adhesive 102 for fixing a new initial position.

Figure 51A:
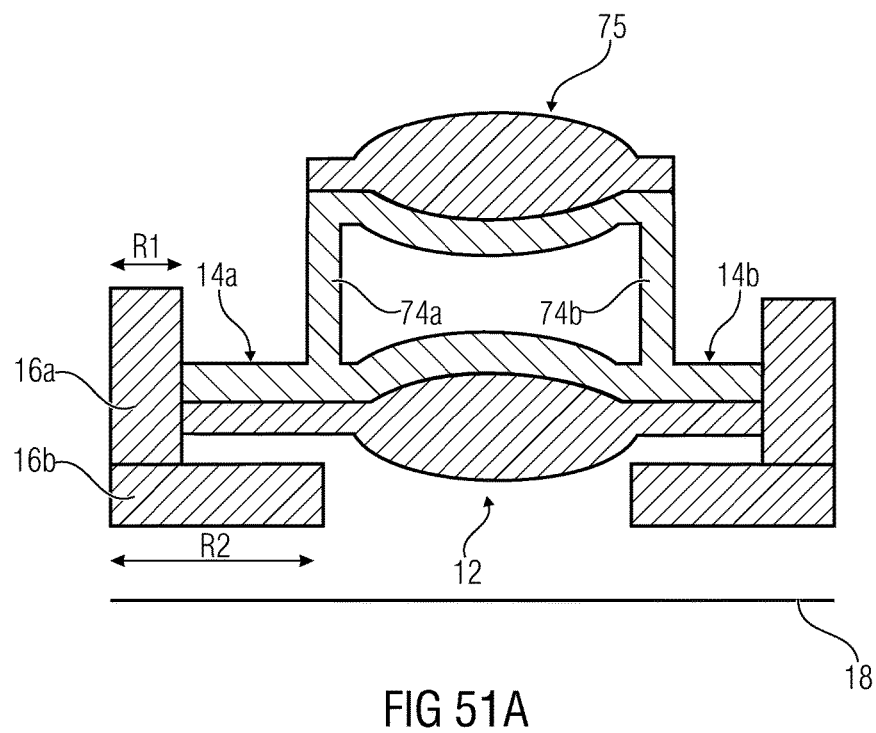

FIG. 51a shows an apparatus analogous to FIG. 26, wherein the portion 16b of the supporting structure 16 limits a space between the ridges 14a and 14b as well as the supporting structure 16 in the direction of the reference plane 18, which is implemented to allow an arrangement of an annealable adhesive 102 for fixing a new initial position.

Figure 51B:
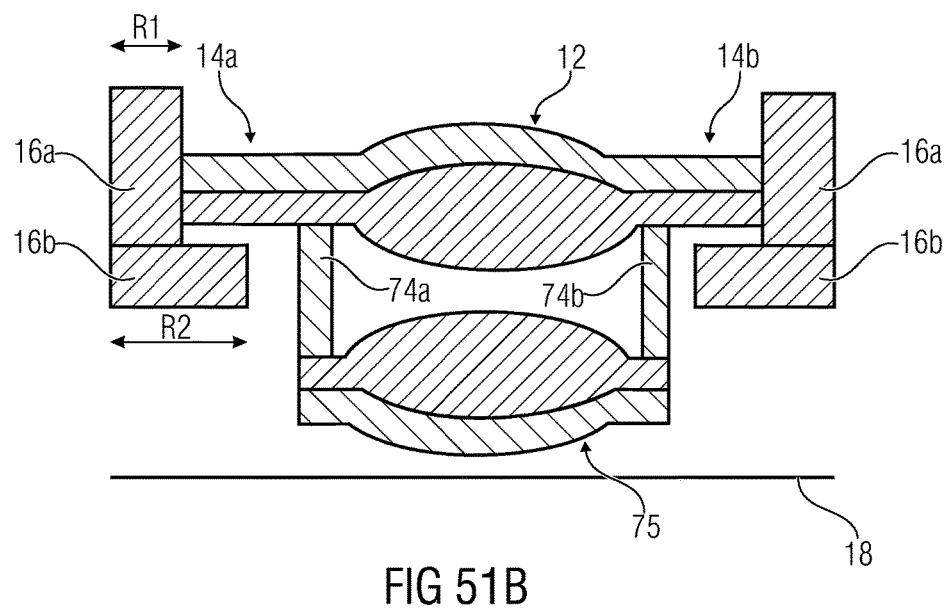

FIG. 51b shows an apparatus analogous to FIG. 27, wherein the portion 16b of the supporting structure 16 limits a space between the ridges 14a and 14b as well as the supporting structure 16 in the direction of the reference plane 18, which is implemented to allow an arrangement of an annealable adhesive 102 for fixing a new initial position.

Figure 52A:
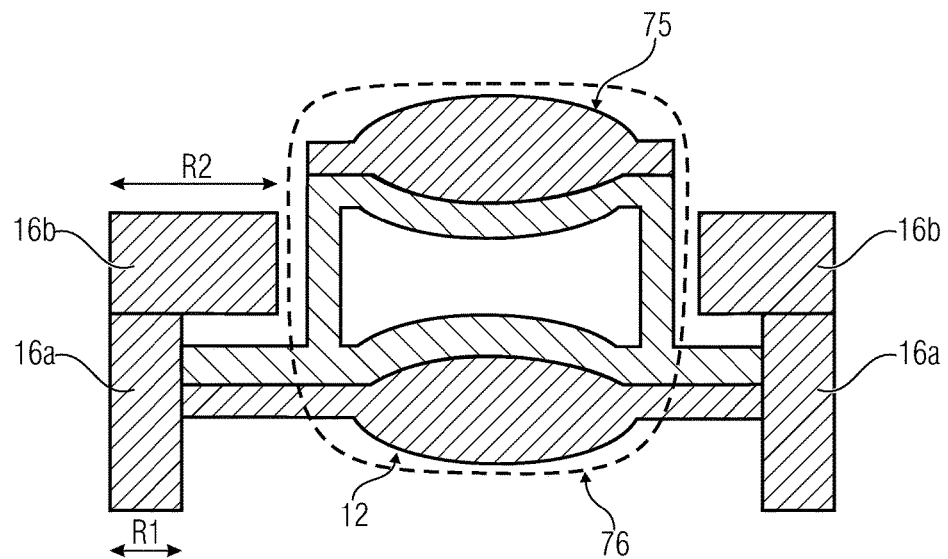

FIG. 52a shows an apparatus analogous to FIG. 26, wherein the portion 16b of the supporting structure 16 limits a space between the ridges 14a and 14b as well as the supporting structure 16 in the direction of the co-moving lens 75, which is implemented to allow an arrangement of an annealable adhesive 102 for fixing a new initial position.

Figure 52B:
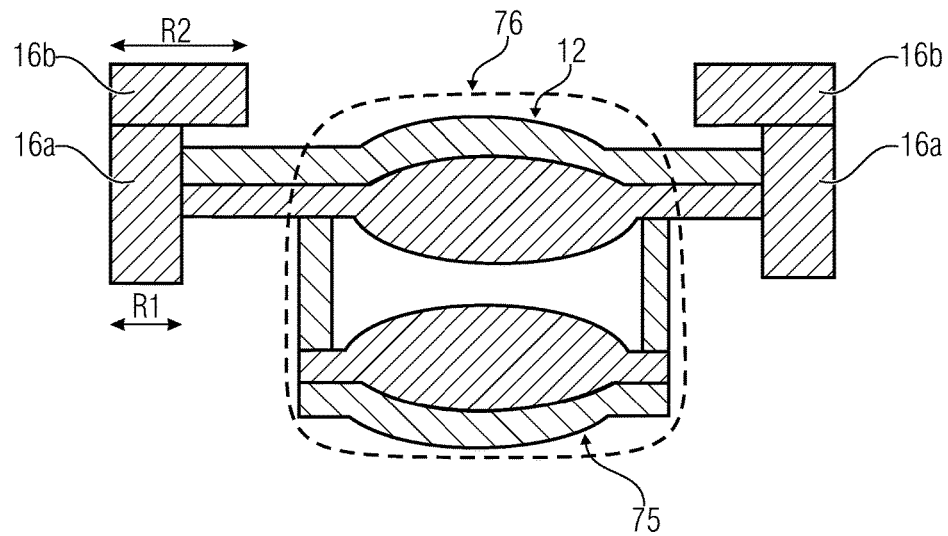

FIG. 52b shows an apparatus analogous to FIG. 27, wherein the portion 16b of the supporting structure 16 limits a space between the ridges 14a and 14b as well as the supporting structure 16 in the direction of the co-moving lens 75, which is implemented to allow an arrangement of an annealable adhesive 102 for fixing a new initial position.

Figure 53:
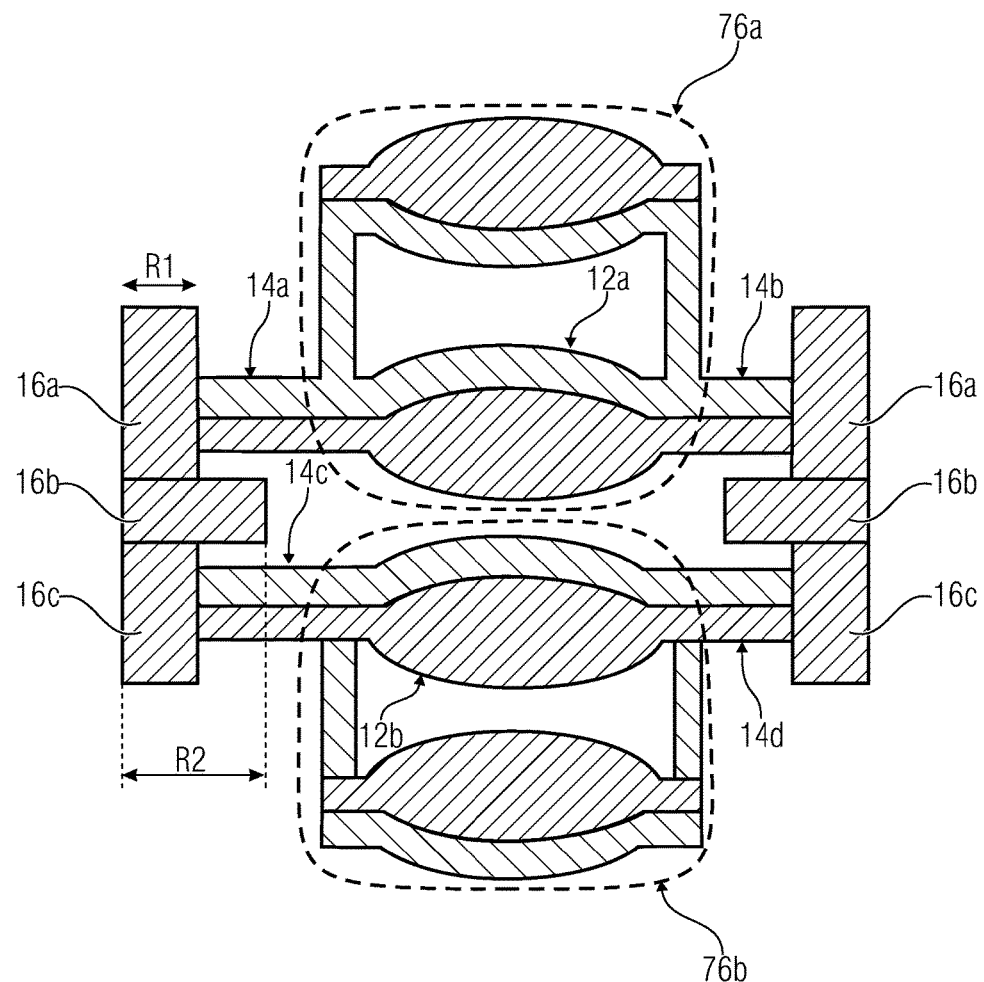
FIG. 53 is a cross-sectional view of an apparatus having two lens stacks and ridges as well as a supporting structure, which is implemented such that adhesive can be disposed at the same with regard to both lens stacks.

FIG. 53 shows an apparatus analogous to FIG. 29, wherein the supporting structure 16 includes, in the area between the two lens stacks 76a and 76b, a portion 16b having a width R2 that is greater than the width R1 of the portion 16a and the portion 16c of the supporting structure 16. Adhesive 102 can be respectively arranged at the portion 16b having the width R2 in the direction of the two lens stacks 76a and 76b, so that both lens stacks 76a and 76b can be adjusted by means of the portion 16b of the supporting structure 16.

FIG. 54a shows an apparatus where the supporting structure 16 includes a portion 16a having a width R1 and a portion 16b having a width R2, the width R2 being greater than the width R1. At a top or bottom side of the supporting structure 16 having the width R1 at the supporting structure 16, a moving lens 12 is arranged via the ridges 14a and 14b. At the opposite top or bottom side of the structure 16, a stationary lens 79a is arranged via further layers 81a and 81b in the gap F2 of the portion 16b, wherein the stationary lens 79a and the further layers 81a and 81b are implemented integrally with the supporting structure 16.

FIG. 54b shows an apparatus consisting of two cells 56a and 56b, wherein each of the cells 56a and 56b is formed consistent with an apparatus of FIG. 54a. The two cells are arranged directly adjacent to one another, and adjacent material layers of the cells with the moving lenses 12a and 12b, the supporting structure 16, the glass wafer 86 as well as the stationary lenses 79a and 79b are each implemented integrally across the course.

FIG. 54c shows an apparatus analogous to FIG. 54b where the cells 56a and 56b are arranged spaced apart from one another on the continuously implemented glass wafer 86. Thus, merely the glass wafer 86 is implemented in an integral manner.

Figure 55A:
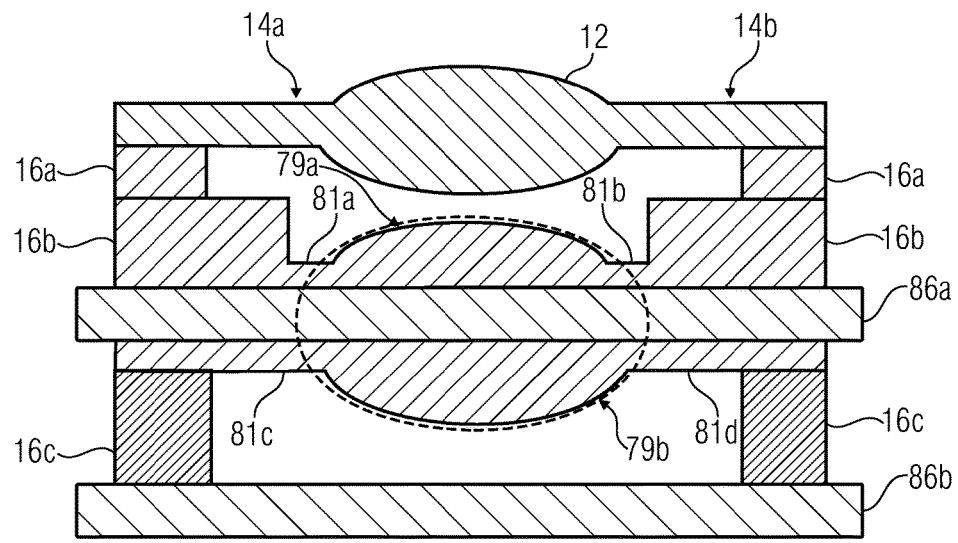
FIGS. 55a-b are cross-sectional views of an apparatus having a supporting structure including several widths and a glass wafer having two optical structures, wherein the apparatus in FIG. 55a includes a single-layered moving lens and the apparatus in FIG. 55b includes a two-layered moving lens.

FIG. 55a shows an apparatus analogous to the apparatus of FIG. 54a, wherein, on the layers 81c and 81d arranged at the half 79b of the stationary lens, a further portion 16c of the supporting structure is arranged, at the end of which a second glass wafer 86b is arranged.

Figure 55B:
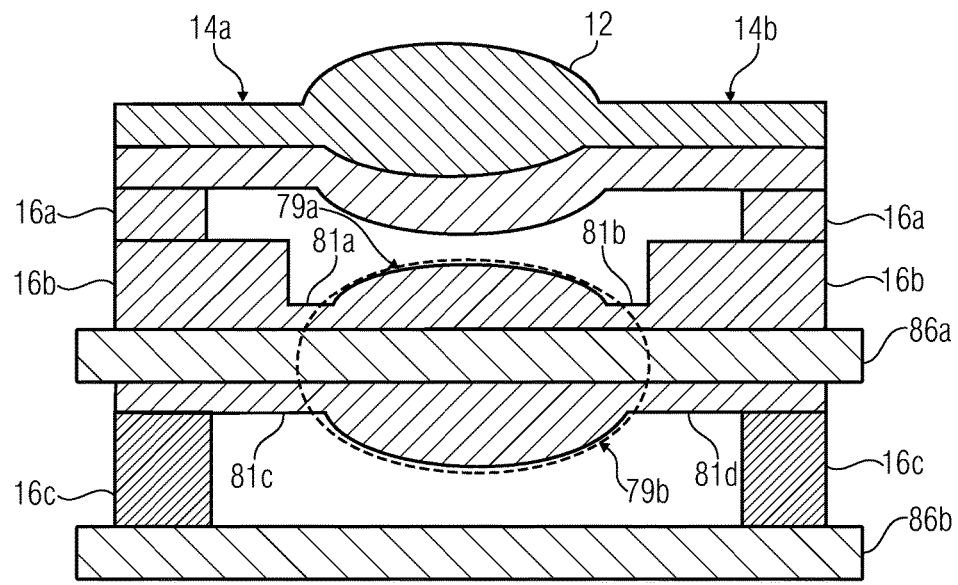

FIG. 55b shows the apparatus of FIG. 55a, wherein the lens 12 is structured in a two-layered manner.

In an apparatus having moving and stationary lenses, single-layered or multi-layered moving or stationary lenses can be used. It is also possible to use several glass wafers 86 in order to implement arbitrary characteristics along an optical axis.

Figure 56A:
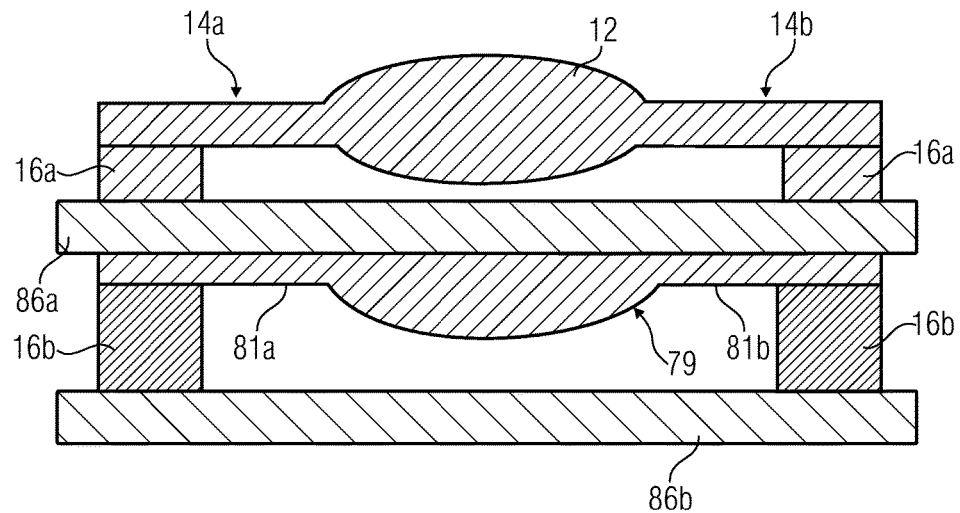
FIGS. 56a-b are cross-sectional views of an apparatus having a supporting structure including two glass wafers and a lens integrally produced with ridges, wherein a section of the supporting structure is formed adjacent to the ridges in FIG. 56a in a two-piece manner and of a different material than the ridges, and in FIG. 56b integrally and of the same material as the ridges.

FIG. 56a shows an apparatus where the sections 16a and 16b of the supporting structure 16 are formed of different materials. The portion 16a is arranged at a glass wafer 86a, wherein the ridges 14a and 14b are arranged at the end of the portion 16a opposing the glass wafer 86a. The main side of the glass wafer 86 facing away from the lens 12 includes a stationary lens 79 with layers 81a and 81b arranged at the same, wherein the stationary lens 79 and the layers 81a and 81b are integrally formed. A portion 16b of the supporting structure which is formed of a different material than the portion 16a is arranged at the layers 81a and 81b. A second glass wafer 86b is arranged at the end of the portion 16b facing away from the stationary lens 79.

Figure 56B:
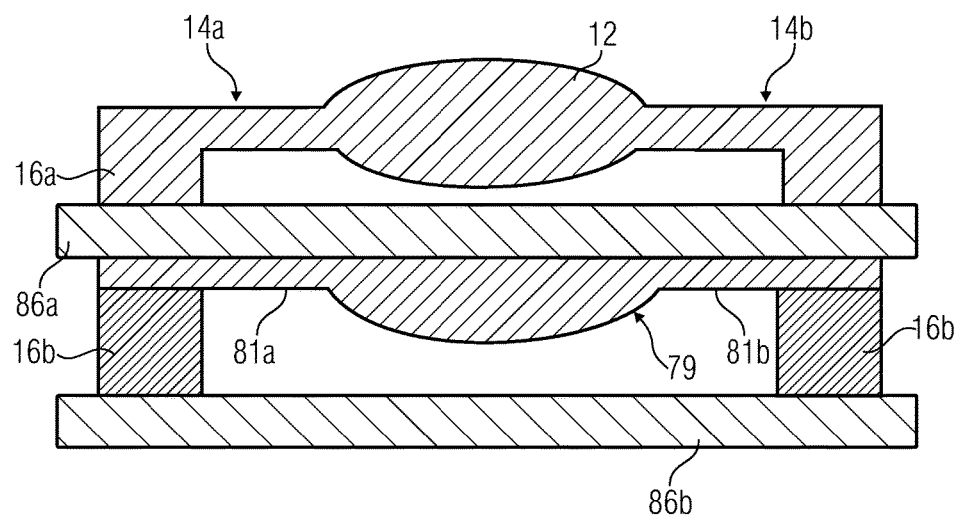

FIG. 56b shows the apparatus of FIG. 56a, wherein the ridges 14a and 14b as well as the portion 16a of the supporting structure 16 are integrally formed with the lens 12.

Depending on the desired function, for example mechanical of thermal characteristics, each portion of an optical overall structure can be formed of a different material. A glass wafer, which either has a stabilizing characteristic or can be implemented as a carrier of an optical structure, such as a lens, can be integrated between the same or different sections of material.

For implementing great dynamics with regard to the deflection of the ridges or an optical structure, it is possible that the usage of the above thermal influenceability of the ridges, which is also utilized via the shown heating elements, is extended by an external force acting on the ridges and moving the same out of their position. This force can be generated, for example, by electrostatic fields in electrostatic drives, as is shown by the following embodiments. Besides mechanical holders or grips, a merely electrostatic deflection is possible, without the utilization or presence of the above-described temperature dependency of the deflection. Here, the electrostatic drives can be implemented in different ways. Some of the embodiments described below provide an extension of the supporting structure by an electrode carrier consistent with a partly curved mold component or a respectively formed portion of the supporting structure, at which an electrode can be arranged. Also, the electrostatic drives can be implemented by a specific formation of the ridges by means of a cantilever electrode as is the case in further implementations described below.

Thus, the above embodiments can be combined with the aspect of embodiments described below, according to which electrostatic drives are used for performing positioning of the optical structure and the ridges during operation. However, the following embodiments can also be used independently of the temperature compensation effect of the above embodiments.

FIG. 57a shows an apparatus 120 analogous to FIG. 1 with a mold component arranged at the same, wherein second electrodes 126a and 126b and first electrodes 122a and 122b are arranged with regard to one another such that the same overlap at least partly and are spaced apart from one another by at least isolator layer 128. The first electrodes 122a and 122b and the second electrodes 126a and 126b form the electrostatic drives 132a and 132b.

Approximately at its center, the mold component 124 has a diameter D3 where the material of the mold component 124, the electrodes 126 and the isolator layer 128 are recessed and which is arranged approximately centrally to the optical axis 28 of the lens 12. Additionally, the mold component 124 includes two surfaces facing the supporting structures 16, FF1 across a width XF1 of the mold component 124 and a continuously curved surface FF2 having the width XF2. The surface FF1 is arranged opposite to the surface FT1 and the width XF1 essentially corresponds to the width XT1. The surface FF1 is implemented in a planar manner while the surface FF2 is implemented in a continuously curved manner. In the present embodiment, a surface FF3 of the mold component 124 is implemented in a planar manner across the extension of the width XF3. Two second electrodes 126a and 126b are arranged at the planar surface FF1 and the curved surface FF2 and are covered at least partly by an isolator layer 128.

The electrostatic drives allow the application of an electric field between the electrodes and hence the application of a force to the electrodes 122 and 126. Thereby, both during initial adjustment and during operation, shifting or tilting of the optical structure can be achieved. During operation, dynamic focusing of the lens is possible, which supplements or realizes the compensation of the thermally induced variations of the lens 12 by the ridges 14—without thermal compensation. The materials of the ridges and lenses, for example, can achieve, for varying environmental temperatures, a constant focal position with regard to a defined object distance. Varying object distances can be focused by means of the electrostatic drives. In particular, a control (not shown) can be provided or at least be connected, which either controls the electrostatic drives, such as in dependence on the temperature acquired by a temperature sensor, in order to counteract the effects of the thermally induced variation of the optical characteristics of the optical structure, or regulates the same, for example depending on an evaluation of a signal depending on the optical characteristic of the optical structure, such as the sharpness of an image captured in the image plane defined at least partly by the optical structure, such as a lens system including the lens suspended on the ridges.

The apparatus of FIG. 57a can be produced, for example, as described below.

Figure 57B:
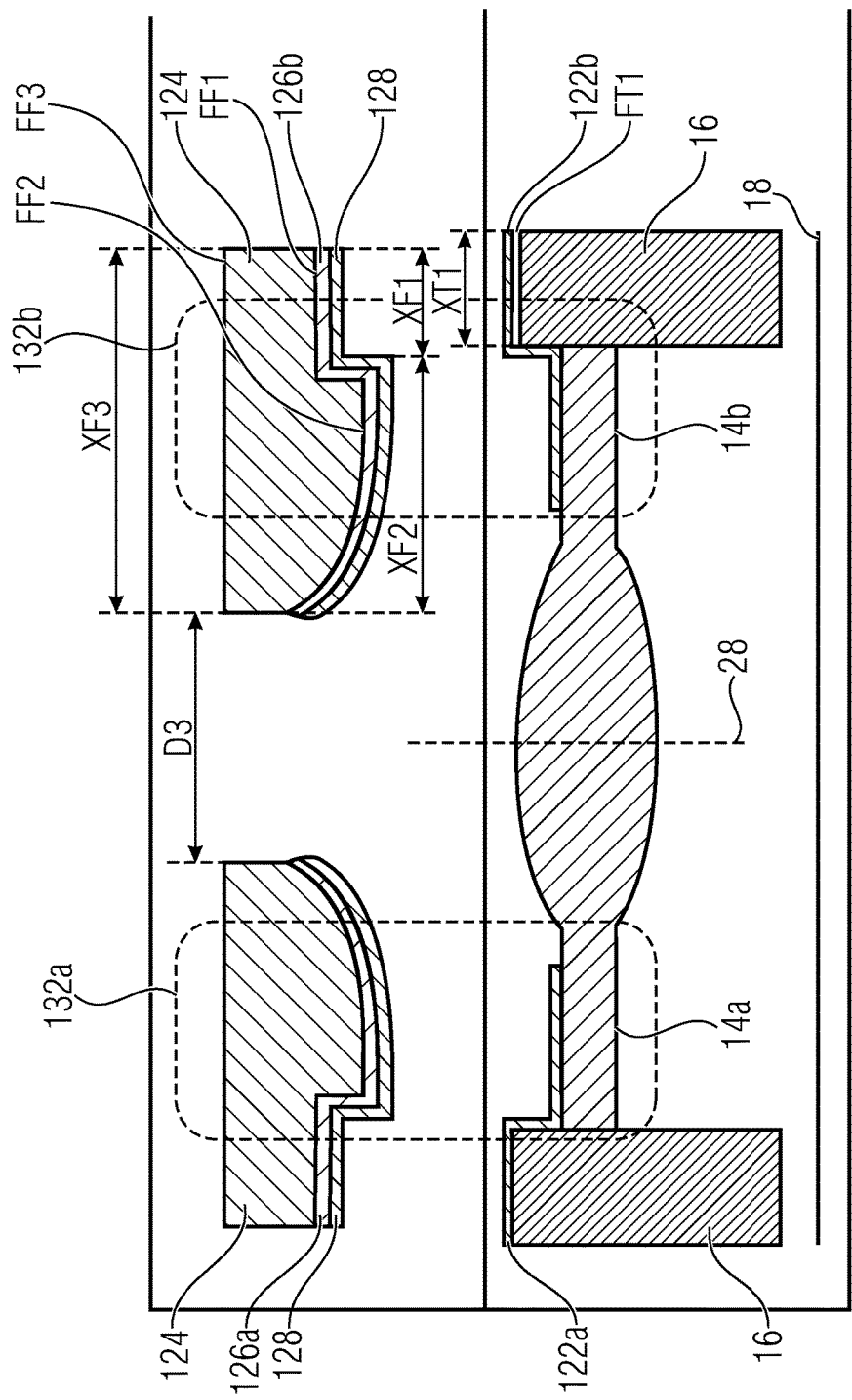

FIG. 57b shows the apparatus 120 with the supporting structure 16 and the components arranged at the same as well as the mold component 124 and the components arranged at the same in the unjoined state. The electrodes 122a and 126a as well as the electrodes 122b and 126b are implemented to act, after joining the supporting structure 16 and the mold component 124, each as an electrostatic drive 132a and 132b, respectively, with regard to a ridge 14a and 14b, respectively.

Figure 57C:
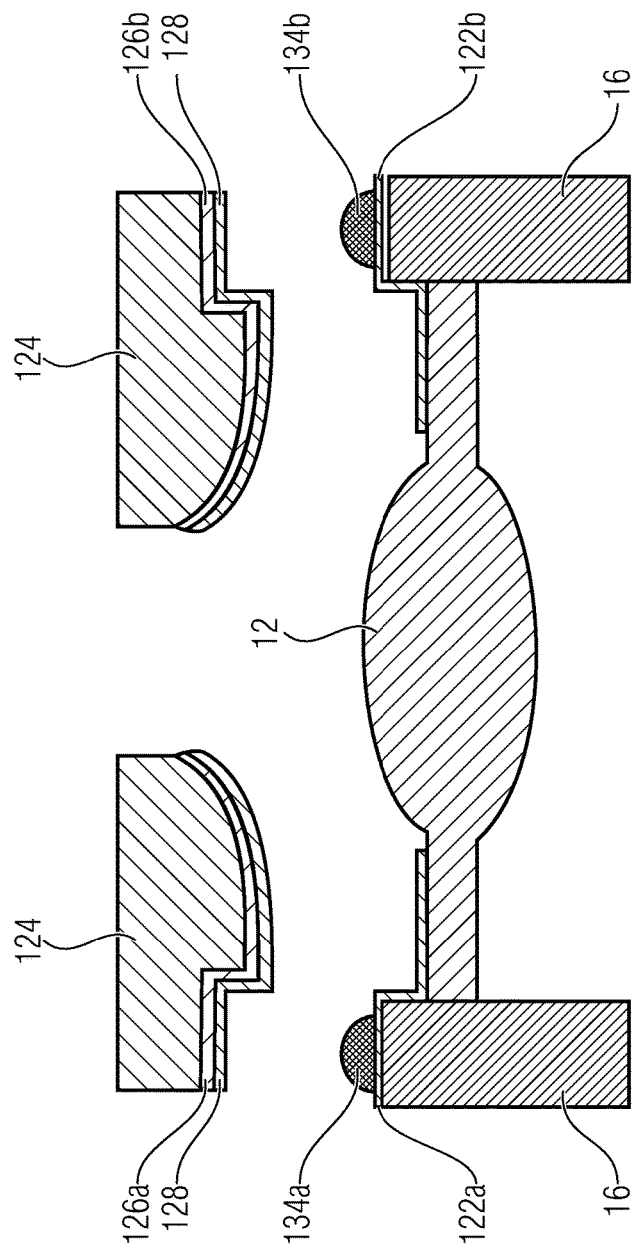
FIG. 57c is the arrangement of an annealable adhesive between the mold component and the supporting structure.

FIG. 57c shows the arrangement of an annealable adhesive 134a and 134b between the surfaces FT1 and FF1, via which the mold component 124 is joined to the supporting structure 16.

If first electrodes 122 are arranged at the ridges and electrostatic drives 132 are used to deflect the ridges 14 and hence the lens 12, this can be performed with great dynamics allowing fast focusing of the lens 12 with regard to the reference plane and an object distance possibly to be focused, so that the optical overall structure, where the lens 12 may be used, can obtain a faster image sequence.

Figure 58:
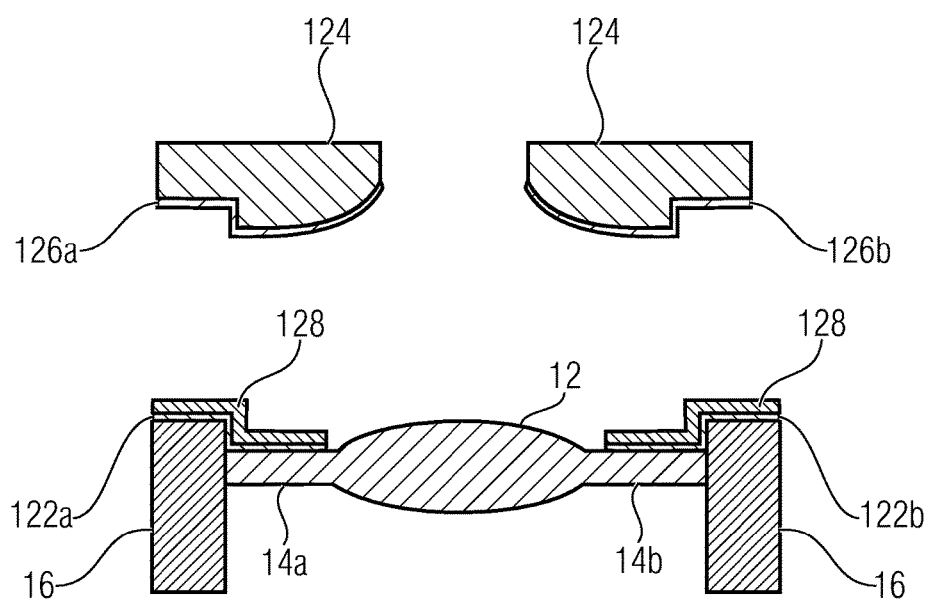
FIG. 58 is a cross-sectional view of an apparatus, wherein the isolation layer is arranged at the first electrode.

FIG. 58 shows an apparatus as an alternative to FIG. 57b, wherein the isolator layer 128 is arranged on the first electrodes 122a and 122b. Basically, the isolator layer 128 can also be positioned between the first electrode 122 and the second electrode 126 such that the same is not arranged in a fixed manner either at the respective first electrode 122a/122b or at a second electrode 126a/b, but can, for example, be introduced as a separate layer between the supporting structure 16 and the mold component 124 during joining. In the area between a surface FT1 of the supporting structure 16 and a planar surface FF1 of a mold component 124, merely the respective first and second electrodes 122a/122b, the second electrode 126a/126b, the isolator layer 128 as well as the adhesive 134a/134b are arranged. In this area, the distance between the first electrodes 122a and 122b is at a minimum and continuously increases from the supporting structure 16 in the direction towards the lens 12.

Figure 59:
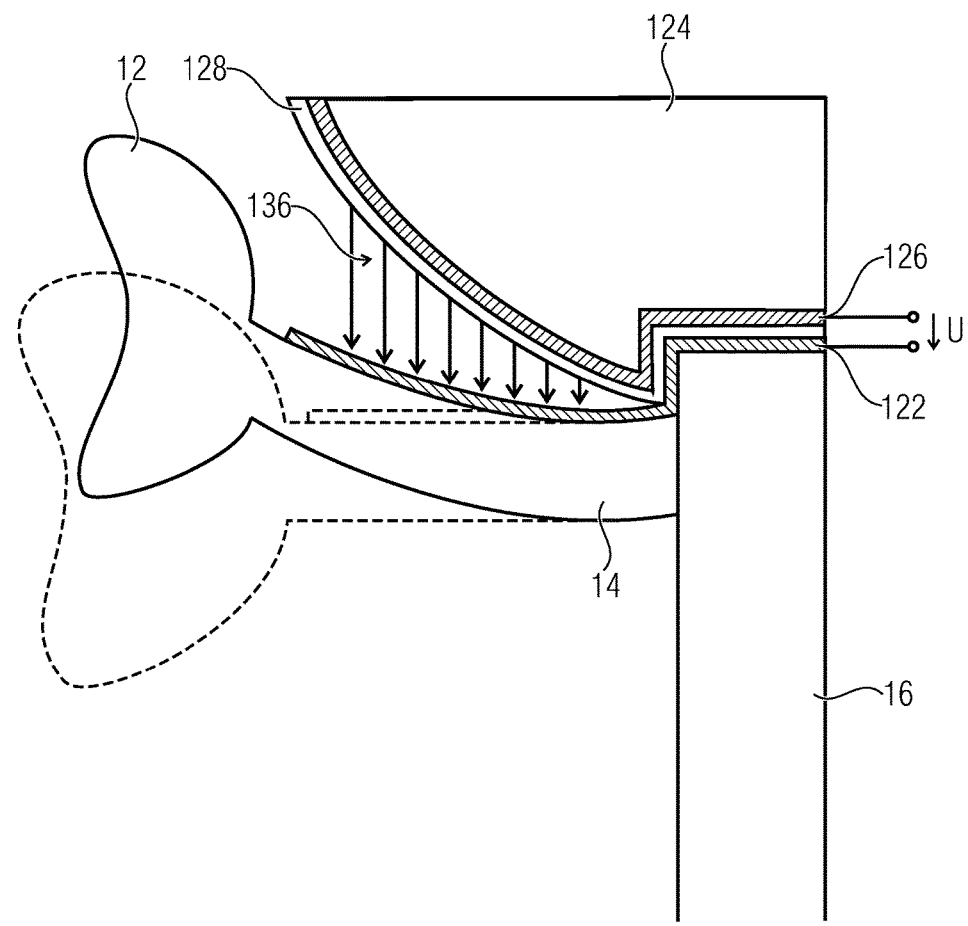
FIG. 59 is a cross-sectional view of an apparatus, wherein an electric voltage is applied to the electrodes of the electrostatic drive.

FIG. 59 shows a portion of the apparatus 120 where an electric voltage U is applied between the first electrode 122 and the second electrode 126. The voltage U results in the formation of an electric field 136 between the two electrodes and hence to an attracting force between the two electrodes. By the arrangement of the mold component 124 at the supporting structure 16, the second electrode 126 is arranged in a stationary manner with regard to the supporting structure 16. The attracting force of the electric field 136 has the effect that the lens 12 and the ridge 14 move from their original position, indicated in dotted lines, in the direction of the second electrode 126.

Depending on the polarity of the electric field, also, a repelling force can be generated between the two electrodes, which results in a movement of the ridges 14 and the lens 12 away from the second electrode 126.

FIG. 60a shows a top view of a cell 56 of the apparatus 30 of FIG. 20 where the first electrodes 122a-d are arranged at the ridges and extend on the surface FT1 of the supporting structure 16. The optical axis 28 is in the center of the lens 12. FIG. 60b shows a top view of the mold component 124, where the second electrodes 126a-d, indicated in dotted lines, are arranged, which are covered by the isolator layer 128 arranged in a planar manner. At the center, the mold component includes the round recess having the diameter D3 allowing, after joining the mold component 124 to the supporting structure 16, unobstructed light passage along the optical axis 28 of the lens 12.

Figure 61A:
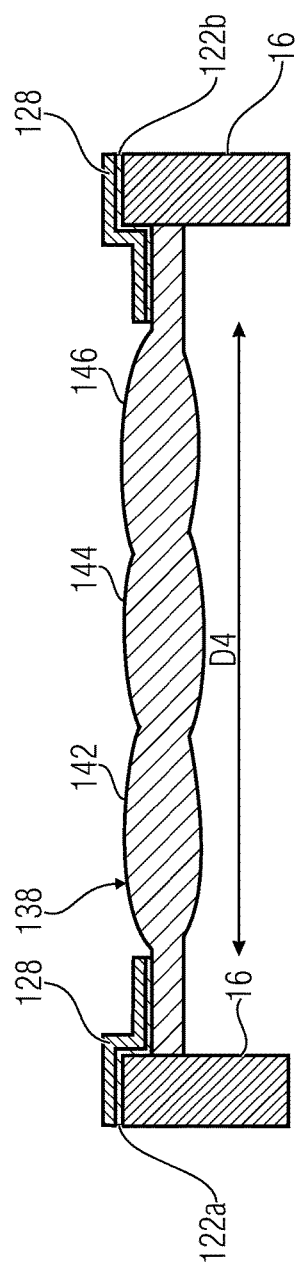
FIG. 61a is a cross-sectional view of an apparatus having two ridges and an optical array in the form of several adjacent lenses having a diameter.

FIG. 61a shows an apparatus analogous to FIG. 58, wherein the optical structure includes, instead of the lens 12, an optical array 138 having several adjacent lenses 142, 144 and 146 that are directly connected to one another and have the common diameter D4 and are together mounted on the supporting structure 16 via ridges 14. The lenses 142, 144 and 146 represent an optical structure similar to the lens array 68 of FIG. 24. Here, the lenses 142, 144 and 146 can have transparent, reflecting or absorbing areas.

Figure 61B:
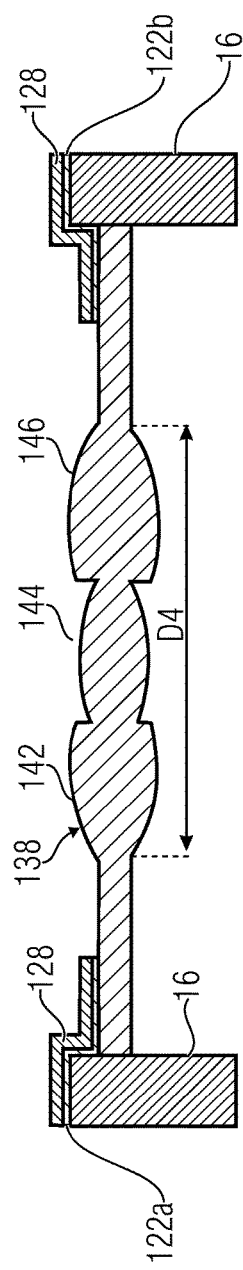
FIG. 61b is a cross-sectional view of an apparatus analogous to FIG. 61a, wherein the optical array includes sections of lenses.

FIG. 61b shows an alternative embodiment of FIG. 61a, where the lenses 142 and 146 of the optical array 138 include sections of lenses.

Figure 61C:
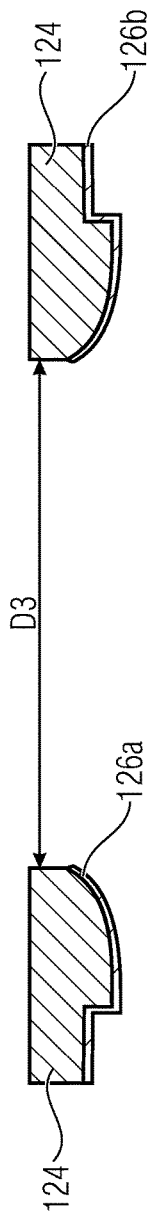
FIG. 61c is a cross-sectional view of a mold component whose inner diameter is implemented smaller than the diameter of the optical array according to FIGS. 61a and 61b.

FIG. 61c shows a mold component 124 at whose surfaces FF1 and FF2 the second electrodes 126a and 126b are arranged and whose diameter D3 is smaller than the diameter D4 of the optical array 138 in FIGS. 61a and 61b. The diameters D3 and D4 can be dimensioned independent of one another, in particular the same can be different from one another.

According to alternative embodiments, the optical array can include any number of lenses or sections thereof, wherein the respective individual components can be individually formed.

FIG. 62a shows the cross-section of two adjacent cells 56a and 56b, each having a moving lens 12a and 12b, whose ridges 14a-d are covered, analogous to the apparatus 120 of FIG. 58, with the first electrodes 122a-d and the isolator layer 128 and wherein the supporting structure 16 includes grooves 148a and 148b.

FIG. 62b shows the cross-section of the unjoined mold component 124 which is implemented so as to be joined to both cells 56a and 56b of FIG. 62a and which includes two recesses having a diameter D3 which are positioned, in the joined state, each approximately concentrically around the optical axes 28a and 28b of the lenses 12a and 12b. The mold component 124 includes tongues 152a and 152b which are implemented to be arranged at the grooves 148a and 148b of FIG. 62a.

Figure 62C:
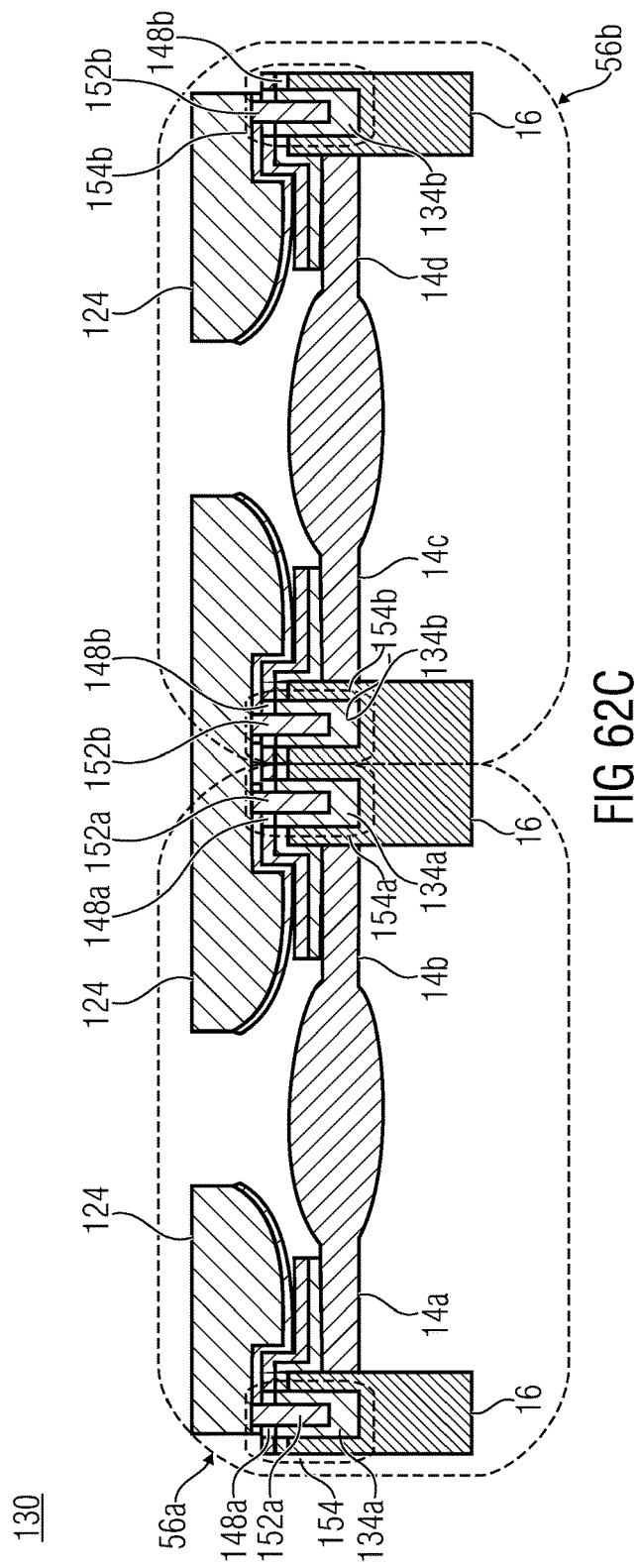
FIG. 62c is a cross-sectional view of an apparatus according to FIG. 62a and the mold component according to FIG. 62b in the joined state having two cells, each having a moving lens and two electrostatic drives.

FIG. 62c shows the apparatus 130 in the joined state of mold component 124 of FIG. 62b and supporting structure 16 of FIG. 62a, wherein the tongues 152a-b are introduced into the grooves 148a-b, adhesive 134a-d is introduced between the grooves 148a-b and the tongues 152a-b, and the grooves 148a-b, the tongues 152a-b and the adhesive 134a-d form the joining zones 154a-d.

Figure 63A:
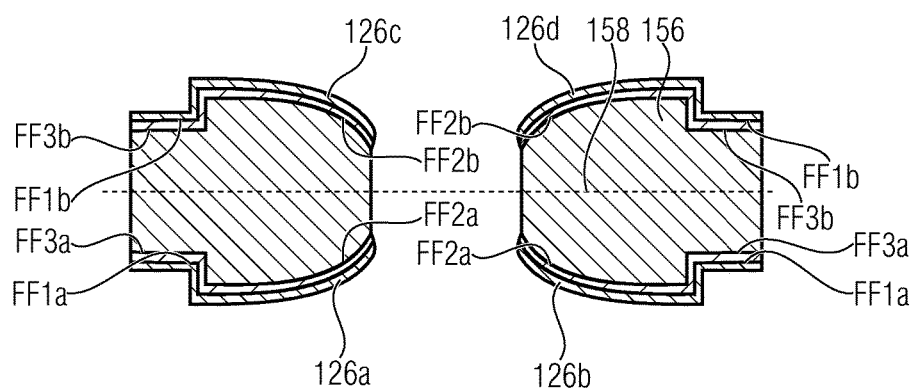
FIG. 63a is a cross-sectional view of a mold component curved on both sides, at which electrodes are arranged.

FIG. 63a shows the cross-section of a mold component curved on both sides 156 structured symmetrically with regard to an axis of symmetry 158, and each half of the mold component 156 can be represented as a mold component 124 of FIG. 58, wherein the surfaces FF3a and FF3b of the two halves of the mold component 156 are arranged congruently on one another. The mold component curved on both sides 156 includes a second planar surface FF1b and a second curved surface FF2b, where further two electrodes 126c and 126d are arranged and the mold component 156 is hence implemented to be part of two electrostatic drives 132a and 132b and 132c and 132d, respectively.

Alternative embodiments include a mold component curved on both sides whose surfaces show no symmetry to one another. Particularly when sections of the supporting structure differ from one another along the optical axis, dimensions and formations of mold components curved on both sides can be implemented independent of one another.

Figure 63B:
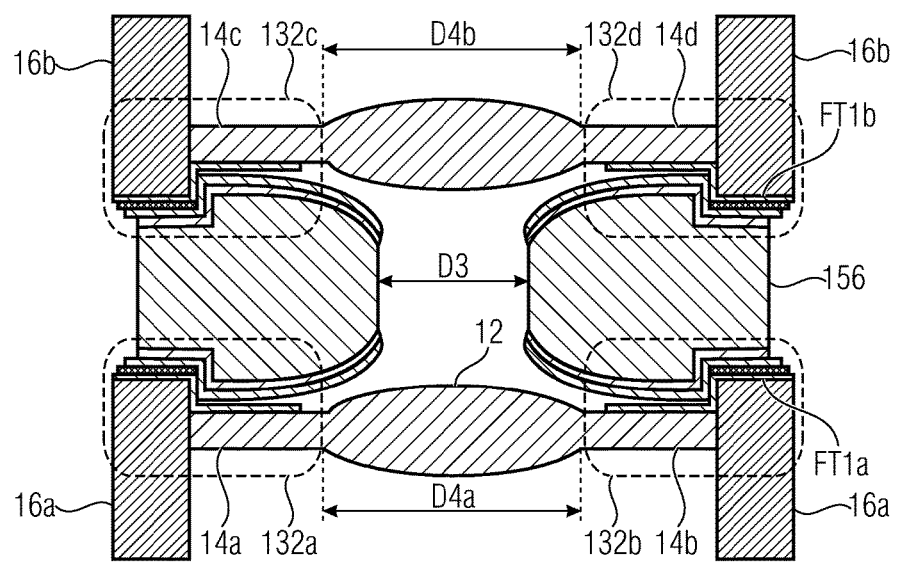
FIG. 63b is a cross-sectional view of an apparatus wherein two partial apparatuses are joined via the mold component curved on both sides of FIG. 63a and wherein two sections of a supporting structure are joined via the mold component.

FIG. 63b shows an apparatus where two apparatuses, analogous to FIG. 58b, are joined via a mold component curved on both sides 156 such that the optical axes of lenses 12a and 12b essentially coincide and the areas FT1a and FT1b of the supporting structures 16a and 16b are arranged facing each other and the mold component 156 is part of four electrostatic drives 132a, 132b, 132c and 132d.

Figure 64:
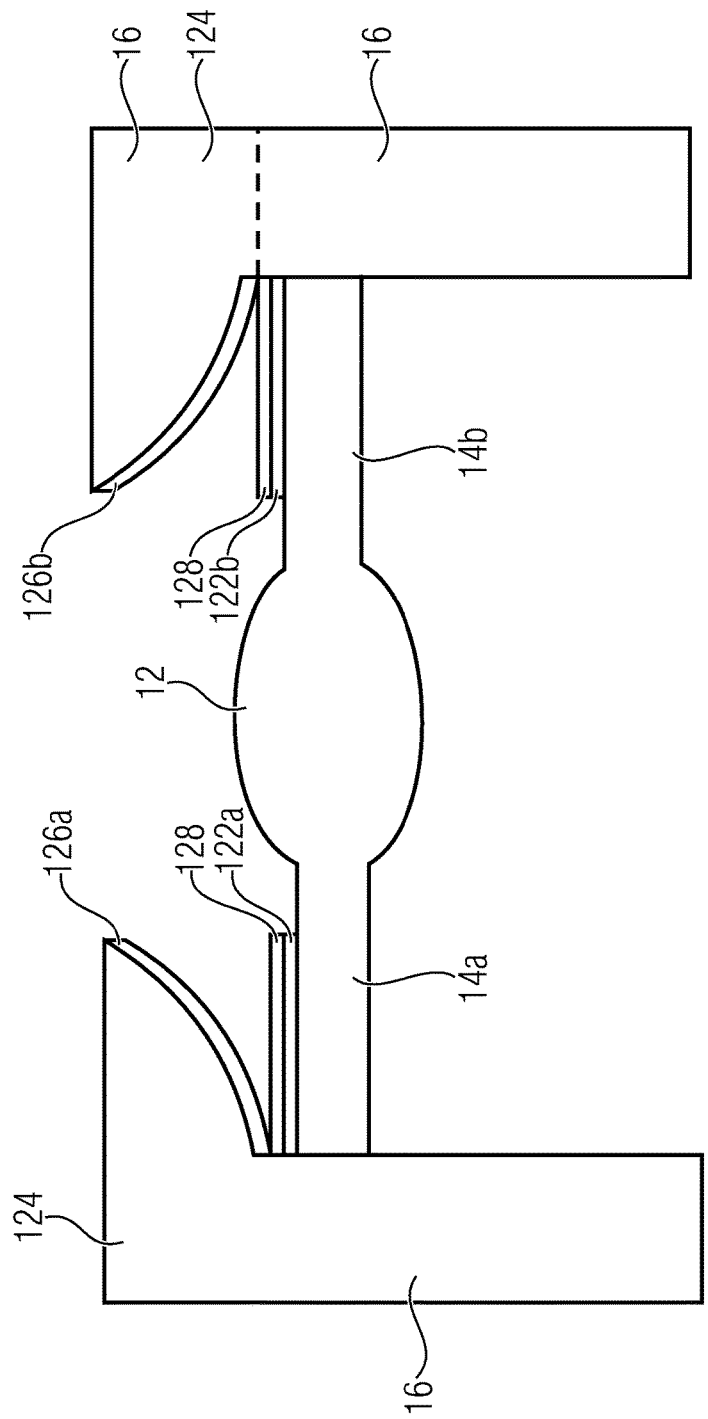
FIG. 64 is a cross-sectional view of an apparatus wherein the mold component and the supporting structure are integrally formed.

FIG. 64 shows an apparatus where the mold component 124 is formed integrally with the supporting structure 16.

Figure 65:
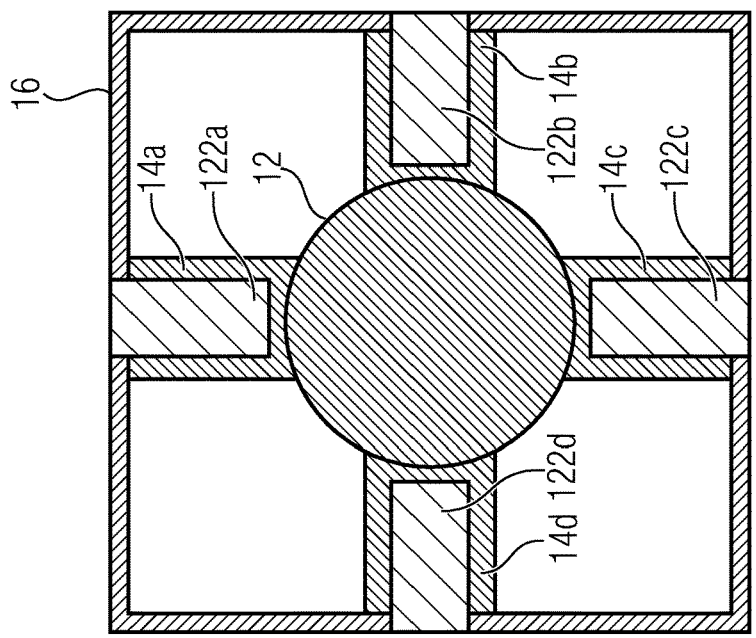
FIG. 65 is a top view of an apparatus analogous to FIG. 7 having electrodes formed rectangularly at the ridges.

FIG. 65 shows the apparatus 30 of FIG. 7, wherein rectangularly formed first electrodes 122a-d are arranged on parts of the ridges 14a-d and parts of the supporting structure 16.

Figure 66:
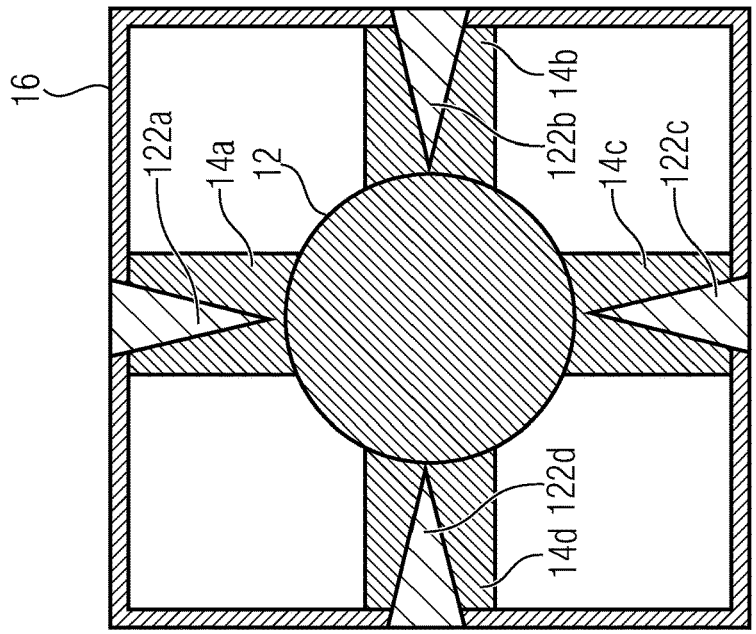
FIG. 66 is a top view of an apparatus analogous to FIG. 65 having electrodes formed triangularly at the ridges.

FIG. 66 shows the apparatus 30, wherein triangularly formed first electrodes 122a-d which taper from the supporting structure 16 towards the lens 12, are arranged on parts of the ridges 14a-d and parts of the supporting structure 16.

FIG. 67 shows the apparatus 30, wherein first electrodes 122a-d formed in a free-form shape are arranged on parts of the ridges 14a-d and parts of the supporting structure 16.

FIG. 68 shows an apparatus analogous to FIG. 11, wherein first electrodes 122a-d whose external edges run parallel to the ridges 14a-d are arranged on parts of the ridges 14a-d and parts of the supporting structure 16.

FIG. 69 shows an embodiment according to FIG. 8, wherein triangularly formed first electrodes 122a and 122b, which taper from the supporting structure 16 towards the lens 12, are arranged on parts of the ridges 14a and 14b and parts of the supporting structure 16.

FIG. 70 shows an embodiment according to FIG. 9, wherein triangularly formed first electrodes 122a and 122b, which taper from the supporting structure 16 towards the lens 12, are arranged on parts of the ridges 14a and 14b and parts of the supporting structure 16.

FIG. 71 shows an embodiment according to FIG. 11, wherein first electrodes 122a and 122b formed in a free-form shape, which taper from the supporting structure towards the lens 12, are arranged on parts of the ridges 14a and 14b and parts of the supporting structure 16.

FIG. 72 shows an embodiment according to FIG. 12, wherein first electrodes 122a-c formed in a free-form shape, which taper from the supporting structure towards the lens 12, are arranged on parts of the ridges 14a-c and parts of the supporting structure 16.

Figure 73:
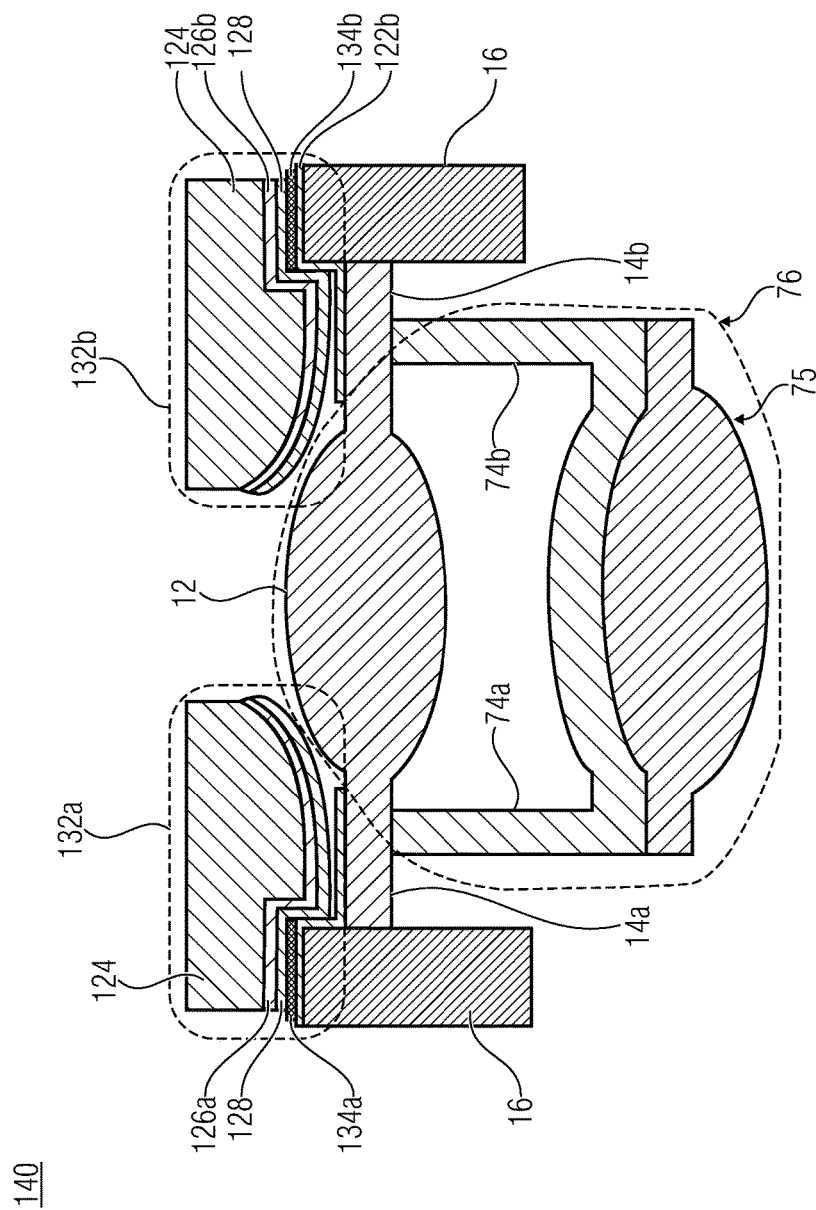
FIG. 73 is a cross-sectional view of an apparatus, wherein a lens stack is moved by an electrostatic drive and the lens stack includes a moving and a co-moving lens.

FIG. 73 shows an apparatus 140 according to the apparatus 120 of FIG. 57c, wherein a co-moving lens 75 is arranged at the ridges 14a and 14b via further structures 74a and 74b, analogous to FIG. 25, and the lens 12 and the co-moving lens 75 form a lens stack 76.

Figure 74:
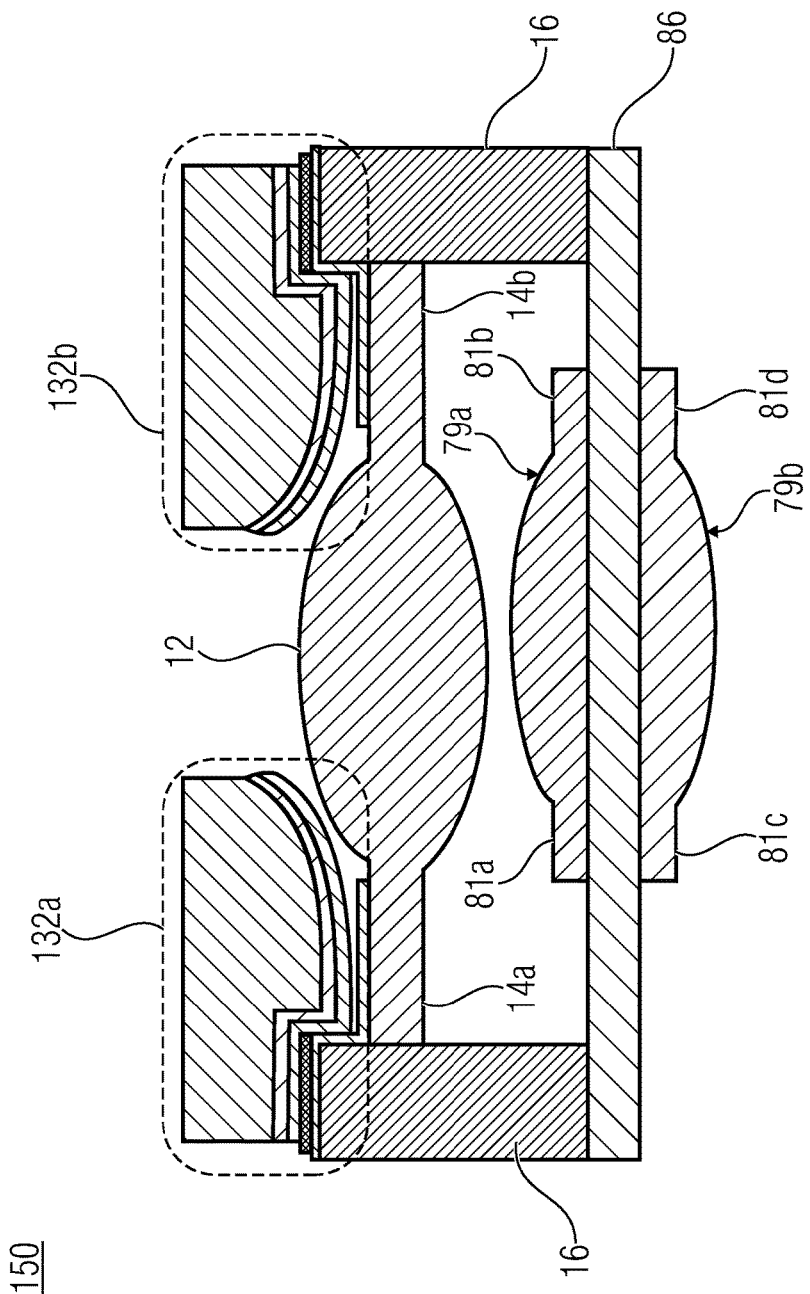
FIG. 74 is a cross-sectional view of an apparatus, wherein a moving lens is moved by electrostatic drives with regard to a stationary lens, wherein the stationary lens is formed at a glass plate.

FIG. 74 shows an apparatus 150 according to the apparatus 70 of FIG. 34, wherein electrostatic drives 132a and 132b are arranged adjacent to the ridges 14a and 14b.

Figure 75:
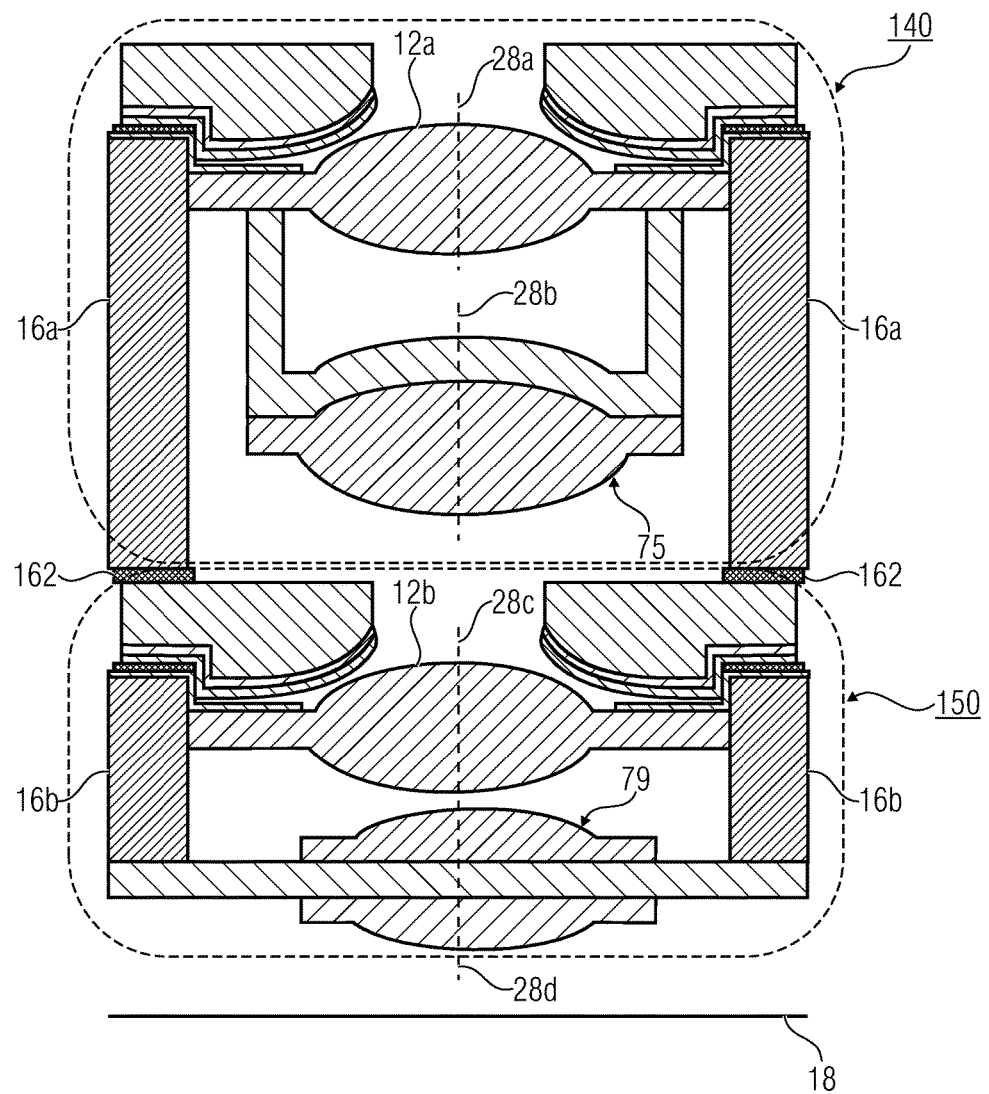
FIG. 75 is a cross-sectional view of two partial apparatuses joined by an adhesive layer, so that the optical axes of all lenses essentially coincide.

FIG. 75 shows an apparatus 140 wherein, at the surface of the supporting structure 16a oriented in the direction of the reference plane 18, the apparatus 150 is joined via an adhesive layer 162 such that the optical axes 28a-d of the lenses 12a, 12b, 75 and 79 essentially coincide. Basically, any combination and sequence of the lenses 12, 75 and 79 and/or apparatuses explained above and below is possible.

Figure 76:
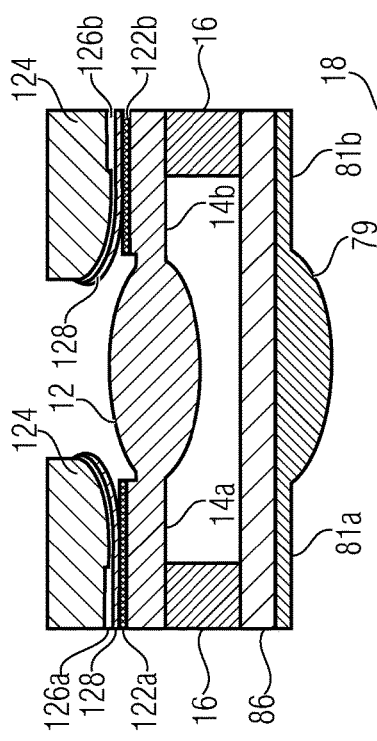
FIG. 76 is a cross-sectional view of an apparatus, wherein a lens is moved by an electrostatic drive with regard to a glass wafer including a single-layered lens on a surface.

FIG. 76 shows an apparatus 160 analogous to apparatus 150, wherein solely on the surface of the glass wafer 86 oriented in the direction of the reference plane 18 a stationary lens 79 and the layers 81a and 81b arranged at the same are formed, wherein the stationary lens 79 and the layers 81a and 81b arranged at the same are formed integrally and extend across the entire width of the glass wafer 86. The supporting structure 16 includes a polymer material.

Figure 77:
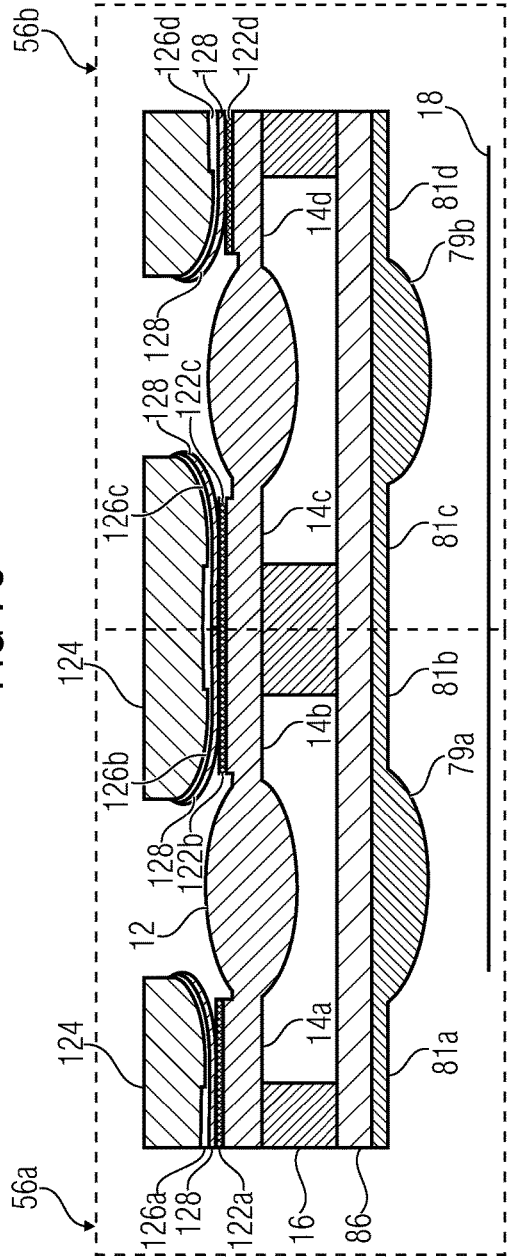
FIG. 77 is a cross-sectional view of an apparatus having several adjacent lenses that can be moved separately with regard to a glass wafer.

FIG. 77 shows an apparatus according to apparatus 130 without the grooves 148 and the tongues 152, wherein the cells 56a and 56 b are each implemented consistent with the apparatus 160 and the stationary lens 79a with the layers 81a and 81b arranged at the same and the stationary lens 79b and the layers 81c and 81d arranged at the same are each integrally formed.

Figure 78:
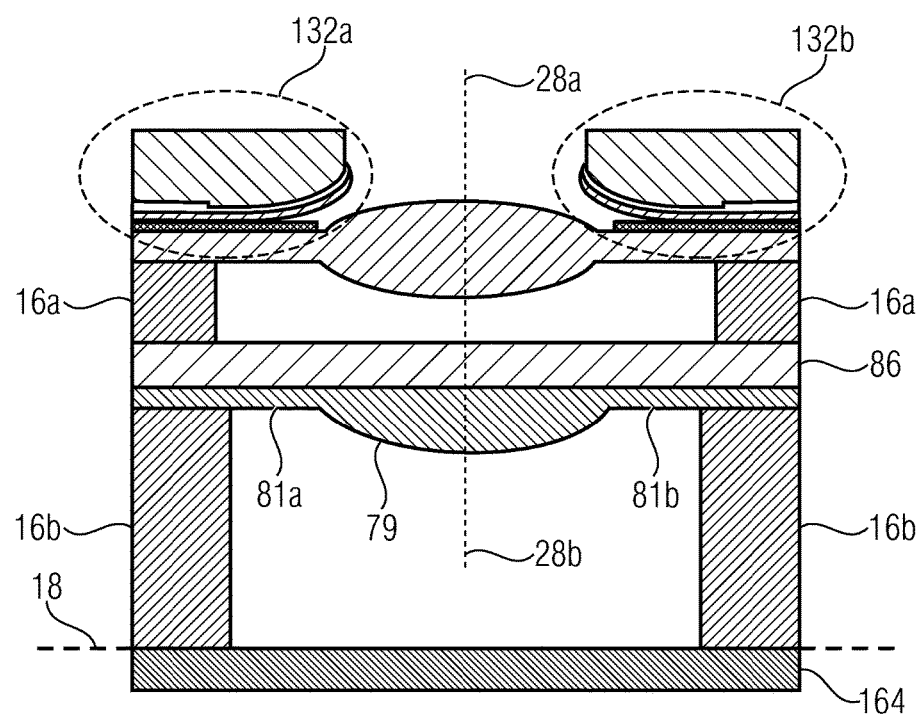
FIG. 78 is a cross-sectional view of an apparatus where an image converter is arranged at the supporting structure.

FIG. 78 shows an apparatus 170 extending the apparatus 160 such that a further supporting structure 16b is arranged at the layers 81a and 81b arranged at the stationary lens 79 in the direction of the reference plane 18 and the reference plane 18 is the surface of an imager 164 facing the lens 12, which is arranged along the optical axis 28 on the side of the further supporting structure 16b facing away from the stationary lens 79.

The apparatus 170 offers the option of placing optics on an imager without prior active adjustment. Adapting an optimum focal position and hence compensating tolerances and/or production tolerances can be performed by means of controlling the electrostatic drives 132a and 132b. Further, this embodiment offers the option of also changing an axial position of the lens 12 by controlling the electrostatic drives 132a and 132b, and hence adapting, among other things, the focal position depending on an object distance as is the case in an autofocus. For this, possibly, evaluation of image capturing performed in the imager can be performed by means of a specifically implemented algorithm, as is common for autofocus.

Figure 79:
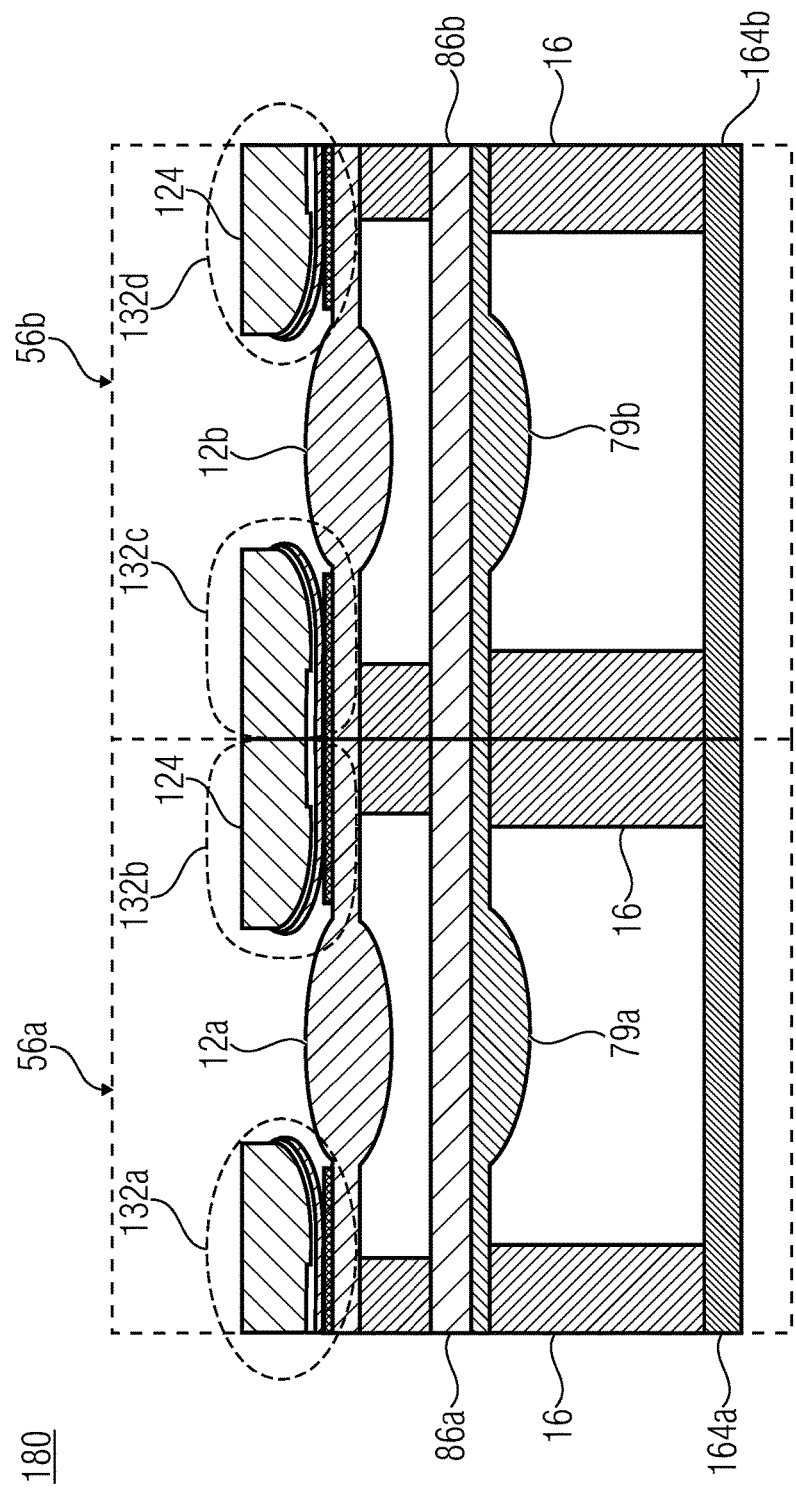
FIG. 79 is a cross-sectional view of an apparatus where two lenses can be moved separately with regard to one glass wafer and one image converter each.

FIG. 79 shows an apparatus 180 formed of two adjacent cells 56a and 56b, each formed as apparatus 170 and whose cells 56a and 56b are arranged adjacent to one another consistent with apparatus 130 of FIG. 77, for example as the result of a production process of the apparatus at wafer level.

Thereby, it is possible to place a plurality of optical structures and optics in combination without prior active adjustment on a wafer together with a plurality of imagers and to perform wafer-level assembly. After wafer-level assembly has been performed, the individual optical modules can be separated from one another. This can take place, for example, by sawing. Also, several optical modules can form a group of individual modules that remain connected to one another. In this way, fields of optical modules can be produced which can have any extension, for example 1×2, 2×2, 3×3 or others.

Figure 80:
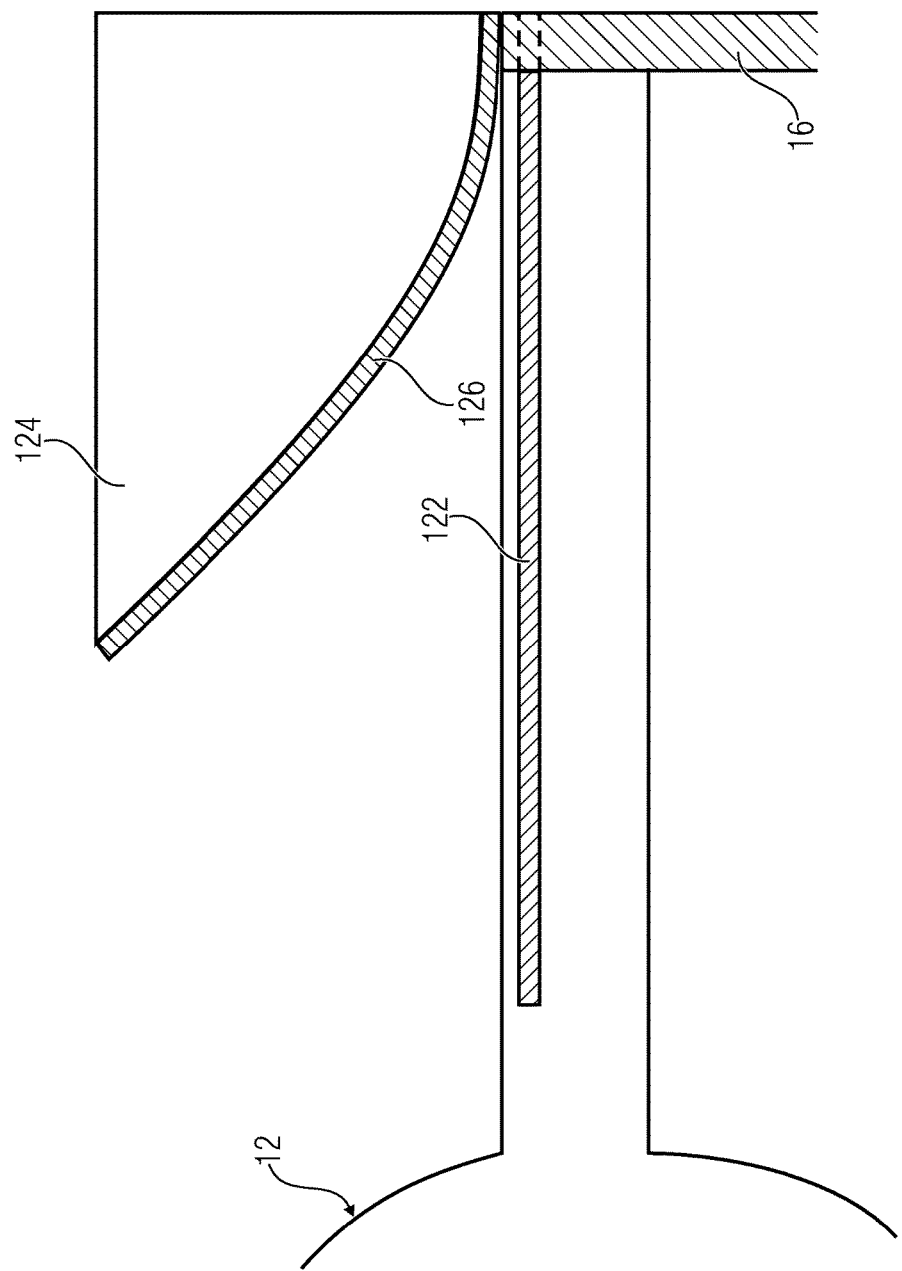
FIG. 80 is a cross-sectional view of an apparatus where an electrode is embedded in a ridge.

FIG. 80 shows an arrangement of the first electrode 122 within the ridge 14, wherein the first electrode 122 is covered by the material of the ridge 14 on the side facing the second electrode 126. In this embodiment, the material of the ridge 14 arranged between the first electrode 122 and the second electrode 126 functions at the same time as the isolator layer 128.

Basically, in can be advantageous to match the implementations and arrangement of the first and second electrodes 122 and 126 such that a linearized ratio of the voltage U applied between the electrodes and resulting deflection of the ridges 14 and/or the optical structure results. Such an adaptation can be realized, for example, by an adapted geometry of the first or second electrodes having different widths across an axial extension, so that the voltage U generates a variable force between the electrodes by means of a variable electric field across the axial curve of the electrodes.

While the diameter D3 has been illustrated as being smaller than the diameter D4, the two diameters D3 and D4 can have any ratio to one another. Also, the recesses and distances illustrated as diameters can have a different shape, for example oval or rectangular.

The mold components 124 and 156 can also be formed integrally with the supporting structure 16 and generally indicate portions where a second electrode 126 can be arranged to a first electrode according to the above embodiments, i.e. an electrode carrier.

Realizing electrostatic drives can also be obtained by an alternative implementation of the electrodes, by forming parts of the ridge constituting an electrostatic drive with an inner part. Subsequent embodiments represent an alternative implementation of electrostatic drives for ridges of optical structures. The electrostatic drives described below can each be individually realized but can also be combined with those described above. Basically, embodiments described below merely represent a different structure for implementing the electrostatic principle of action. The control and the purpose of the control are similar or the same as those described with regard to the above embodiments. Embodiments described below have an implementation of the electrodes of the electrostatic drives such that locally the distance of two electrodes to one another is minimized by the formation of cantilevers in one of the electrodes of an electrostatic drive in order to reduce the voltage necessitated for controlling the drive for obtaining a mechanical deflection of the ridges and at the same time omitting a curved mold component.

FIG. 81 shows a top view of an apparatus 200 having a lens 12 mounted on the supporting structure 16 via two ridges 14a and 14b. The ridges 14a and 14b include recesses partly exposing a portion 166a and 166b, respectively, of the ridge 14a and 14b, respectively, which is implemented such that the same projects from the plane of the ridge 14a or 14b and comprises an end connected to the ridge 14.

FIG. 82a shows a side view of the apparatus 200 where a transparent mold component 168 formed in a planar manner is arranged along the optical axis 28 of the lens 12. First electrodes 172a and 172b are formed on the side of the ridges 14a and 14b facing the mold component 168, so that the sections 166a and 166b of the ridges 14a and 14b each form a cantilever electrode 174a and 174b. On the side of the mold component 168 facing the lens 12, two static electrodes 176a and 176b are arranged such that they at least partly oppose the cantilever electrodes 174a and 174b and the surfaces of the static electrodes 176a and 176b directed towards the cantilever electrodes 174a and 174b are covered by an isolator layer 128. The cantilever electrodes 174a and 174b project from the plane of the ridges 14a and 14b and abut on the end facing away from the lens 12 adjacent to the isolator layer 128. The location where the cantilever electrodes 174a and 174b touch the isolator layer 128 represents a location of minimum distance between the cantilever electrode 174a or 174b and the static electrodes 176a or 176b, from where the distance in the direction of the lens 12 continuously increases. The ridge 14a, the cantilever electrode 174a, the static electrode 176a and the isolator layer 128 form, like the ridge 14b, the cantilever electrode 174b, the static electrode 176b and the isolator layer one electrostatic drive 182a or 182b each.

FIG. 82b shows the behavior of the apparatus 200 when applying an electric voltage between the cantilever electrode 174a and the static electrode 176a or the cantilever electrode 174b and the static electrode 176b. An electric field 184a or 184b is formed within the electric drive 182a or 182b, which results in an attracting force between the cantilever electrodes and the static electrodes. By arranging the static electrodes 176a and 176b on the mold component 168, the same are stationary with regard to the cantilever electrodes 174a and 174b. FIG. 82b shows a deformation of the ridges 14a and 14b as well as the cantilever electrodes 174a and 174b through forces inherent to the electric fields 184a and 184b which causes a shift 186 of the lens 12 in the direction of the mold component 168, whereby the distance between the cantilever electrode 174a or 174b and the static electrode 176a or 176b changes at least in the area where the electrodes overlap.

Depending on the polarity of the electric field, a repelling force can also be generated between the two electrodes, which results in a shift 186 of the lens 12 away from the mold component 168. With an arrangement of an electrostatic drive 182, a simpler implementation of the static electrodes can be obtained, which allows advantages with regard to production technology. At the same time, a planar mold component 168 can be used instead of a curved mold component 124.

Basically, it can be advantageous to match the implementations and arrangement of the cantilever electrode and the static electrode 174a/b and 176a/b such that a linearized ratio of the voltage U applied between the electrodes and resulting deflection of the ridges 14 and/or the optical structure results. Such an adaptation can be realized, for example, by an adapted geometry of the cantilever electrode or the static electrode having different widths across an axial extension, such that the voltage U generates a variable force between the electrodes by means of a variable electric field across the axial curve of the electrodes.

The electrostatic drives allow the implementation of an initial adjustment for compensating production tolerances as well as dynamic focusing during operation. The operation of the electrostatic drives can implement the characteristic of the ridges to automatically compensate temperature-related changes in optical characteristics of a lens in terms of focusing on varying object distances relevant to the lens.

FIGS. 83a and 83b show the apparatus 200, wherein the mold component 168 is implemented in an opaque manner and which includes a material recess having a diameter D5 essentially corresponding to the diameter D4 of the lens 12.

Figure 84A:
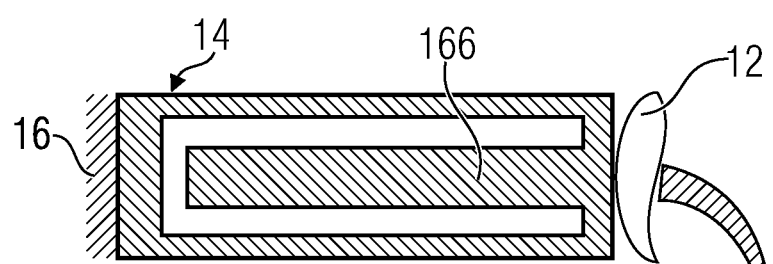
FIGS. 84a-c are top views of an apparatus having a lens and a ridge and different formations of the inner parts of the ridges, wherein the formation in FIG. 84a is rectangular, in FIG. 84b triangular and in FIG. 84c in a trapezoidal shape.
Figure 84B:
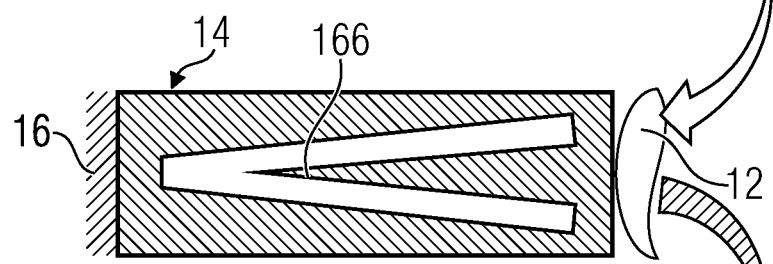
Figure 84C:
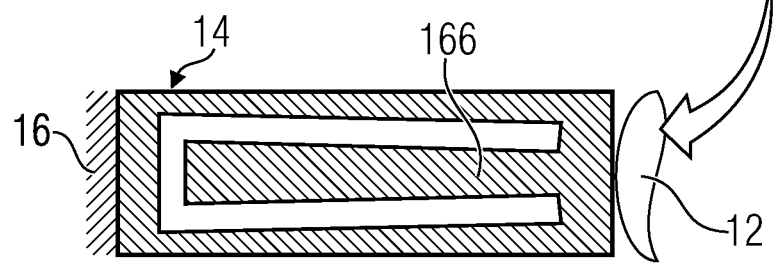

FIG. 84a shows the ridge 14 mounted on the supporting structure 16 including a rectangular portion 166 whose end connected to the ridge 14 is arranged adjacent to the lens 12. FIG. 84b shows the ridge 14 mounted on the supporting structure 16 including a triangular portion 166 that tapers towards the supporting structure 16 and whose end connected to the ridge 14 is arranged adjacent to the lens 12. FIG. 84c shows the ridge 14 mounted on the supporting structure 16, which includes a portion 166 in the form of an isosceles trapezoid, which tapers towards the lens 12 and whose end connected to the ridge 14 is arranged adjacent to the lens 12.

Basically, any possible form of implementation of a portion 166 of the surface of a ridge 14 is conceivable.

Figure 85A:
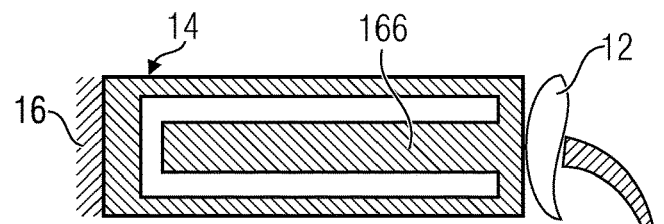
Figure 85B:
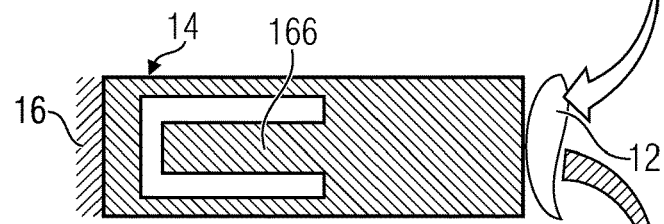
FIG. 85b is a top view of an apparatus analogous to FIG. 85a, wherein the inner part is formed smaller and spaced apart from the lens.
Figure 85C:
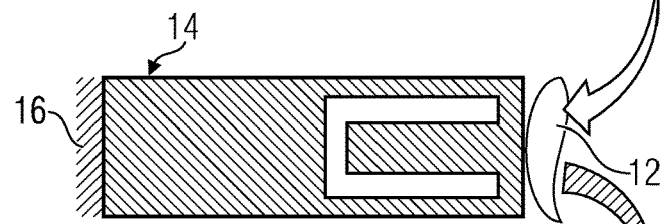
FIG. 85c is a top view of an apparatus analogous to FIG. 85a, wherein the inner part is formed smaller and adjacent to the lens.
Figure 85D:
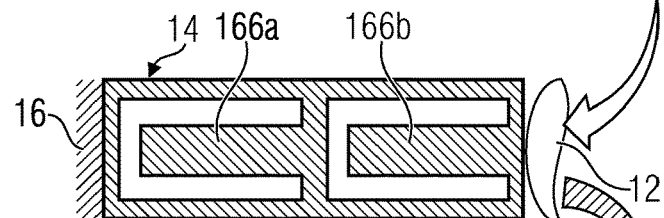
FIG. 85d is a top view of an apparatus wherein the ridge includes an inner part analogous to FIG. 85b and an inner part analogous to FIG. 85c.
Figure 85E:
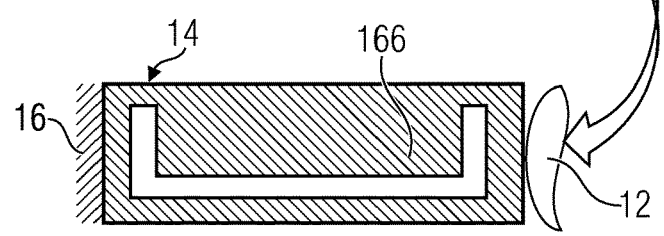
FIG. 85e is a top view of an apparatus wherein the ridge includes an inner part whose end connected to the ridge runs parallel along the direction of the supporting structure towards the lens.

FIG. 85a shows a form of the portion 166 of the ridge 14 identical to FIG. 84a. FIG. 85b shows a portion 166 downscaled with respect to FIG. 85a, which is positioned adjacent to the supporting structure 16 in the ridge 14. FIG. 85b shows a portion 166 downscaled with respect to FIG. 85a, which is positioned adjacent to the lens 12 in the ridge 14. FIG. 85d shows a ridge 14 including two portions 166a and 166b and the portion 166a being arranged adjacent to the supporting structure 16 and the portion 166b being adjacent to the lens 12 in the ridge 15. FIG. 85e shows a portion 166 whose end connected to the ridge 14 runs parallel to the external edge of the ridge 14 along the direction from the supporting structure 16 towards the lens 12.

The extension, number, arrangement and orientation of the portion 166 in the ridges 14 is arbitrary for a mode of operation of the apparatus.

Figure 86A:
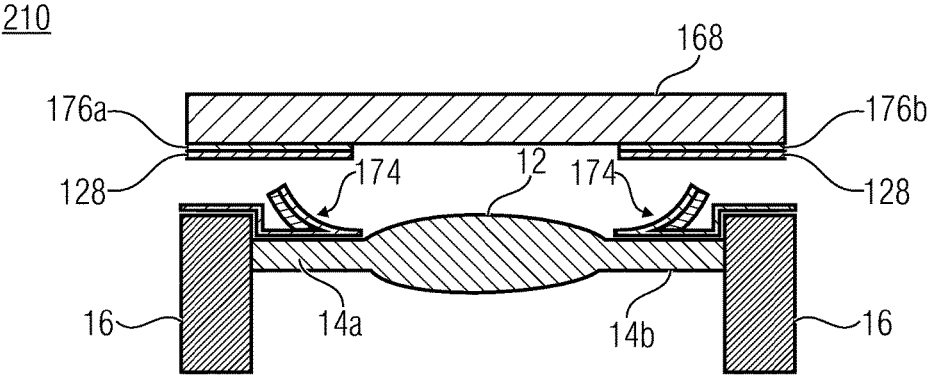
FIG. 86a is a cross-sectional view of the unjoined partial apparatuses of an overall apparatus having a lens and two ridges at a supporting structure as well as a mold component having stationary electrodes arranged at the same.

FIG. 86a shows an apparatus 210 analogous to apparatus 120 wherein the ridges 14a and 14b are implemented analogous to FIGS. 82 and 83 to form cantilever electrodes 174a and 174b and wherein the apparatus includes, instead of the mold component 124 with the electrodes 126a and 126b arranged at the same, the mold component 168 with the static electrodes 176a and 175b and the isolator layer 128.

Figure 86B:
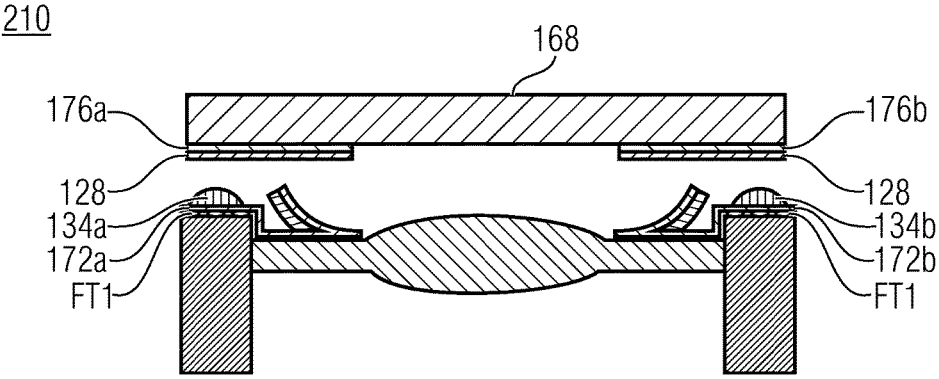
FIG. 86b is a cross-sectional view of the partial apparatuses analogous to FIG. 86b with adhesive arranged at the supporting structure.
Figure 86C:
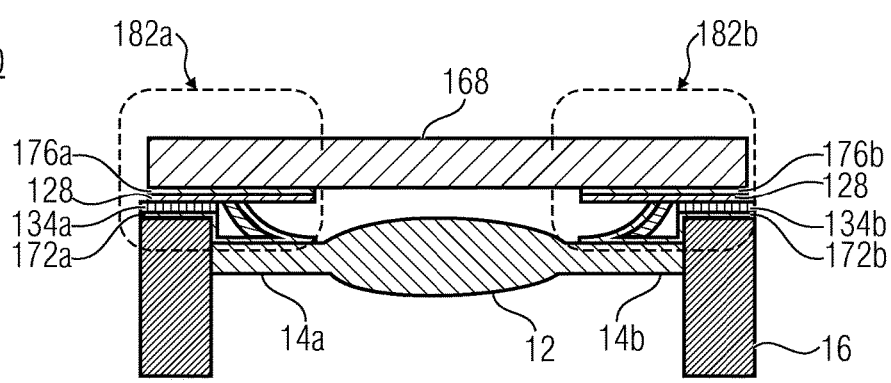
FIG. 86c is a cross-sectional view of an overall apparatus joined by means of adhesive from the partial apparatuses analogous to FIGS. 86a and 86b with electrostatic drives, each including a cantilever electrode.

FIG. 86b shows the arrangement of an annealable adhesive 134a and 134b adjacent to the surface FT1, by which the mold component 168 is joined with the supporting structure 16. FIG. 86c shows the joined state of the apparatus where the electrostatic drives 182a and 182b are implemented such that merely the respective first electrode 172a/172b, the static electrode 176a/176b, the isolator layer 128 as well as the adhesive 134a/134b are formed in the area between the surface FT1 and the mold component 168.

Figure 87A:
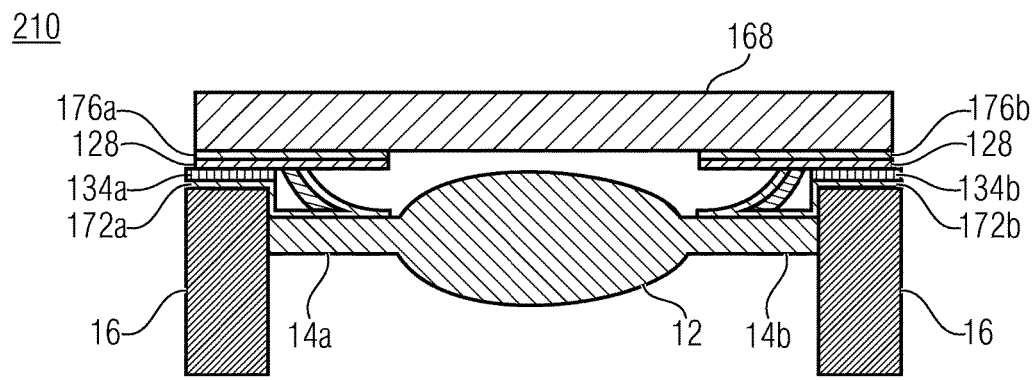
FIGS. 87a-b are cross-sectional views of an apparatus having a lens which is moved analogous to FIG. 86c via cantilever electrodes of an electrostatic drive arranged at the ridges with regard to a mold component implemented as a glass plate, wherein stationary lenses are arranged at the mold component in FIG. 87b.

FIG. 87a shows the apparatus 210 where the mode part 168 is implemented as a glass plate.

Figure 87B:
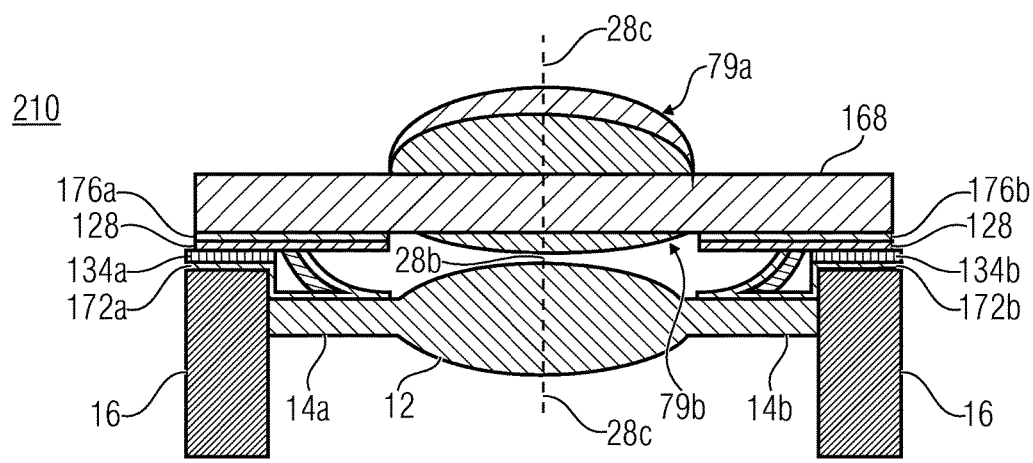

FIG. 87b shows the apparatus 210 according to FIG. 80a where the mold component includes, on the surface facing away from the lens 12, a single-layered stationary lens 86a and on the opposite surface facing away from the lens 12, a two-layered stationary lens 86b and the optical axes 28a, 28b and 28c essentially coincide. Thereby, the stationary lenses 79a and 79b form a lens stack on the mold component 168.

Figure 88A:
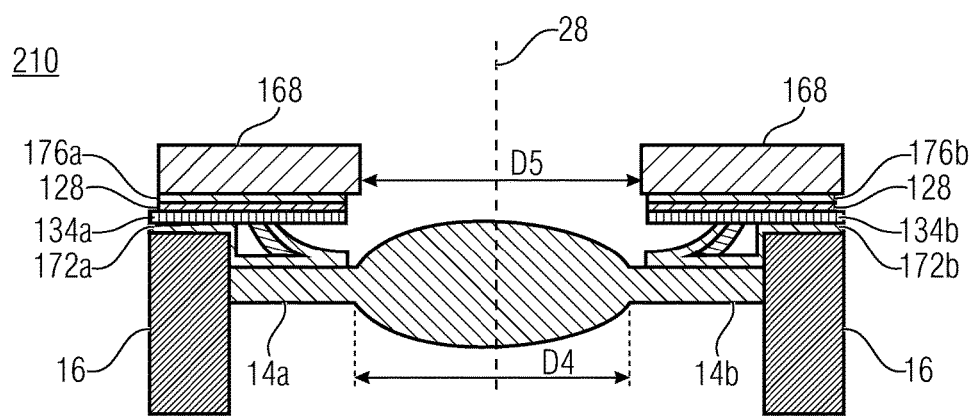
FIGS. 88a-b are cross-sectional views of an apparatus having a lens which is moved via electrostatic drives including cantilever electrodes with regard to an opaque mold component having material recesses, wherein the material recess in FIG. 88b includes a optical effective area.

FIG. 88a shows the apparatus 210 where the mold component 168 is implemented as an opaque body having the diameter D5 and the material recess is formed essentially concentrically around the optical axis 28 of the lens 12.

Figure 88B:
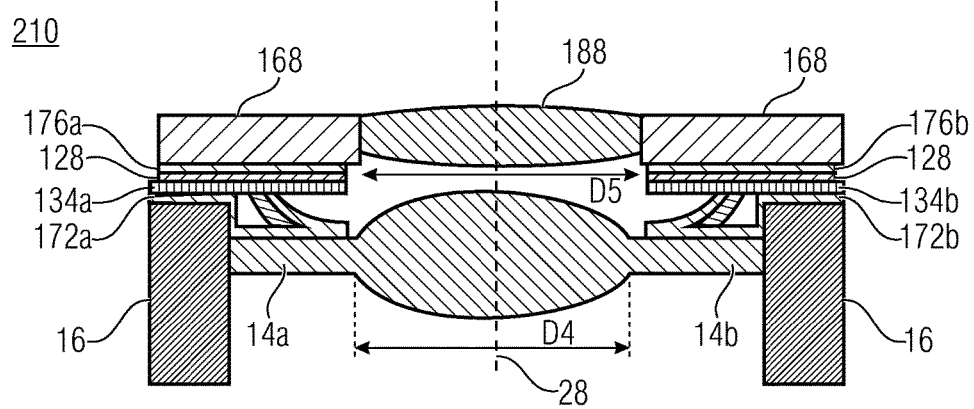

FIG. 88b shows the apparatus 210 according to FIG. 81a, wherein an optical effective area 188 is arranged in the area of the diameter D5 and the optical axis 28b of the optical effective area 188 essentially coincides with the optical axis 28a of the lens 12. The present embodiment presents the optical effective area as a lens, however, the same can also be any optical structure according to the above statements.

Figure 89:
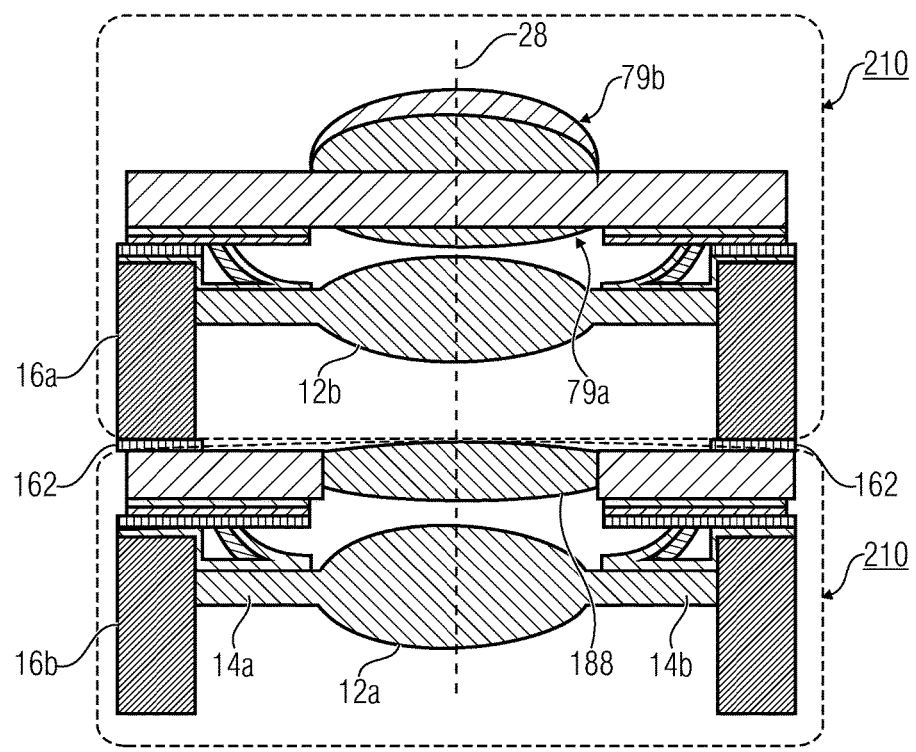
FIG. 89 are cross-sectional views of an apparatus where partial apparatuses with moving lenses, stationary lenses and optical effective areas are joined to each other via an adhesive layer and electrostatic drives are implemented with cantilever electrodes.

FIG. 89 shows an apparatus according to FIG. 88b at which an apparatus 210 according to FIG. 87 is arranged via the adhesive layer 162 such that the optical axes of the lenses 12a and 12b, the stationary lenses 79a and 79b as well as the optical effective area 188 essentially coincide.

FIG. 90a shows the cross-section of two adjacent cells 56a and 56b, each implemented consistent with the apparatus 210 of FIG. 86a, wherein the cells 56a and 56b have the distance X3 to one another and wherein the supporting structure 16 includes grooves 148a and 148b analogous to FIG. 62a.

FIG. 90b shows the cross-section of an unjoined mold component 192 wherein each of the two portions 196a and 196b corresponds to the mold component 168 with arranged static electrodes 176, isolator layer 128 and optical effective area 188 of the apparatus 88b. The two portions 196a and 196b of the mold component 168 are formed integrally.

Additionally, the mold component includes tongues 152a and 152b that are implemented to be arranged at the grooves 148a and 148b.

FIG. 90c shows an apparatus 220 formed of the cells 56a and 56b of FIG. 83a and the mold component 192 of FIG. 90b, wherein the tongues 152a and 152b are arranged at the grooves 148a and 148b and are joined via an adhesive 134, wherein the apparatus includes four electrostatic drives 182a-d and the peripheral structures grooves 148a-b and tongues 152a-d define the joining zone between the mold component 168 and the supporting structure 16.

According to the embodiment of FIG. 90 it is possible to produce several cells 56 in parallel which can have an identical or an individual distance X3 for each adjacent pair of cells.

FIG. 91 shows an apparatus analogous to FIG. 61, wherein the electrostatic drives are implemented in the form of the electrostatic drives 182a and 182b.

FIG. 92a shows the apparatus 30 of FIG. 7, wherein rectangular first electrodes 172a-d are arranged at parts of the ridges 14a-d and parts of the supporting structure 16, each including a portion 166a-d according to FIG. 84a. FIG. 92b shows the same apparatus where the ridges 14 lead to an internal frame 62 which is part of the supporting structure 16.

Figure 93:
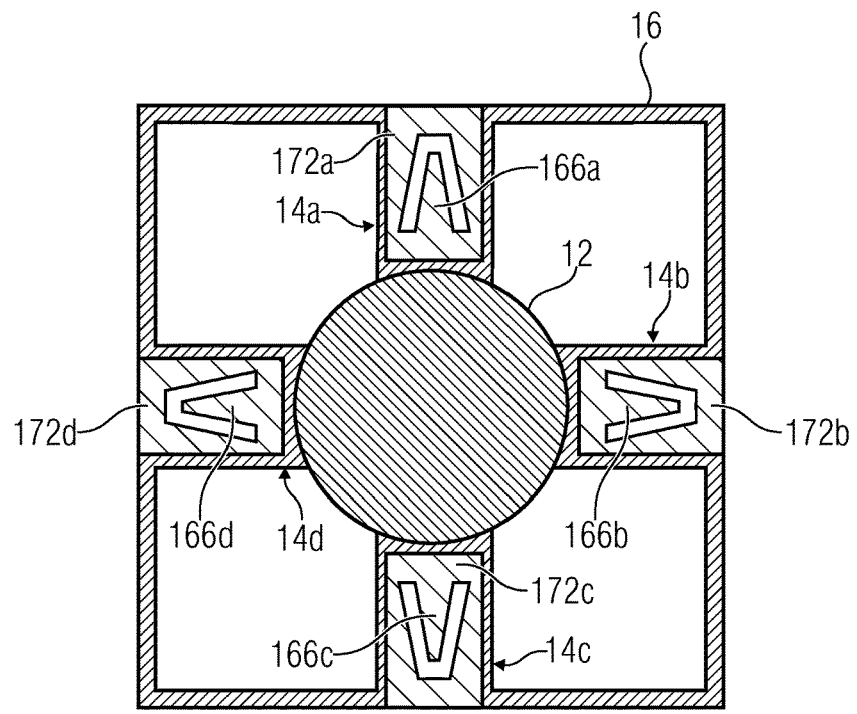

FIG. 93 shows the apparatus 30 of FIG. 7, wherein rectangular first electrodes 172a-d are arranged at parts of the ridges 14a-d and parts of the supporting structure 16, each including a trapezoidal portion 166a-d that tapers towards the supporting structure 16 and whose end connected to the respective ridge 14a-d is arranged adjacent to the lens 12.

Figure 94:
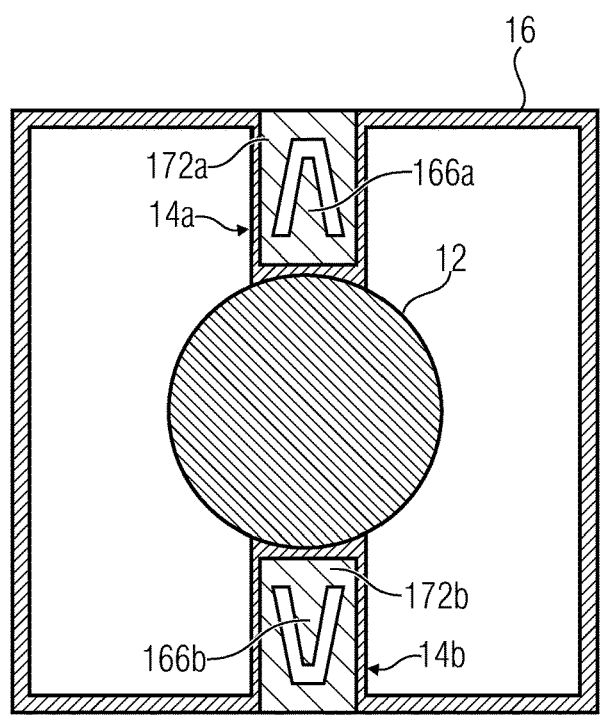

FIG. 94 shows an embodiment according to FIG. 93, wherein merely two opposing ridges 14a-b are formed.

FIG. 95 shows an apparatus analogous to FIG. 11, wherein first electrodes 172a-d are arranged at parts of the ridges 14a-d and parts of the supporting structure 16, whose external edges run parallel to the external edges of the ridges 14a-d and which each include a portion 166a-d according to FIG. 84a, whose end connected to the respective ridge 14a-d is arranged adjacent to the lens 12.

FIG. 96 shows an embodiment according to FIG. 70, wherein the first electrodes 172a-b each include a trapezoidal portion 166a-b that tapers towards the supporting structure and whose end connected to the respective ridge 14a and 14b is arranged adjacent to the lens 12.

Figure 97:
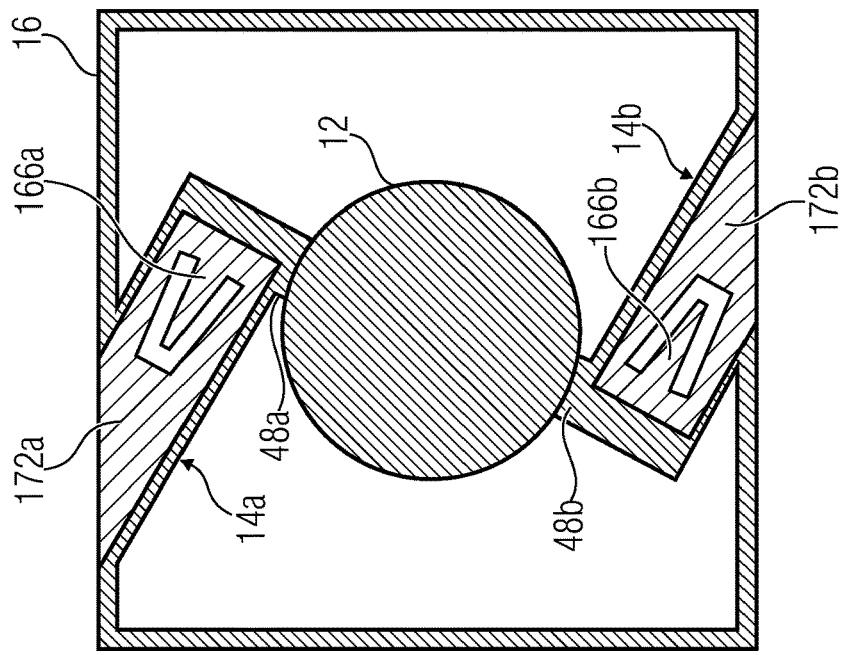

FIG. 97 shows an embodiment according to FIG. 11, wherein the first electrodes 172a-b each include a trapezoidal portion 166a-b that tapers towards the supporting structure and whose end connected to the respective ridge 14a-d is arranged adjacent to the lens 12.

Figure 98:
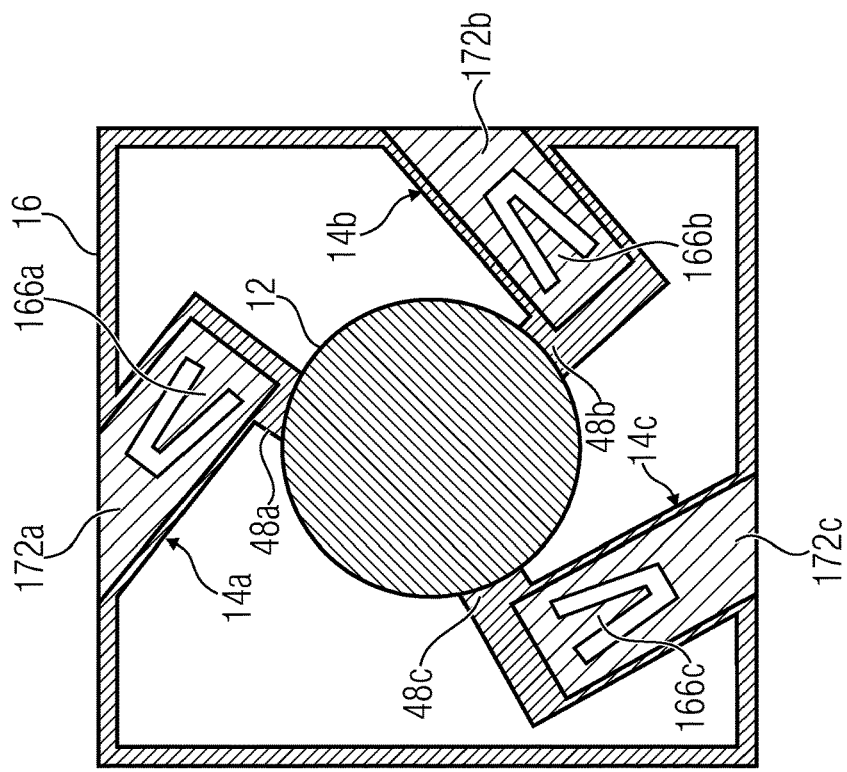

FIG. 98 shows an embodiment according to FIG. 12, wherein the first electrodes 172a-c each include a trapezoidal portion 166a-c tapering towards the supporting structure and whose end connected to the respective ridge 14a-c is arranged adjacent to the lens 12.

FIG. 99 shows an apparatus 230 according to apparatus 210 of FIG. 88b, wherein the mold component 168, analogous to FIG. 90c, is joined to the supporting structure 16 via a groove 148, a tongue 152 and adhesive 134, and wherein, analogously to FIG. 25, a co-moving lens 75 is arranged at the ridges 14a and 14b via further structures 74a and 74b, and the lens 12 and the co-moving lens 75 form a lens stack 76.

FIG. 100 shows an apparatus 240 according to apparatus 210 of FIG. 88a, wherein the mold component 168, analogous to FIG. 90c, is joined to the supporting structure 16 via a groove 148, a tongue 152 and adhesive 134, and at the end of the supporting structure 16 facing away from the mold component 168, according to apparatus 70, a glass wafer 86 is arranged at which one stationary lens 79a-b with layers 81a-b and 81c-d arranged at the same is formed on each of the sides facing the lens 12 and facing away from the lens 12, wherein the layers are arranged spaced apart from the supporting structure 16.

FIG. 101 shows the apparatus 230, wherein at the surface of the supporting structure 16a pointing in the direction of the reference plane 18, the apparatus 240 is joined via an adhesive layer 162 such that the optical axes 28a-e of the lenses 12a, 12b, 75 and 79a and 79b essentially coincide. Generally, any combination and order of lenses 12, co-moving lenses 75 and stationary lenses 79 as well as optical effective areas 188 and/or the discussed apparatuses is possible.

FIG. 102 shows an apparatus 250 analogous to FIG. 81a, wherein the supporting structure 16 is formed of a polymer material and at the end of the supporting structure 16 facing away from the lens 12, a glass wafer 86 is arranged whose surface facing away from the lens 12 includes a stationary lens 79 with arranged layers 81a and 81b extending from the stationary lens 79 towards the distal ends of the glass wafer 86. The two optical axes 28a of the lens 12 and 28b of the stationary lens 79 essentially coincide.

FIG. 103 shows an apparatus where two cells 56a and 56b are arranged adjacent to one another at a distance X4 analogous to apparatus 220. The two cells 56a and 56b are implemented analogously to apparatus 250. The stationary lens 79a with the layers 81a and 81b arranged at the same, the stationary lens 79b with the layers 81c and 81d arranged at the same, as well as the parts 16a and 16b of the supporting structure 16 are each formed integrally.

FIG. 104 shows an apparatus 260 extending the apparatus 150 such that a further supporting structure 16b is arranged between the layers 81a and 81b arranged at the stationary lens 79 and the reference plane 18, and the reference plane 18 is the surface of the imager 164 which is arranged along the optical axis 28 at the side of the further supporting structure 16b facing away from the stationary lens 79, facing the lens 12.

FIG. 105 shows an apparatus 270 formed of two adjacent apparatuses 260 and whose cells are joined, consistent with apparatus 220 of FIG. 97. Apparatus 270 exemplarily represents the state of two adjacent cells 56 after their production as simple multiplier at a wafer level. After the production has been carried out, there is the option of separating the cells from one another or to leave them adjacent to one another consistent with multiple channels of an optical overall system.

The components described in the above embodiments, in particular thermally influenceable ridges, heating elements for heating the ridges, adhesives for fixing a new initial position as well as electrostatic drives for deflecting the ridges with curved mold component or cantilever electrode can be combined with one another in apparatuses.

While in the above embodiments adhesive layers 79 and 92 have been illustrated for joining different segments of further structures 74 and the supporting structure 16, layers 78 and 92 can basically also include other joining substances or materials, such as boundary layers resulting from thermal fusion of the respective segments.

Besides glass wafers 86, lens stacks 78 can also include spacer wafers defining a defined distance between two adjacent elements of an apparatus.

While in the above embodiments lenses or lens fields have been illustrated at the ridges and/or the supporting structure, the same can basically be any form of optical structures and/or elements, such as aspheres, free-form areas, diffractive structures, mirrors, prisms or lens arrays. Lens arrays can consist of several equal or different, also arbitrarily combinable optical elements just listed above. Every optical element can include transparent, reflecting or absorbing areas which can additionally differ in their spectral areas or polarization effect.

While the first electrodes 122 and the second electrodes 126, in the above embodiments, have been spaced apart by an isolator layer 128, basically any spacer is possible, for example also air.

While in the above embodiments the cantilever electrodes 174 and the static electrodes 176 have been spaced apart by an isolator layer 128, basically any spacer is possible, for example also air.

Some of the above embodiments described an apparatus including an optical structure and at least two ridges, each connecting the optical structure to a supporting structure and the ridges being implemented to allow a movement of the optical structure with regard to a reference plane.

Some embodiments showed that the movement of the ridges and hence the optical structure can counteract a thermally induced change in an optical characteristic of the optical structure.

Here, the ridges are polymeric optical components having integrated mechanical structures allowing a thermally induced axial change in position of the optical structure. The ridges are thereby bending arrangements implemented in a monomorphic manner, i.e. single-layered, or in a bimorph manner, i.e. double-layered and hence effective analogous to bi-metal strips. Thereby, the thermally induced movement of the ridges can be designed such that the same also counteracts thermally induced changes in an optical characteristic of the optical structure, for example the focal length of a lens, and athermization is achieved at least partly. By dimensioning the ridge, an arbitrary, determined travel range of the ridges can be achieved.

Additionally, an arrangement of heating elements at the ridges for local temperature variation of the ridges is conceivable, possibly in the form of electric, ohmic resistors. The heating elements can consist of printed, sputtered, vapor-deposited and electrically conductive heating structures and can be implemented in a straight, curved or meandering shape. In the case of lenses, by heating the electric heating elements, the distance of the lenses to a fixed base area, for example the plane where an imager of a camera is situated, can be varied and, among other things, tuning of the focusing can take place, i.e. autofocus drive can be realized. Simultaneously, the heating power and hence the deflection of the individual ridges can be regulated separately from one another, so that both a parallel shift of the optical structure in space along the optical axis as well as a tilting of the optical structure becomes possible.

The ridges can be connected directly to the housing material, wherein the same is implemented in a non-transparent manner. Alternatively, the ridges can lead, on the housing side, to a frame surrounding the overall structure, which is attached to the housing without any gaps inbetween.

With regard to the optical structure, many identical or non-identical structures are possible, as described in the figures. The structures each consist of an optical structure, ridges, possibly a frame and/or a housing and are arranged adjacent to one another and, if possible, produced in parallel, i.e. in the same processing steps.

In the case of single-layered ridges, the movement of the optical structure along the optical axis is achieved by a differing expansion of ridges and the surrounding housing during temperature variations. In a single-layered structure, the optical structure and the holding ridges consist of the same material, wherein the material has a greater coefficient of thermal expansion than the surrounding housing material. With an increase in temperature, the ridge material expands more than the surrounding housing. As a consequence of an at least bilateral suspension and an enforced position of the optical structure, the optical structure moves along the optical axis.

In the case of two-layered ridges, the movement along the optical axis is achieved by the differing expansion of the materials of the two-layered ridges. Here, the expansion difference to the housing becomes insignificant. The bending results from different coefficients of thermal expansion, CTE, of the layer materials. When the layer sequence includes a smaller CTE at the bottom and a greater CTE at the top, a movement towards the bottom results during a temperature variation. When, alternatively, the layer sequence includes a greater CTE at the top and a smaller CTE at the bottom, a movement towards the top results during a temperature variation. Here, the layer structure can be implemented in a continuous or discontinuous manner. If the layer structure is continuous, the optical structure can be implemented with the same materials and in the same order as the ridges. In this case, the selection of materials simultaneously defines the mechanical and optical characteristics. If, for example, an achromat consisting of two layers is implemented, pairing of the materials is performed according to the Abbe numbers, which results in the CTEs of the materials determining the direction of the movement during a temperature increase.

Alternatively, a discontinuous layer structure can be implemented. In this case, the optical structure and the ridges can be formed of different materials, for example in a different sequence and with more than two layers. In this case, the selection of the material is performed according to mechanical characteristics, decoupled from the consideration of the optical characteristics. By way of the example of the above achromat, pairing the materials is performed according to the Abbe numbers. The CTEs of the materials result therefrom. A different layer sequence and expansion in the areas of the ridges and the optical structure allows, despite the determined CTEs, a free selection of the direction of movement during a temperature increase.

Additionally, stacking any amount of further optical structures is possible. In a vertical direction, along an optical axis, the respective holding elements are mechanically coupled to the ridges of cantilevered layers above or below the same and perform the same movement. As an alternative, the holding elements can also be coupled to the housing and move independent of further layer sequences in the stack. Stationary, fixed lenses of the lens stack can comprise continuous glass wafers.

It is an advantage that the described arrangements generally allow a thermally influenced position of optical components made of polymer materials. Here, lenses moving along the direction of the normal of the image plane are of particular relevance. With a correct implementation, the thermally induced change in distance of the main plane of a lens/an objective to its image plane can be selected such that the same corresponds to the thermally induced change in the focal length. Consequently, the image plane of the lens/the objective is at the same axial position, whereby sharp imaging can be realized, even with varying temperatures. This substantially extends the field of use of polymer optics. The arrangements can be produced as simple multiplier at wafer level and hence allow further cost reduction.

By using electrical heating elements, the temperature and hence the bending of the holding structure and ultimately the axial position of the lenses can be controlled independent of the environmental temperature, which can be used, among other things, for active focusing, for example in the form of an autofocus.

Tilting can also be achieved by specifically deflecting the holding structures of the lenses in a differing manner.

Some of the above embodiments showed an option of adjusting a specific position and tiling of the optical structure by bending the ridge structures and fixing the position after completed adjustment by means of UV-annealable adhesive. Thus, compensation of production tolerances of polymeric optical components and specifically the adjustment of the image position of objectives, in particular after joining optical and imager wafers is possible. Possibly existing additional means, such as thermally or electrostatically influenceable ridges, further allow the thermally influenced position of optical components made of polymer materials. According to embodiments, electrostatic drives are arranged together with heating structures for heating the ridges. Further, thermally influenceable ridges that are deflectable by heating elements and/or electrostatic drives can be adjusted with an adhesive in a position differing from the original initial position.

Further above embodiments showed previous explanations that an applied voltage between the electrodes of the electrostatic drive can be used to allow shifting of the optical structure in the space. Actuation is performed by using an electrostatic field resulting from applying an electric voltage between the electrodes of the electrostatic drive. An additional electrode carrier can possibly be used with a possibly curved continuous profile in order to implement an electrostatic drive at a supporting structure. By minimizing the distance or the gap between the electrodes of an electrostatic drive, the voltage necessitated for a movement can be reduced.

Movement along an optical axis is achieved by changing the applied voltage between a ridge and a mold electrode. Here, each ridge can be provided with a different voltage, so that a different travel range results for each ridge and, besides a movement of the optical structure along the optical axis, tilting of the optical structure can also be achieved.

Additionally, the actuators can be used for adjusting the axial position of the optical structures with regard to the imager depending on the object distance for obtaining the best possible imaging quality and for implementing autofocus.

After producing the described optical structures including the housing components, the mold components, which have a curved continuous shape on the lens side, are joined either individually or together at wafer level. The mold components serve as electrode carriers and are provided with the respective second electrode of the electrostatic drives. At least one of the electrodes, ridge or mold electrode, is provided with an isolator layer which can be deposited, like the electrodes, by means of vapor deposition or sputtering or by the additional molding of polymers.

The apparatuses presented can be produced in any implementation in the form of many components and systems in parallel in wafer-level production and with high precision and can be connected to a plurality of components. In particular, it is possible to connect an optics wafer to an imager wafer and to adjust the optimum focal position subsequently in every channel by using the actuators.

Optimum functioning of the optical apparatuses can be ensured by adapting the axial positions of the optical structures, implemented as lenses, after joining the individual lens positions by actuators, in particular thermal or electrostatic actuators. Thereby, optimum orientation of the optical structures with regard to a reference plane can be achieved, and hence the compensation of deviations from possible target parameters resulting as a consequence of production and joining tolerances.

Generally, the described arrangements allow a compensation of production tolerances of polymeric optical components and specifically dynamic adjustment of the image position of objectives consistent with an autofocus. Hereby, the field of use of polymer optics is significantly increased. The arrangements can be produced as simple multiplier at wafer level and hence allow further cost reduction. Specifically, the entire optics wafer can be joined with an imager wafer and every single module can be brought into the optimum focal position by selecting the control voltage or control voltages. By specifically differing deflections of the ridges and hence the optical structures connected therewith, tilting of the optical structures can also be achieved.

It has been discussed that the ridges connecting the optical structure to the supporting structure and where an electrostatic drive is arranged can be implemented such that a portion of the ridges is at least partly deflected from the plane of the respective ridge in the direction of the corresponding second electrode in order to increase the efficiency of the electrostatic drive.

The actuators can be miniaturized and can be produced in wafer-level technology. At the same time, the actuators can both compensate production tolerances and allow variable focusing during operation of the optical overall system.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus comprising:
    an optical structure;
    at least two ridges, each connecting the optical structure to a supporting structure; and
    an electrostatic drive for deflecting the optical structure,
    wherein the electrostatic drive comprises a cantilever electrode and a stationary electrode electrically insulated from the cantilever electrode, which at least partly opposes the cantilever electrode,
    wherein the cantilever electrode is arranged on or in at least one portion of at least one ridge and wherein the cantilever electrode is at least partly deflected out of a plane where the ridge is arranged in the direction of the stationary electrode, in order to effect deformation of the ridge when an electric field is applied between the cantilever electrode and stationary electrode,
    wherein the cantilever electrode is embedded at least partly in the ridge, the ridge comprising a polymer material; and/or
    wherein the apparatus comprises an electrode carrier on which the stationary electrode is mounted, wherein the electrode carrier is arranged at the supporting structure by means of an adhesive, and wherein the electrode carrier and/or the supporting structure comprises peripheral structures forming a joining zone having grooves and tongues between the ridge and the electrode carrier and/or an introduction location for the adhesive.

2. Apparatus according to claim 1, comprising a spacer arranged between the cantilever and the stationary electrode.

3. Apparatus according to claim 2, wherein the spacer comprises an isolator layer arranged at least partly on the cantilever electrode and/or the stationary electrode.

4. Apparatus according to claim 1, wherein the distance between the cantilever electrode and the stationary electrode increases starting from a position adjacent to the supporting structure in the non-deflected state of the actuator in the direction of the optical structure.

5. Apparatus according to claim 1, wherein the stationary electrode comprises a portion on which the cantilever electrode is supported without the application of an electric field in a region where the ridge is moveable with respect to the supporting structure.

6. Apparatus according to claim 1, wherein the electrode carrier comprises a planar profile.

7. Apparatus according to claim 1, wherein the electrode carrier is arranged at the supporting structure such that the second electrode is facing the first electrode and at least one contact point is formed between the support structure and the electrode carrier, wherein exclusively the adhesive and the spacer are arranged at the contact point between the two electrodes.

8. Apparatus according to claim 1, wherein the geometry of the cantilever electrode and/or the stationary electrode is implemented to have a linearized ratio between voltage applied between the electrodes and the resulting deflection of the optical structure.

9. Apparatus according to claim 1, wherein the at least two ridges comprise a first layer and a second layer that are deflectable differently in relation to one another.

10. Apparatus according to claim 9, wherein the first layer and the second layer comprise different coefficients of thermal expansion.

11. Apparatus according to claim 9, wherein the first layer extends from the optical structure to the supporting structure, and wherein the second layer covers the first layer partly or completely.

12. Apparatus according to claim 11, wherein the second layer which partly covers the first layer is arranged at a distance to the optical structure and/or the supporting structure.

13. Apparatus according to claim 9, wherein the first layer and/or the second layer comprise a constant or varying thickness.

14. Apparatus according to claim 13, wherein the thickness of the first layer and/or the second layer varies continuously at least across part of the length, or wherein the thickness varies discontinuously.

15. Apparatus according to claim 9, wherein the at least two ridges comprise at least one further layer that is differently deflectable in relation to the first and the second layer.

16. Apparatus according to claim 9, wherein the optical structure comprises a layer, wherein the layer of the optical structure and the first layer of the ridges are formed of the same material.

17. Apparatus according to claim 16, wherein the optical structure comprises a further layer, wherein the further layer of the optical structure and the second layer of the ridges are formed of the same material.

18. Apparatus according to claim 16, wherein the layer of the optical structure and the first layer of the ridges and/or the further layer of the optical structure and the second layer of the ridges are integrated.

19. Apparatus according to claim 1, wherein the at least two ridges comprise a layer comprising a higher coefficient of thermal expansion than the supporting structure.

20. Apparatus according to claim 18, wherein the layer exhibits a constant or a continuously or discontinuously varying thickness.

21. Apparatus according to claim 20, wherein the layer of the ridges and the optical structure are integrated.

22. Apparatus according to claim 18, wherein the optical structure comprises a first layer, wherein the first layer and the layer of the ridges are formed of the same material.

23. Apparatus according to claim 22, wherein the optical structure comprises a second layer on the first layer.

24. Apparatus according to claim 1, wherein the longitudinal center line of the ridges intersects an optical axis of the optical structure or runs past an optical axis of the optical structure.

25. Apparatus according to claim 1, wherein the supporting structure comprises a portion of the ridge material.

26. Apparatus according to claim 1, wherein the optical structure comprises one or several optical elements.

27. Apparatus according to claim 1, wherein the optical element comprises transparent, reflecting or absorbing areas.

28. Apparatus according to claim 26, wherein the optical element comprises a lens, an asphere, a free-form area, a diffractive structure, a mirror, a prism or a lens array including identical or non-identical cells, each implemented as a lens, an asphere, a free-form area, a diffractive structure, a mirror or a prism, or a combination of the same.

29. Apparatus according to claim 1 comprising at least one further optical structure, wherein the further optical structure is arranged with regard to the optical structure such that their optical axes essentially coincide.

30. Apparatus according to claim 1, wherein a further supporting structure is adhered to the supporting structure.

31. Apparatus according to claim 1, wherein the at least one further optical structure is arranged at the supporting structure or the optical structure via further structures.

32. Apparatus according to claim 31, wherein the further structures are arranged at the further optical structure by adhesive.

33. Apparatus according to claim 29, wherein the further optical structure comprises a glass layer and at least one optical element mounted on the glass layer.

34. Apparatus according to claim 1 comprising:
a curable adhesive arranged between the ridges and the supporting structure, wherein the adhesive is effective to cause, after its curing, a predetermined orientation of the optical structure with regard to the reference plane.

35. Method for producing an apparatus comprising an optical structure with at least two ridges, each connecting the optical structure to a supporting structure, and an electrostatic drive, the method comprising:
forming the ridges in order to allow a movement of the optical structure in relation to a reference plane;
arranging a cantilever electrode on or in a portion of the ridges;
arranging the stationary electrode such that the same opposes the cantilever electrode at least partly and is electrically insulated from the cantilever electrode;
deflecting the cantilever electrode in the direction of the stationary electrode, wherein applying an electric field between the cantilever electrode and the stationary electrode causes a deformation of the ridge and a movement of the optical structure,
such that the cantilever electrode is embedded at least partly in the ridge, the ridge comprising a polymer material; and/or
such that the apparatus comprises an electrode carrier on which the stationary electrode is mounted, wherein the electrode carrier is arranged at the supporting structure by means of an adhesive, and wherein the electrode carrier and/or the supporting structure comprises peripheral structures forming a joining zone having grooves and tongues between the ridge and the electrode carrier and/or an introduction location for the adhesive.

36. Method according to claim 35, wherein arranging the second electrode comprises:
providing an electrode carrier;
arranging a spacer at the cantilever electrode or the stationary electrode;
arranging the electrode carrier such that the stationary electrode at least partly opposes the cantilever electrode;

fixing the electrode carrier by means of an adhesive, so that merely the spacer and the adhesive are arranged between the cantilever electrode and the stationary electrode.

37. Method according to claim 35 comprising:
arranging a curable adhesive between the ridges and the supporting structure; and
curing the adhesive to effect a predetermined orientation of the optical structure in relation to the reference plane.

38. Method according to claim 37, wherein curing the adhesive comprises:
adjusting a curing temperature or curing period depending on a desired tilting or a desired distance of the optical structure in relation to the reference plane.

39. Method according to claim 38, wherein the adhesive comprises a UV-curable adhesive.

* * * * *